(12) United States Patent
Chapman et al.

(10) Patent No.: US 7,555,706 B2
(45) Date of Patent: Jun. 30, 2009

(54) HUMAN MACHINE INTERFACE

(75) Inventors: David John Chapman, Chippendale (AU); Andrew J. Dowling, Rozelle (AU); Rohan J Mc Adam, Yetholme (AU)

(73) Assignee: Honeywell International Inc., Morristown, NJ (US)

( * ) Notice: Subject to any disclaimer, the term of this patent is extended or adjusted under 35 U.S.C. 154(b) by 253 days.

(21) Appl. No.: 10/297,732

(22) PCT Filed: Jun. 8, 2001

(86) PCT No.: PCT/AU01/00706

§ 371 (c)(1),
(2), (4) Date: Jul. 8, 2003

(87) PCT Pub. No.: WO01/95041

PCT Pub. Date: Dec. 13, 2001

(65) Prior Publication Data

US 2004/0021679 A1 Feb. 5, 2004

(30) Foreign Application Priority Data

Jun. 9, 2000 (AU) .................................... PQ8087

(51) Int. Cl.
*G06F 17/00* (2006.01)
(52) U.S. Cl. ...................................... 715/234; 715/760
(58) Field of Classification Search .................. 715/513, 715/234, 760

See application file for complete search history.

(56) References Cited

U.S. PATENT DOCUMENTS

| 5,631,825 | A | 5/1997 | van Weele et al. | |
|---|---|---|---|---|
| 5,706,455 | A | 1/1998 | Benton et al. | |
| 5,982,362 | A | 11/1999 | Crater et al. | |
| 6,404,445 | B1 * | 6/2002 | Galea et al. | 715/853 |
| 6,578,192 | B1 * | 6/2003 | Boehme et al. | 717/115 |

(Continued)

FOREIGN PATENT DOCUMENTS

EP 0825506 2/1998

(Continued)

OTHER PUBLICATIONS

Luh et al., "Design of Distributed Control System Software Using Client-Server Architecture", Industrial Technology, 1996, Proceedings of the IEEE International Conference on Dec. 2-6, 1996, p. 348-350.*

(Continued)

*Primary Examiner*—Amelia Rutledge
(74) *Attorney, Agent, or Firm*—Shelston IP

(57) ABSTRACT

An industrial control user interface provides a flexible, extensible architecture for the provision of real-time process data to a state-of-the-art user interface, using MSHTML as the underlying rendering engine. The architecture of the interface provides a user interface that is designed to harness key industry standard technologies in an open, adaptable, architecture that facilitates the technological convergence of disparate HMI products. The preferred embodiments offer open display page architecture via the separation of the provision of data and server specific user interactions from the implementation of individual page elements. The only real assumption made about a page element is that it is part of the HTML display page and accessible via the Document Object Model.

25 Claims, 24 Drawing Sheets

U.S. PATENT DOCUMENTS

| | | | |
|---|---|---|---|
| 6,643,652 B2 * | 11/2003 | Helgeson et al. | 707/10 |
| 6,647,410 B1 * | 11/2003 | Scimone et al. | 709/206 |
| 6,721,747 B2 * | 4/2004 | Lipkin | 707/10 |
| 6,742,015 B1 * | 5/2004 | Bowman-Amuah | 718/101 |
| 6,792,605 B1 * | 9/2004 | Roberts et al. | 719/313 |
| 6,792,607 B1 * | 9/2004 | Burd et al. | 719/316 |
| 6,874,146 B1 * | 3/2005 | Iyengar | 719/313 |
| 6,978,262 B2 * | 12/2005 | Tsai | 707/3 |
| 7,029,859 B2 * | 4/2006 | Thompson | 435/7.1 |
| 7,039,859 B1 * | 5/2006 | Sundaresan | 715/513 |
| 7,072,984 B1 * | 7/2006 | Polonsky et al. | 709/246 |
| 7,219,327 B1 * | 5/2007 | Jacobs et al. | 717/104 |
| 2004/0034833 A1 * | 2/2004 | Kougiouris et al. | 715/513 |

FOREIGN PATENT DOCUMENTS

| | | |
|---|---|---|
| EP | 0977099 | 2/2000 |
| WO | WO 98/47068 | 10/1998 |

OTHER PUBLICATIONS

"Platinum Edition Using HTML 4, XML, and Java 1.2", published by Que, Dec. 1998, downloaded from http://proquest.safaribooksonline.com, p. 1-4.*

Lewandoski, "Frameworks for Component-Based Client/Server Computing", ACM Computing Surveys, vol. 30, No. 1, Mar. 1998, p. 3-27.*

* cited by examiner

HUMAN MACHINE INTERFACE

FIELD OF INVENTION

The present invention relates to a human machine interface (HMI).

The invention has been developed primarily for Industrial, Security, Life Safety, Access Control, Heating, Ventilation and Air Conditioning applications such as the monitoring of data generated by industrial processes and equipment, and will be described hereinafter with reference to that application. However, it will be appreciated that the invention is not limited to use in that particular field.

BACKGROUND OF THE INVENTION

Remote monitoring of data is frequently used in industrial settings. The desire for implementing such monitoring ranges from the need for centralised monitoring of relatively complex industrial systems to the convenience of allowing a small number of operators to monitor multiple data streams via a single workstation. In many cases, it is also desirable that the HMI allow operators to control at least some of the industrial processes and machines in relation to which the data is being collected.

Historically, collection and display of industrial data on operator workstations has been dealt with on a proprietary basis, with application-specific software linking remote data sources with dedicated terminals. Whilst such systems have provided satisfactory performance, they are relatively time consuming to design, and relatively inflexible once implemented.

Another problem is that individually implemented software solutions are often limited in the types of data sources with which they can interface.

One of the most profound developments of the last five years has been the staggering growth of the internet. This growth has changed public perceptions about the availability of data, about what to expect in a user interface, and how open and interoperable computer systems should be. Standalone computer systems are no longer acceptable to the market—the increasingly networked world is setting the pace and scope of change.

In addition, this growth has led to a huge shift in development focus for practically every software organisation. The web has become the ubiquitous data delivery mechanism, and as software organisations focus their energies on harnessing its potential, the technologies which underpin its success are being pushed forward at ever-increasing rates. Where once the web was not mature enough to support mission-critical functions, such as major financial transactions or process control, it is clear that this is no longer the case.

It is this growth which is driving investment into user interface technology, as the major stakeholders seek to establish the internet as a viable business platform. As a result, current technological trends have meant the underlying technologies are becoming increasingly more appropriate to the field of industrial process control.

The development of what may be loosely termed "internet technologies" has been extremely rapid, and has a very short history:

December 1993: Only 200 known http servers existed.
December 1994: First W3C meeting. Over 200 members, charter to promote interoperability.
October 1996: OLE Controls 96 Specification published. Promotes lightweight, windowless controls suitable for the web environment, and intended to add increasing sophistication to browser capabilities.
December 1996: Cascading Style Sheet specification. Introduced 2D positioning, size, colour, font attributes.
July 1997: HTML 4.0 specification. Included scripts, objects, framesets, internationalisation. Browser technology advanced appropriately.
September 1997: Dynamic HTML, Document Object Model. Full access to the HTML object model, providing web pages with unprecedented power and flexibility.
September 1998: Internet Explorer 5.0 Beta 2. Includes Vector Markup Language for vector graphics capabilities.
late 1999: Office 2000 to use HTML/XML as document format for all suite products. Microsoft look to include sufficient functionality in HTML for it to be suitable for use by Visual Basic forms engine.

In parallel with these developments has been an increasing awareness that HTML's origins as a language intended to store presentation information means its ability to store and represent data is severely limited. This limitation has led to the rise of XML, or extensible Markup Language, intended to work in concert with HTML to provide a means of storing both data and presentation information.

It was these trends that led the applicant to consider the suitability of such technologies for industrial control systems.

The development requirements of an industrial control system indicate clearly that known web browsers are not suitable for the operator environment of an industrial control system. They may be acceptable for casual use, but the operator environment has specific requirements, such as restricted navigation, support for industrial keyboards, alarm and status indication, and security.

The partial solution to a number of these issues may be provided using a software package sold and marketed by Microsoft®. In particular, Microsoft® supply a rendering engine used in Internet Explorer (known as MSHTML), for use by third-party developers wishing to integrate HTML rendering capabilities into their applications. While this software package can represent a useful tool for system designers, its generic nature ensures that it will not automatically integrate or interact with other applications. Further although the invention in some aspects will be described in relation to this software package, it will be appreciated that other browser techniques may be used.

Any discussion of the prior art throughout the specification should in no way be considered as an admission that such prior art is widely known or forms part of common general knowledge in the field.

DISCLOSURE OF THE INVENTION

It is an object of the present invention to overcome or ameliorate at least one of the disadvantages of the prior art, or to provide a useful alternative.

According to a first aspect of the invention there is provided a Human Machine Interface (HMI) including:

a display page including a plurality of display page elements;

a data source manager including a plurality of data source components; and a binding engine which transfers data and commands between the data source components and the display page elements.

Preferably, the display page further includes a plurality of infrastructure components. More preferably, the data source components are server system specific data source components. Even more preferably, each display page has its own corresponding binding engine.

Preferably also, the individual data source components are shared by more than one binding engine.

In a preferred form, the display page acts as a container for the page elements that make up the display page and provides the primary user interface thread of execution. More preferably, the page elements include any one or more element that can be included in an HTML file. More preferably, the page elements include one or more of:

ActiveX controls;
VML graphics elements;
HTML elements;
HTML scriptlets; and
Java Applets.

Preferably, the display page is constructed using a mixture of standard HTML and XML tags. More preferably, the HTML describes presentation aspects of the display page—that is the page elements—while the XML tags describe what data is required for the page and how that data is to be applied to the page. Even more preferably, the infrastructure components assist with the parsing of the XML content of the display page, the delivery of data to the display page and the initiation of server commands from display page elements.

In a preferred form, at run time, the display page appears as an instance of a standard Document Object Model (DOM). More preferably, the DOM is the standard for the industry to which the HMI is applied.

Preferably, the DOM provides the destination for data provided by the binding engine. More preferably, the DOM further provides the basis for the display page scripting environment.

Preferably also, the display pages are capable of being encapsulated and re-used as encapsulated displays. More preferably, the encapsulation includes the parameterisation of any data references in the display page and the addition of properties, methods and events that allow the encapsulated display to act as a fully fledged component. Even more preferably, the encapsulated displays are embeddable. More preferably still, the encapsulated displays are linked into containing display pages.

Preferably, the display page is HTML based.

In a preferred form, the data source manager manages a plurality of server system specific data source components that encapsulate the details of delivering data to and from particular server systems. More preferably, each data source component presents data from a server system in the form of a hierarchical object model. Even more preferably, the data source manager pulls the separate data source component object models together into a unified data source object model (DSOM) that is used as the source of data for the binding engine.

Preferably also, the data source components are informed of the data requirements for a particular display page by means of a data source definition that is stored as part of an HTML/XML display page file.

In a preferred form, the server systems include one or more of a variety of different server system, a small subset of which includes the server systems provided by Honeywell Limited and that are known as:

Plantscape;
Enterprise Buildings Integrator;
TPS;
TPA;
QCS;
Uniformance;
OPC; and

HCI.

Preferably, the data binding engine takes the data provided by the data source object model and applies it to the display page. More preferably, the data binding engine takes the data provided by the data source object model and applies it to the display page in a way defined by binding definitions contained in the HTML/L display page. Even more preferably, each display element that requires data has an associated binding definition that defines what data is required for the element and how it is to be applied to the element.

Preferably also, the data binding engine is able to bind data to any property of the DOM. More preferably, the DOM includes the body element and any container elements that are used to organise other elements on the display page. More preferably, the binding engine uses transformations to perform the transfer of data from the data source object model to the display page. Even more preferably, the transformations transfer the data directly from the data source object model to the display page. It is also preferred that the transformations transforms the data as they transfer the data.

In a preferred form, the transformations include user written "OnDataChange" scripts and data driven page element "dynamics" such as rotation, path animation and break point animation. More preferably, the transformations are binary components. Even more preferably, the transformations are written using an XML syntax and script code.

In a preferred form, the binding engine executes in an apartment managed by the data source manager and transfers data from the data source object model to the display page in a very efficient manner.

The preferred embodiments of the invention provide an operator framework built around MSHTML to provide the functionality specific to the needs of an industrial control system. Additionally, it has been found that these embodiments, using MSHTML as the underlying rendering engine, provide a flexible, extensible architecture for the provision of real-time process data to a state-of-the-art user interface. That is, the preferred embodiments make use of synergies that are possible from the interaction between the operator framework and the rendering engine. Again, while the embodiments make use of the MSHTML browser software, other browser techniques would be equally applicable.

DETAILED DESCRIPTION OF THE PREFERRED EMBODIMENTS

Glossary of Terms

Figure 1:
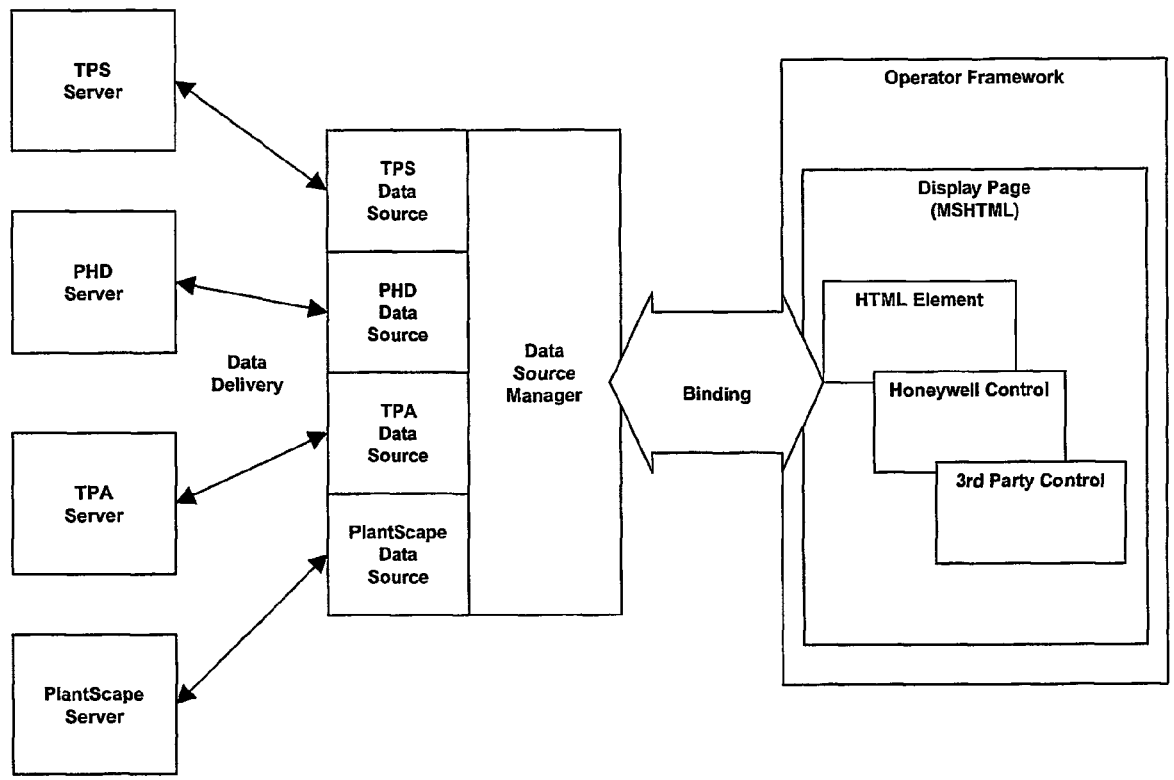
FIG. 1 is a schematic overview of the architecture according to the invention.

ActiveX control: a reusable software component exposing its functionality through COM interfaces. ActiveX controls cannot be run alone and must be loaded into a control container such as Microsoft Internet Explorer.

DHTML: Dynamic HTML.

DOM: Document Object Model. Industry-standard object model for HTML scripting.

Hendrix: The trademark used to identify the common architecture for the HMI systems developed by Honeywell Limited and which is applied to the embodiments of the invention described in this specification and marketed by Honeywell Limited and its associated entities.

HMI: Human-machine interface.

HSC: Honeywell Software Center.

HTML: Hyper-text Markup Language.

MSHTML: Microsoft-supplied HTML rendering-engine component.

WWW: World-wide web.

XML: Extensible Markup Language.

Binding A particular mapping from a binding source to a binding target.

Transformation A component supplied to the binding engine to transform data as it is transferred from the data source object model to the display page.

Binding Definition The definition of how to map data from the data source object model on to the DOM. It is a collection of individual bindings.

Binding Engine The component that maps data from a binding source on to a binding target.

CLSID Class ID Unique identifier for a COM object.

COM Component Object Model. Microsoft-defined standard for binary interoperability of components.

CSS Cascading Style Sheet.

Data Reference A hierarchical name that refers to an object or property in the data source object model.

Data Source A server system specific component that communicates with the server system and provides the data source object model to the binding engine.

Data Source Connector The server system specific component on the display page that connects the display page to the data source manager.

Data Source Definition The server system specific definition of the data required by the display page. This definition is understood by the data source and implicitly defines the shape and size of the data source object model.

Data Source Object Model An Automation object model containing data delivered from the server system. It is the source of data for the binding engine.

Data Source Manager The component that coordinates the activity of the data source components and provides the execution environment for the binding engine.

Display Page An HTML page that contains a data source connector and one or more page elements.

DTD Document Type Definition—used by an XML parser to validate that the structure of an XML document.

HTA Hypertext Application—means of constructing a standalone application from a single HTML file.

IE5: Microsoft Internet Explorer 5.0.

Operator Framework: A user interface framework that allows an operator to interact efficiently and directly with the server system.

Page Element: An element in the display page that has properties that can act as binding targets. (includes ActiveX Controls, HTML elements).

Server System: A Honeywell system that is the ultimate source of data for a display page. These include PlantScape, TPS, OPC servers etc.

VML Vector Markup Language—Microsoft's proposal for a standard vector graphics format for the Web.

W3C: World-wide Web Consortium.

XML Scriptlet: Method used to build small, flexible COM objects through a combination of XML and script code. A scriptlet may be thought of as a COM object, complete with properties, methods, and the capability of firing events.

APP: Asynchronous Pluggable Protocol.

BHO: Browser Helper Object.

DSM: Data source manager.

MFC Microsoft Foundation Classes. This is a C++ class library mainly used for creating WIN32 applications and can be used for creating ActiveX controls.

ROT Running object table.

Server System: A Honeywell system that is the ultimate source of data for a display page. These include PlantScape, TPS, OPC servers etc.

VB: Microsoft Visual Basic.

Introduction

Some preferred embodiments of the various aspects of the present invention are described in Australian provisional patent application no PQ8087 that was filed on Jun. 9, 2000. The disclosure in that application is incorporated herein by way of cross-reference.

It should be noted that the applicant's code-name for the embodiments of the present invention is "Hendrix", and this code-name therefore appears throughout the provisional specification referred to above. While the same name is used in this specification, for the purposes of convenience and consistency, it is not intended that the invention be limited to any system having a particular trade- or code-name.

Appendices A to E in the provisional application disclose the detail of various preferred embodiments of the present invention. It will be appreciated that the various discussions of development requirements and the like should be taken in the context of specific issues related to particular products supplied by the applicant, as well as being concerned with specific embodiments presently envisaged by the applicant. Accordingly, the information in the appendices should be read as exemplary, and not restrictive of the broadest scope of the invention as described and defined in the earlier part of the provisional specification.

To fulfil the requirements of an industrial control user interface the preferred embodiments have been developed on the basis of the Hendrix architecture. In a broad form, it is a flexible, extensible architecture for the provision of real-time process data to a state-of-the-art user interface, using MSHTML as the underlying rendering engine.

The Hendrix architecture provides a user interface that is suited to the demands and challenges of the next decade and which is designed to harness key industry standard technologies in an open, adaptable, architecture that facilitates the technological convergence of disparate HMI products. Some important technical features of the Hendrix architecture, as exemplified in the preferred embodiments, follow.

Open display page architecture—the Hendrix architecture separates the provision of data and server specific user interactions from the implementation of individual page elements. The only real assumption made about a page element is that it is part of the HTML display page and accessible via the Document Object Model.

The provision of data to page elements and the association of server specific user interactions with page elements is handled by the Hendrix architecture. This has the important effect of widening the set of HMI page elements to include anything that can appear in an HTML page.

A further effect of this architecture is that Honeywell page elements are more easily reused in contexts outside of the Honeywell HMI for which they were originally conceived by virtue of the fact that they do not include any server specific implementation. These contexts include, for example, other Honeywell HMIs and non-Honeywell applications.

Choice of runtime user environments—the architecture offers a choice of runtime user environments, reflecting the need for both controlled and casual access to process data. The first environment is a robust, secure operator environment, satisfying the distinctive requirements of industrial control user interfaces. The second is a web browser environment in which the user treats display pages as they would any other web page. Both environments utilize commodity third-party rendering engines to display process data.

Open, extensible file format—the Hendrix architecture centres on a standards-based file format, using HTML as its foundation. The file format conforms completely to HTML standards, allowing display pages to be rendered by a third-party browser. In addition, the ubiquitous nature of the file format allows it to be edited in third party editing tools, in order to apply specialised functionality to display pages, such as complex path animation.

Component-based architecture—the architecture is entirely component-based. It consists of both common components reusable by all Hendrix implementations, and server-specific components developed as part of each Hendrix implementation.

Data delivery from multiple sources—the architecture is designed to accommodate the delivery of data from multiple Honeywell and other server systems to a single display.

Single authoring tool, customisable for specific server needs—the architecture does not dictate how display pages are authored, provided they comply with the Hendrix file format standard. In the long term, and with the development of third-party tools, those tools should be sufficiently customisable to render them appropriate to this role. In the short-term, however, the preferred embodiments rely upon the specific requirements of Honeywell industrial control systems and require a proprietary authoring tool. This tool utilises commodity third-party HTML editing components where appropriate. It is also extensible and customisable, such that it can meet the requirements of each server for which Hendrix is implemented.

These features are schematically represented in FIG. 1. Note that this figure does not show all components of the Hendrix architecture and is intended to only provide an overview. Issues such as the binding of data from the server data source to HTML data, and the actual delivery of data, are discussed elsewhere in this specification.

It is worth noting that the architecture does not necessarily dictate that all servers be capable of supplying remote data to their corresponding data sources. Some embodiments include one or more servers that satisfy themselves with server and middle tier (the data source manager and components) on a single machine. It will be appreciated that these embodiments still fall within the broader Hendrix architecture. Furthermore, the architecture provides, in some embodiments, remoting facilities to those components which require it.

The preferred embodiments are designed to provide users with two ways to view and control plant information: the operator environment, designed primarily for security and reliability, and the web browser environment, where universal, flexible, secure data access is the prime concern. The operator environment is aimed primarily at operators, and is intended to provide a framework tuned to their needs, as follows:

- Framework screen artifacts (menus, toolbars, command zone, alarm zone, etc.) are specific to the server system to which the framework is connected.
- Page navigation is simple and name-based (i.e. full URLs are not required for page navigation).
- Provides explicit control of the connection to the server, able to specify screen update rates, connection types, and so on.
- Guaranteed view of data via persistent alarm line and status line, if required.
- Robust in the face of page failure badly-behaved controls cannot compromise the operator framework.
- Fast automatic fail over in redundant systems.
- Able to be tailored to restrict operator's capabilities (e.g. prevent desktop access, prevent shutdown, full screen lock, SafeView, operator keyboard, etc).
- Secure access to control of process parameters.

Figure 2:
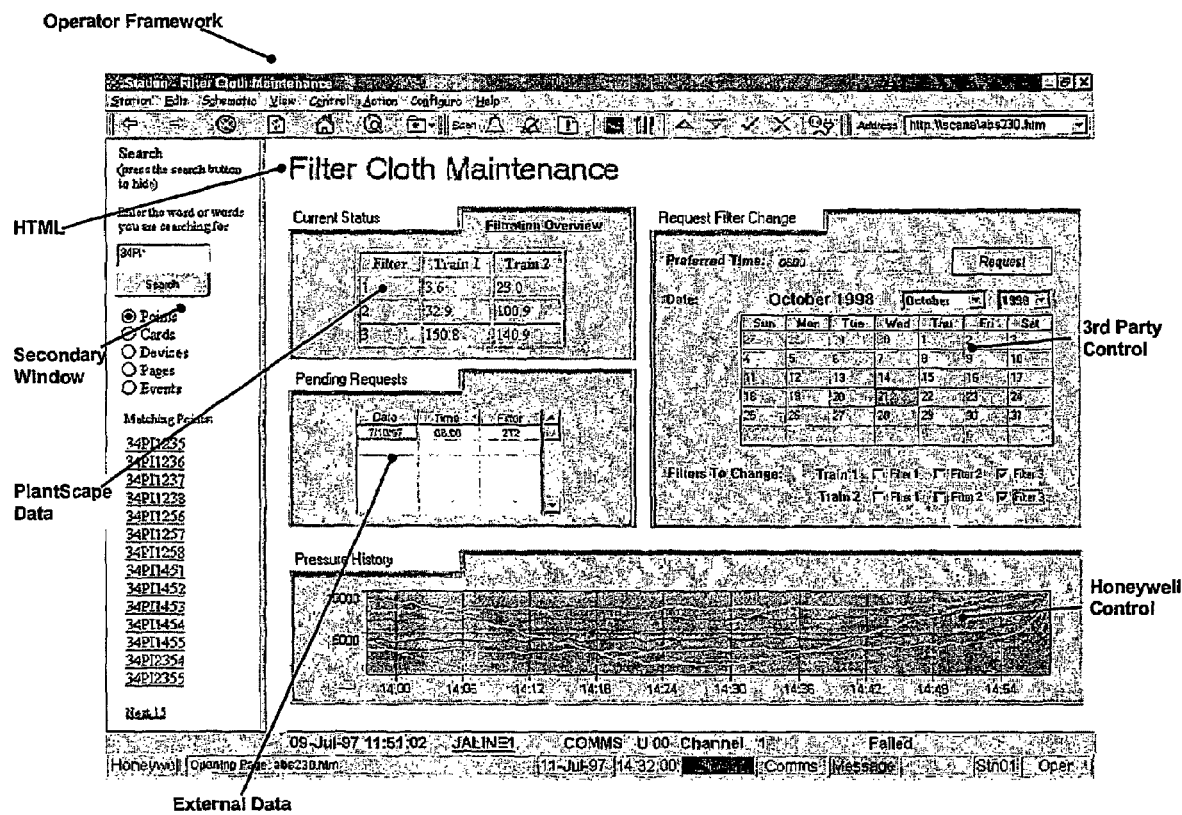
FIG. 2 is a schematic representation of an operator runtime environment of one embodiment of the invention.

The browser environment is aimed primarily at managers, engineers and process analysts, and is intended to provide a more regular web experience:

- Navigation is via the normal hyperlinking mechanism, that is, fall URLs are required for page navigation.
- Connections to servers are implicitly created by "surfing" to a server. Connections use default parameters for things like update rates, connection types, and so on.
- A user has the ability to easily "surf" from system to system.
- A minimal user interface is, in some embodiments, provided—depending on the system—for issuing commands. This user interface is not persistent and comes and goes with the page.
- Server connections are cached (for a limited time) so that security levels are able to be maintained across pages.
- Page URLs are selectively saved in browser favourites.
- Menu and toolbars are the browser's menu and toolbars.
- Controls on pages facilitate the control of plant data, as well as supplying context menus for issuing commands.
- Fail over is not automatic in redundant systems The operator runtime environment, in the context of the Hendrix architecture, takes many forms in the different embodiments. These forms depend on the specific market and user requirements of each server type. For example, in one embodiment the runtime environment for one server consist of a single framework, complete with menus, toolbar and alarm zone. However, for another server it is a collection of display pages, organized on the screen through the use of a desktop management framework (e.g. SafeView). It is important to point out that in terms of the Hendrix architecture, these frameworks are identical. Data and commands are supplied to and from the framework in an identical manner, and display page management is the same. A thin layer differentiates the frameworks for different markets, but both systems fit into the Hendrix concept of the "operator framework". By way of example, one embodiment of the invention provides an operator runtime environment as illustrated in FIG. 2. This is a PlantScape Hendrix implementation. However, in other embodiments use is not necessarily made of a PlantScape control but, rather, another Hendrix-compliant system. In this way Hendrix inherently provides a level of interoperability and convergence amongst Honeywell HMIs. Note also that there is a distinction between the behaviour of Hendrix-compliant Honeywell controls and third-party controls. While these third-party controls are fully integrated into the Hendrix environment, they often do not possess some of the advanced functionality of Honeywell controls, such as quality indication. This additional functionality is provided by the architecture of the invention, in that appropriate configuration Hendrix supplied controls is undertaken to complement the existing third party controls.

In other embodiments use is made of an alternative operator runtime environment, consisting of multiple display windows, positioned on screen through the use of desktop management software. Importantly both these runtime frameworks are equally valid Hendrix implementations. In fact, the invention was designed with alternative runtime frameworks in mind, as it recognizes that different market requirements require different user interface frameworks for different server products. This is one of the strengths of invention—that is allows the same underlying architecture to be used to produce extremely flexible, market-specific, user interfaces. This flexibility extends all the way to the web browser environment. In a Hendrix-based system, the web browser environment is able to display the same pages as those shown in, say, FIG. 2, with live data updates. The preferred embodiments thus deliver the ability to view process data in a web browser.

Figure 3:
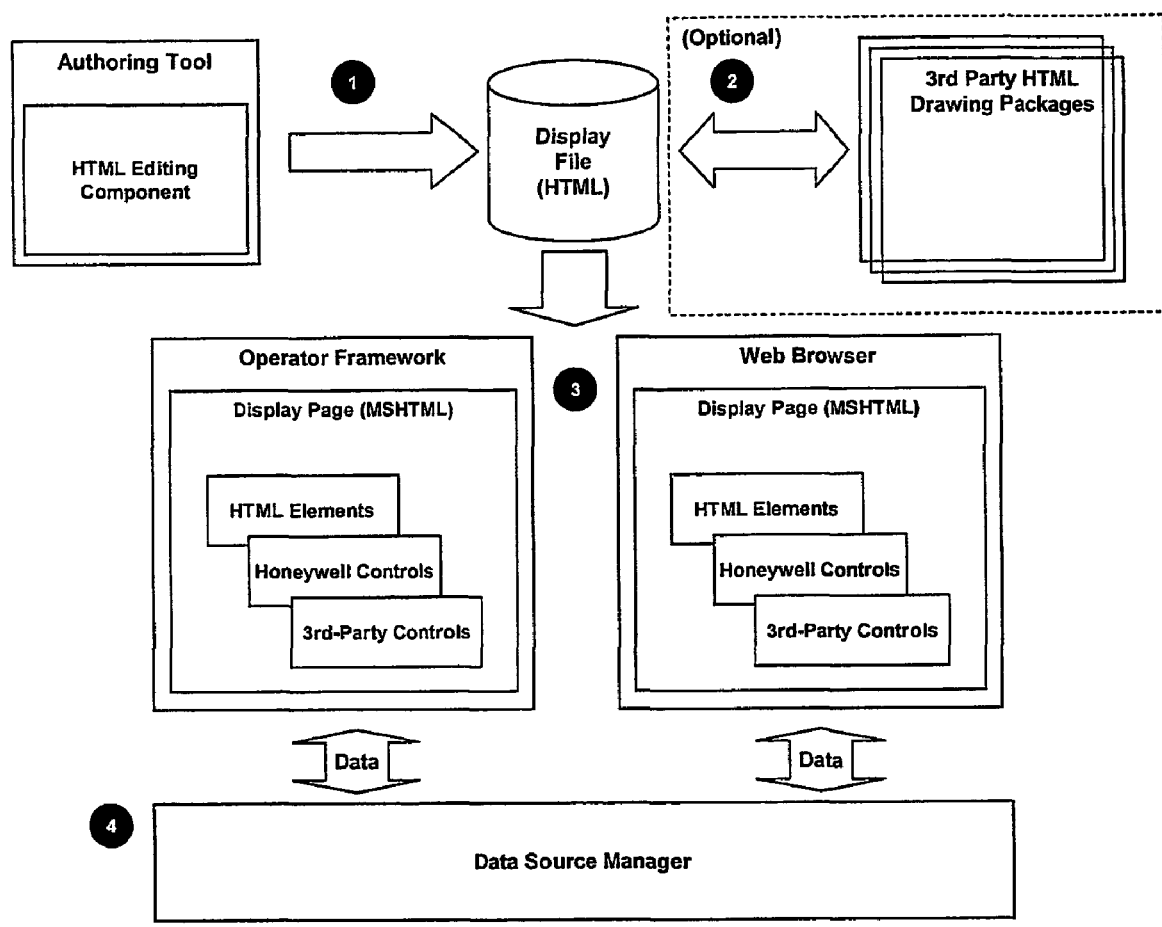
FIG. 3 is a schematic overview of the display authoring that is utilised in preferred embodiments of the invention.

FIG. 3 illustrates an overview of the display authoring that is utilised by the invention. The key points to note are:

1. Displays are authored in a single, common authoring tool, and saved as standard HTML files. The definitions for the retrieval of data from various servers are saved in the file by the authoring tool.
2. Users, where enabled, have the ability to add functionality to displays using commodity third-party HTML authoring packages.
3. The display is then viewed, in either an operator environment or in a web browser. In both environments, the display behaves the same, with live data updates from the servers of interest.
4. The data source manager—refer to FIG. 1—through server-specific components, manages the real-time retrieval of data from the servers of interest, and supplies this data to the displays on the client.

Figure 4:
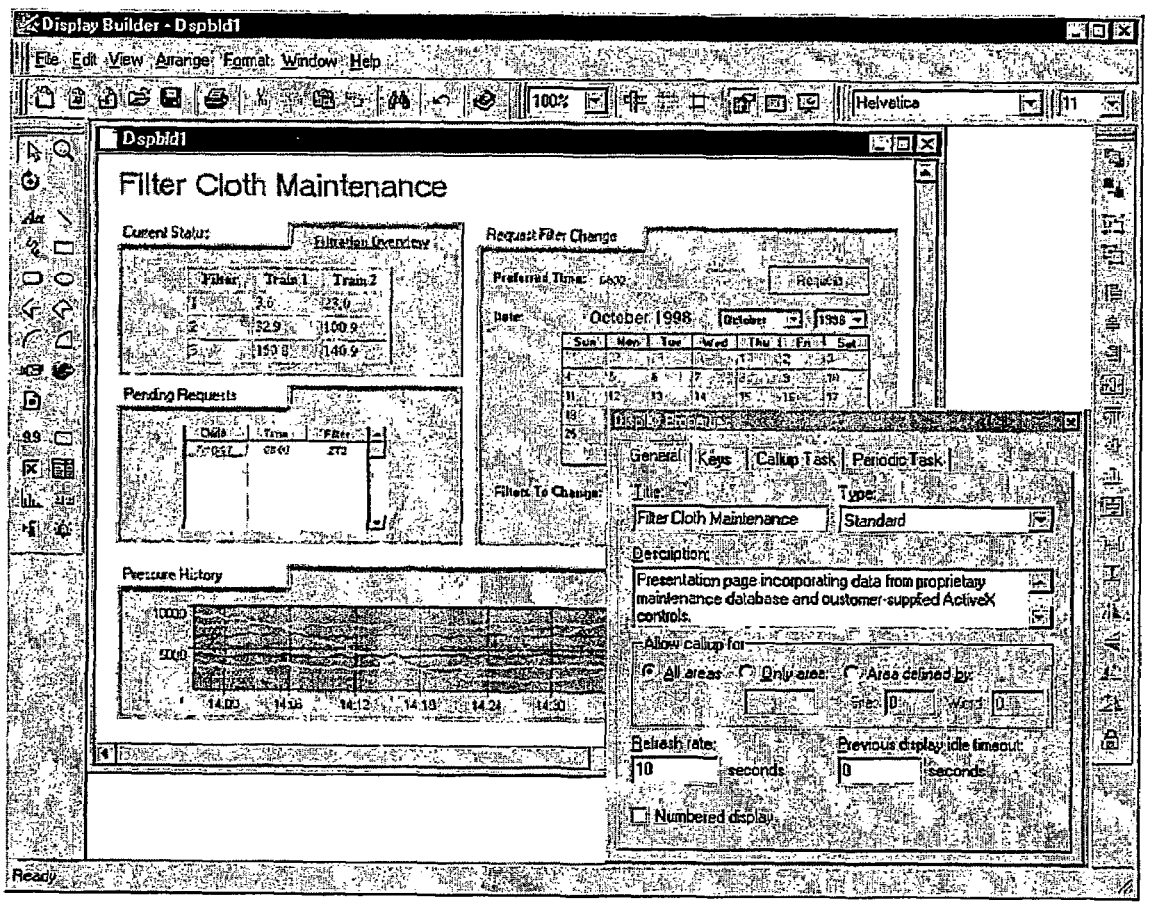
FIG. 4 is a schematic view of the authoring environment provided by one embodiment of the invention.
Figure 5:
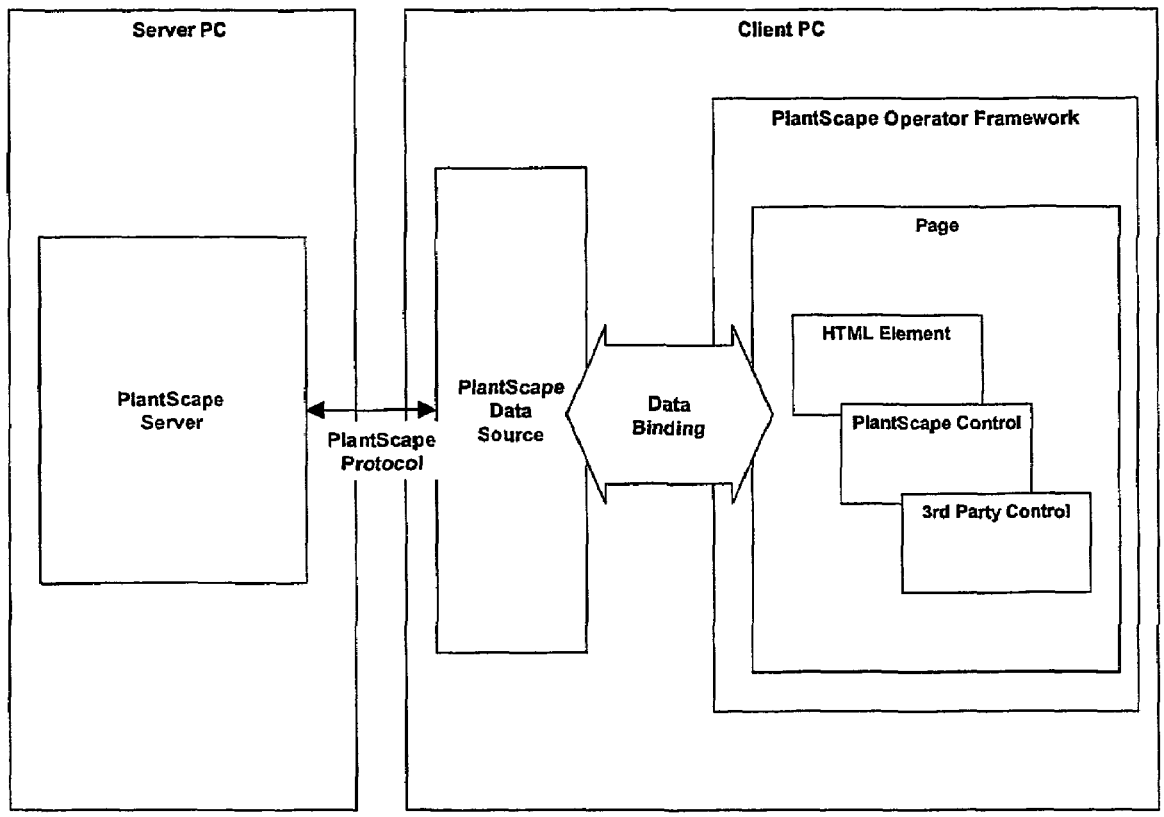
FIG. 5 is a schematic view of the PlantScape implementation scenario for a Client PC such as a Client PC having a processor and computer readable media provided by an embodiment of the invention.
Figure 6:
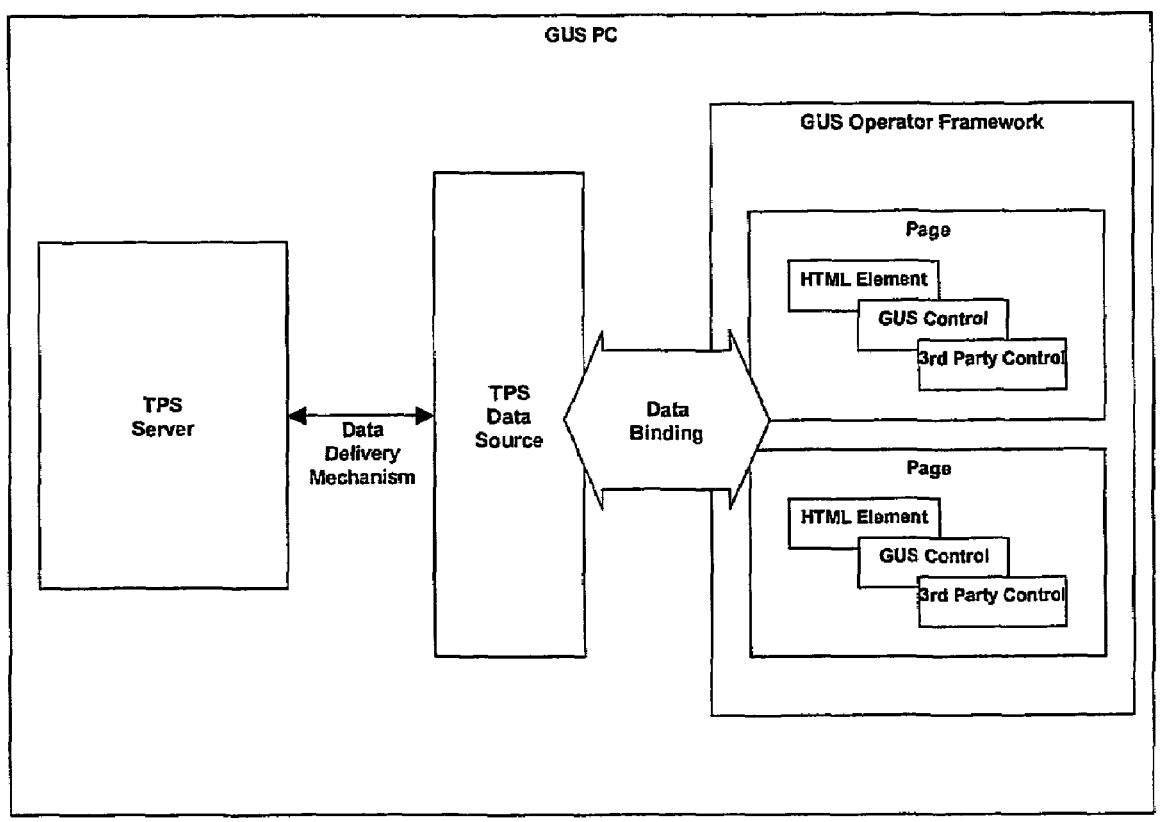
FIG. 6 is a schematic view of the TPS implementation scenario provided by an embodiment of the invention.
Figure 7:
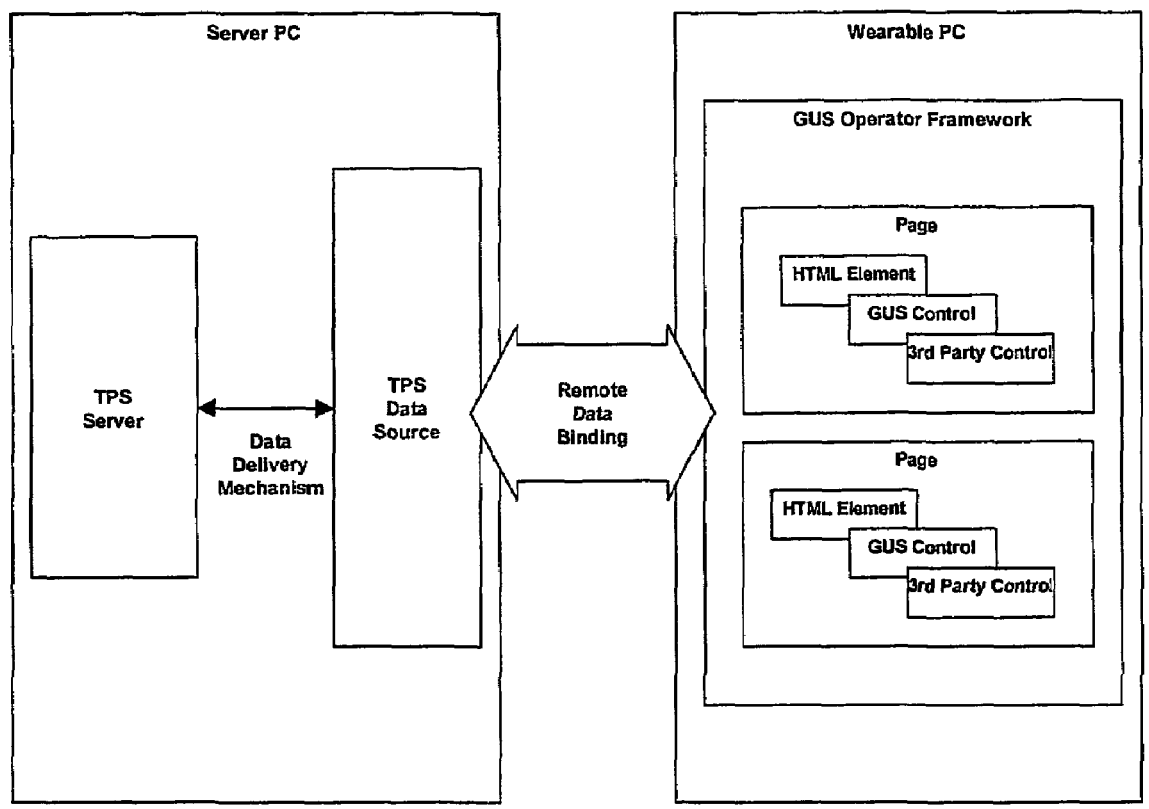
FIG. 7 is a schematic view of the TPS wearable computer remote client scenario provided by an embodiment of the invention.
Figure 8:
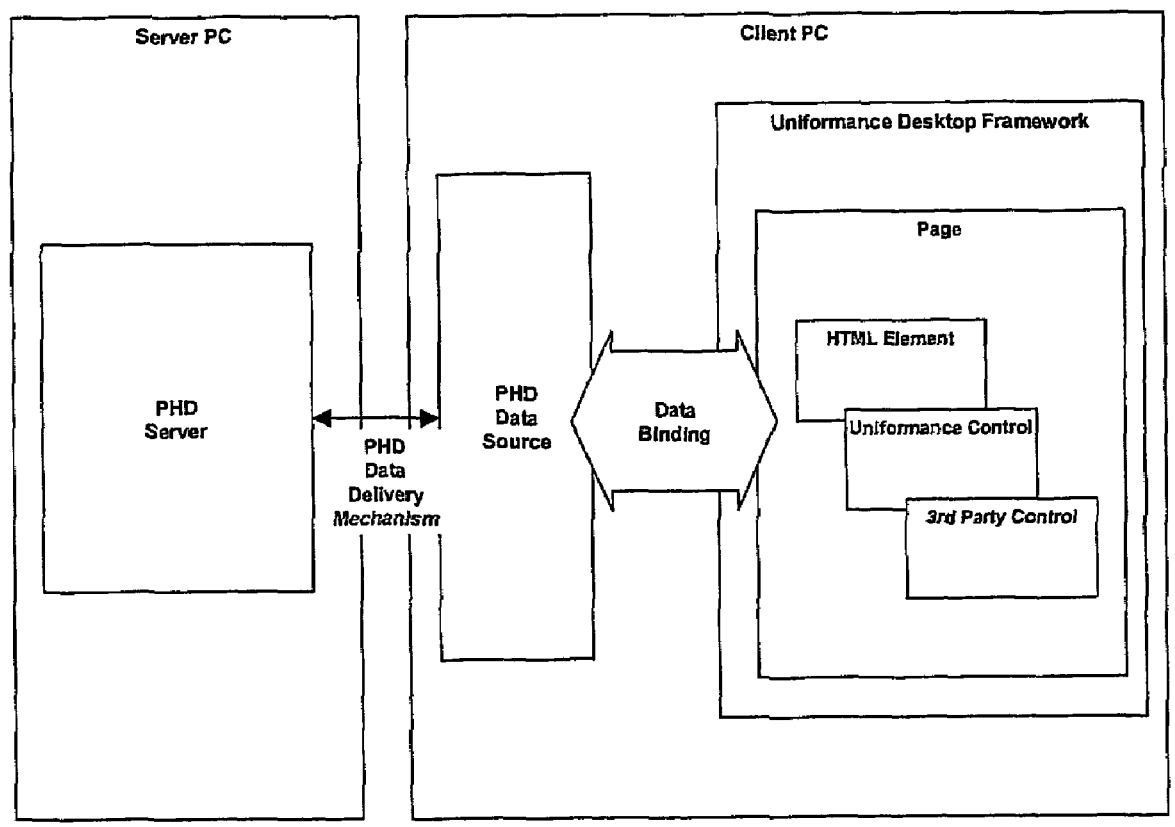
FIG. 8 is a schematic view of the HiSpec implementation scenario provided by an embodiment of the invention.
Figure 9:
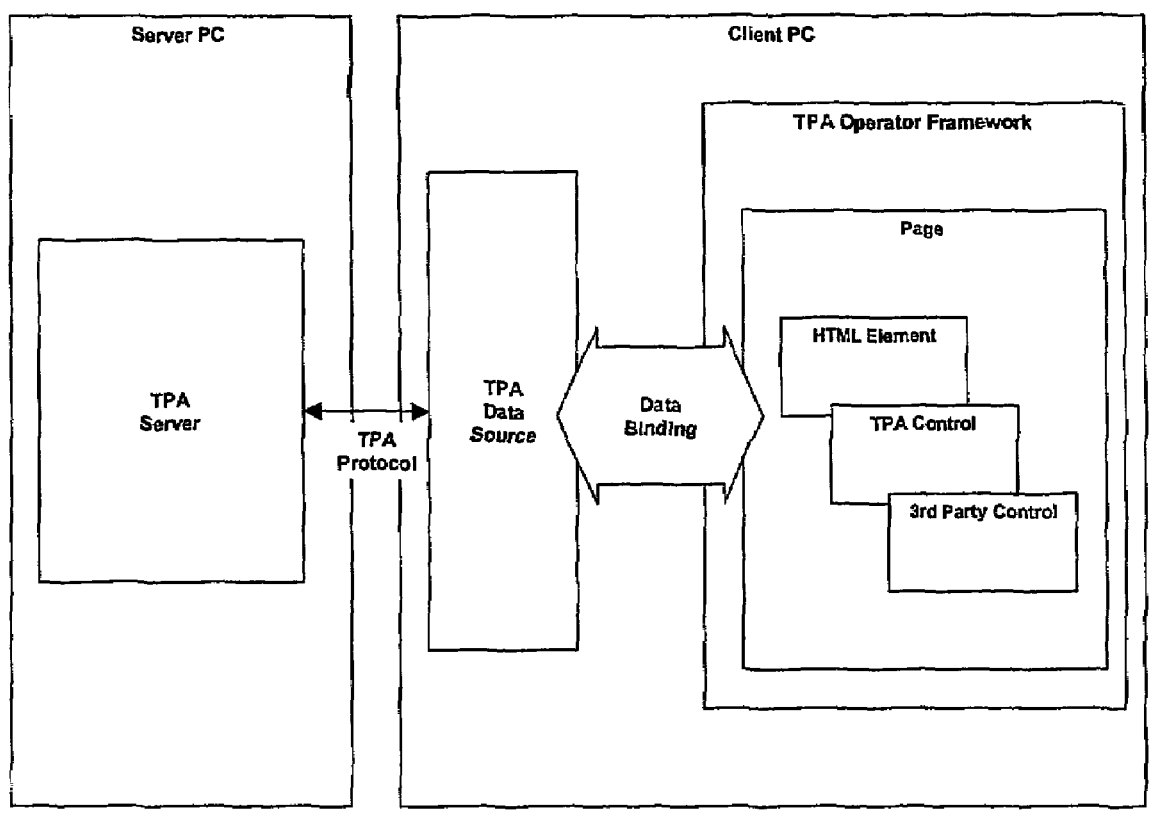
FIG. 9 is a schematic view of the TPA implementation scenario provided by an embodiment of the invention.
Figure 10:
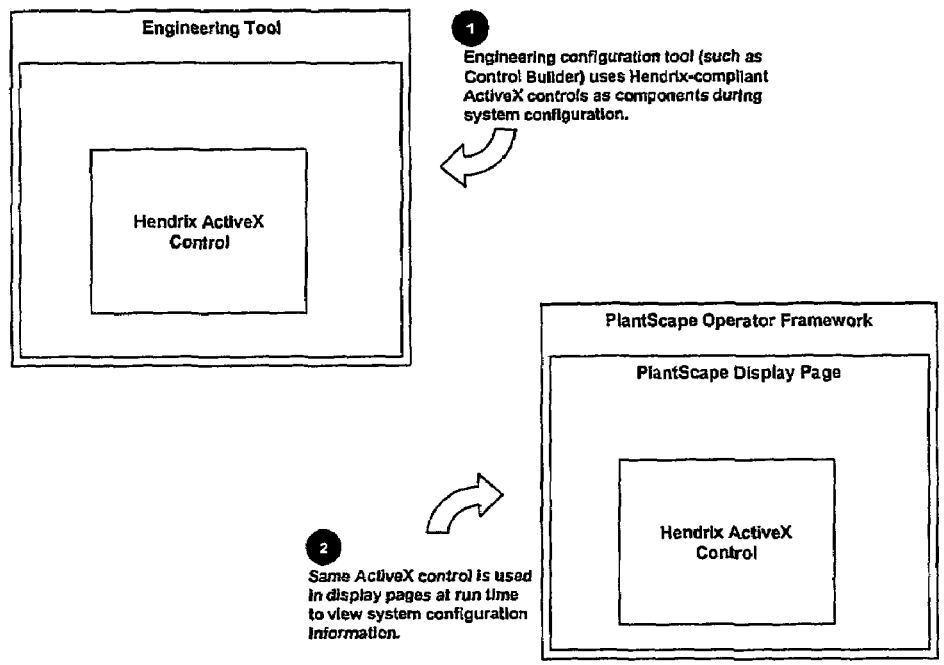
FIG. 10 is a schematic view of the reuse of configuration components provided by an embodiment of the invention.
Figure 11:
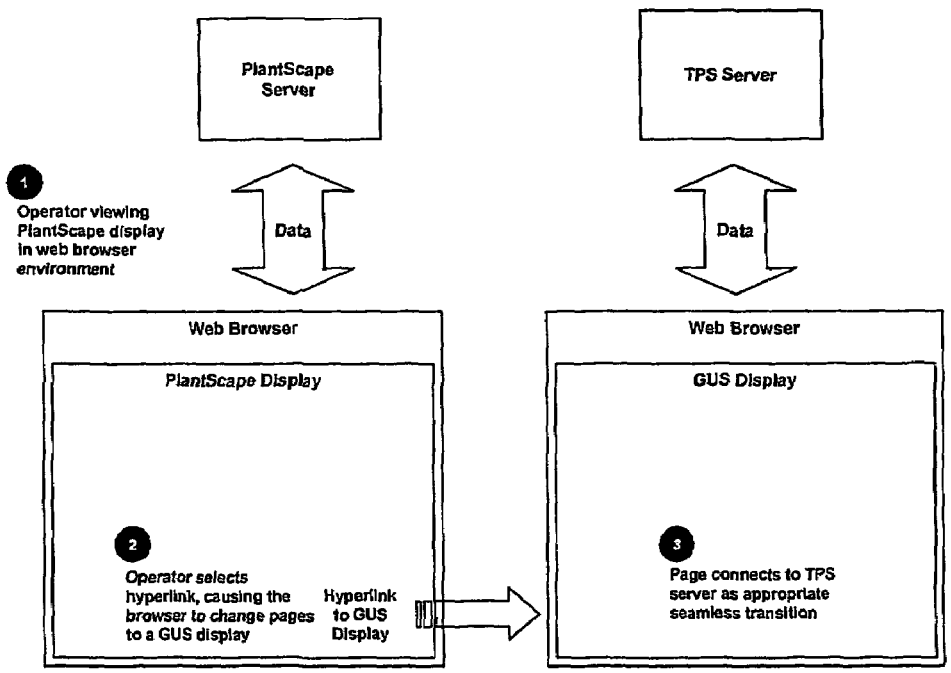
FIG. 11 is a schematic view of the seamless transition between systems provided by an embodiment of the invention.

This presumes a single authoring tool, with add-in components, for all systems in the embodiment to allow it to configure data for the various systems. In other embodiments, however, more than one authoring tool is used. FIG. 4 illustrates, by way of example, an authoring environment that is provided in one of the embodiments of the invention.

It should be noted from FIG. 4 that the builder requires the ability to configure server-specific data access. The Hendrix HMI program allows the use of a single builder for industrial HMI products. In some embodiments, this builder is composed of server-specific components which allow this data configuration to take place. These components also allow the builder to be aware of issues such as server redundancy, data definitions, and server connection details.

The preferred authoring tool is based around commodity third-party components, such as an HTML rendering engine for true WYSIWYG functionality. In other embodiments, however, use is made of commodity authoring packages that are sufficiently customisable to provide all the authoring functionality for Hendrix systems, and for the entire authoring tool to be a commodity item.

FIGS. 5 to 11 illustrate various implementations of the Hendrix architecture, and scenarios in which those implementations are used. It is important to note that these scenarios serve to illustrate the area of interoperability between systems. This interoperability takes place on a number of levels:

At the control level, the interoperability between system controls is an inherit feature of the architecture provided by the preferred embodiments of the invention. The architecture fully supports binding process data to third-party controls, so by inference any Hendrix HMI supports controls from other Hendrix systems. In addition, controls built to be aware of the Hendrix architecture will be even further integrated into any Hendrix-based operator HMI.

At the runtime level, the architecture fully supports the integration of data from multiple data sources. Data from multiple HMIs is delivered to a single display page, resulting in excellent interoperability between systems.

At the connection level, the ability to establish a connection to a new server "on the fly" means the architecture provides a seamless transition between systems for both the casual user and the operator.

Another important point that is highlighted by the scenarios of FIGS. 5 to 11 is the degree of commonality between them. The Data Binding process common to all scenarios, for example, is provided by a generic binding engine component that is useable in any Hendrix HMI system. With such a binding engine implemented it will become available to all Hendrix implementers. Thus the Hendrix architecture delivers one of the most significant goals of HMI convergence and of component-based architectures in general: software reuse at the binary level.

It will be apparent to the skilled addressee, from the teaching herein, that there are any number of user scenarios involving interoperability between different Hendrix implementations. The main point to make is that such scenarios are possible, and facilitated by the Hendrix architecture.

Benefits Provided by the Preferred Embodiments

The architecture provided by the invention and as manifest in the preferred embodiments, offers a large number of benefits to the operator and the designer of the systems. These benefits are at both a strategic and a technological level and can be broadly categorized into five main types:
 1. Benefits arising from the way the embodiments use commodity third-party technologies.
 2. Benefits arising from the use of an open, industry-standard file format.
 3. Benefits associated with Hendrix data delivery and data integration mechanisms.
 4. Strategic benefits.
 5. Benefits associated with "future-proofing" the industrial operator HMI. These five types will be considered in turn and in more detail below.

Use of Commodity Third-Party Technologies

The architecture of the preferred embodiments, the Hendrix architecture, relies on commodity third-party technologies for a number of its core mechanisms. Where appropriate, these technologies and components provide functionality in areas which are not the core business of the system designer. This allows the designer to focus on the areas where they are able to add the most value, rather than trying to compete in areas that are not necessarily within their core competencies. The benefits offered by these technologies include:

Casual access to process data via a web browser. This capability is important for non-operator users who do not wish, or who are unable, to install fat HMI client software on their machines. An important aspect of this capability is the ability to view the same display from a process environment in a web browser, not just the ability to publish process data on the web.

Unmatched internationalisation features. With the combination of Internet Explorer 5.0 and Windows 2000, a Hendrix HMI is able to supply far richer internationalisation features than those currently available in existing HMI systems, such as dynamic language switching, changing language mid-line, and rich third-party internationalisation tools.

State of the art graphics rendering. The rendering engine provided by MSHTML is one of the best available, functionally more capable than any existing product, and likely to continue to improve as the internet expands. Its animation capabilities and ability to render highly-demanding images such as 3D graphics, will prove difficult to match in the coming decade. This is more of an advantage in a non-console operator environment. The console operator environment is an area where the elements of the display must be as non-distracting as possible, allowing for operators to carry out their normal pattern-recognition and action tasks. One example of the application for 3D rendering would be visualisation of blast furnace arrays and the displaying of hot spots in the furnace in 3D. [Note that "advanced graphics rendering" should not be seen as limited to such advanced functionality as 3D rendering. The rendering capabilities of MSHTML include the ability to render different graphics formats, such as JPG and GIF files, and any future graphics formats that come available.]

Easy display deployment. Hendrix systems allow leverage to be gained from standard deployment mechanisms available to browsers, which are becoming richer as the industry progresses. An example is the 7/24 availability (7 days a week, 24 hours a day) demanded in modern web servers, which now provide advanced display replication capabilities to meet these demands.

User-definable operator frameworks. Technologies such as Microsoft's Hypertext Application (HTA) technology facilitate the development of user-definable operator frameworks, which are accommodated within the Hendrix architecture. This capability, while primarily intended from use by the designer of the architecture, is in some embodiments also provided to the users or customers of the system.

Easy generation of displays dynamically. Standard web technologies such as Active Server Pages can be used to generate displays on the fly. Depending on different requirements such as operator capabilities (high-contrast displays for some operators, for example), or daily activities (different displays to reflect different schedules on an oil pipeline) can result in different displays being built on the server and sent to the client. Other examples include the ability to generate system management displays dynamically using standard mechanisms.

Ability to integrate with standard value-add offerings for internet products, such as e-mail integration objects, transaction components, and messaging components, that come as standard parts of state of the art web server products.

Industry-Standard File Format

The preferred embodiments are centred around an open, extensible, industry-standard file format. Particularly, use is made of a file format in as standard an HTML representation as possible, thus reaping the most benefits from the alignment with industry standards. The use of this file format brings a number of benefits, including:

- Third-party authoring tool options. The use of a standard file format results in multiple options for authoring tools, particularly in the area of round-tripping displays. Where a designer's standard authoring tool does not offer the capabilities required by a particular customer, such as complex path animation, this functionality is supplied by editing the Hendrix display page in a third-party HTML editing tool. The ability to edit a designer's display in a third-party authoring tool offers unprecedented flexibility to the user of the system.
- Leveraging of existing knowledge. Using both an industry-standard scripting model and industry-standard file format means customers are able to gain leverage from the rapidly growing pool of expertise in web authoring, graphic design, and HTML scripting to produce high-quality process displays. Users of the system provided by the invention are able to selectively, and as required, use their favourite graphic design team to design their displays, rather than relying on the overall system designer for their look and feel.
- The use of a common file format facilitates re-use of displays between different systems, thereby helping to protect a user's intellectual property investment.
- Display pages are machine-searchable and human-readable. This aspect of the Hendrix architecture has a number of benefits, including:
  - The ability to facilitate automated cataloguing and searching of displays by customer systems, software applications provided by the provider of the system, and third-party tools.
  - Simple text search and replace functionality external to the builder itself.
  - Configuration management: the text-based nature of the file format renders it suitable for use in configuration management systems.
  - Custom manufacturing of standard system displays prior to shipping.
  - Ability to preserve user additions to the system displays through the process of an upgrade—customisations of system displays can be positioned along the lines of a macro that alters the system displays, rather than modifications that must be performed on each revision of the displays.
- Easier conversion to/from industry standard formats (for example, AutoCAD, PowerPoint) into system displays. In many industries, displays are first created in AutoCAD, and then have to be transformed to proprietary formats. The adoption of HTML/VML as the file format makes this conversion simple.
- Powerful template mechanism through the use of Cascading Style Sheets (CSS). The CSS mechanism provides users of the embodiments with the capability to apply style to entire suites of display pages. Examples of this functionality includes:
  - Changing background watermark for an entire set of system displays.
  - Updating one or more icons used on every display to reflect changed company logo.
  - Choice of colours to reflect particular customer and/or operator requirements, applied across the entire set of displays.
  - On a ship system, the ability to supply full-colour displays by day, and red-on-black by night.
  - Altering displays according to operator requirements, such as colour blindness.
- Ability to add user-definable structured data to display pages. Current standard for this capability is through the use of XML. A user is in a position to add customer-specific fields that track changes made to that display. This structured data is usually stored in the file and made available via scripting. This functionality is immediately accessible by the user simply through the choice of Hendrix file format. With a proprietary format, the system designer or operator would be required to implement this functionality on a case-by-case basis.
- The industry-standard file format protects customer intellectual property against technological change. With a proprietary format, the operator is responsible for migration and incompatibility issues when new file formats are adopted. These issues still exist in the case of HTML, but the user base of this file format is far larger. While the problem is not completely removed, the risk of inadvertence is reduced as the number of minds made aware of the issue is far larger.
- Additional enhancements to web file format standards are delivered for free. Examples of this support—which will be handled by the MSHTML rendering engine—include Scalable Vector Graphics (SVG) from the W3C, and Extensible 3D (X3D) from the Web3D Consortium.

Data Deliver aid Integration

The Hendrix architecture is designed for rich data integration capabilities, which bring with them the following benefits:

- Ability to integrate data from multiple operator or provider systems on a single display.
- Facilitation of remote operation. The capability of remote data binding realises the possibility of a thin-client architecture on every system. The Hendrix client is then completely scalable, and suited for environments from hand-held PC devices, through to wearable computers produced by HTC, all the way to workstations and servers. The architecture expands the reach of the user interface like no existing HMI.
- Seamless integration of foreign data sources via the standard HTML data binding mechanism. Information from Oracle, SQL server, or even structured data in the form of XML is incorporated into the page, as required for the particular application. Foreign data is used in some embodiments to drive some properties of an object on a page, while in other embodiments use is made also of process data. No ActiveX controls are required for this data binding—it takes place natively within the engine itself—and can be bound directly to HTML elements such as tables.
- Better integration between the operator HMI and other business systems. Business systems are undoubtedly moving towards greater integration with the web, which brings the Hendrix HMI closer to those systems. The inherent web integration of the architecture, along with native HTML data delivery and data binding, provide a rich means for integrating business system information—such as order information in a manufacturing facility, or web-based corrective action applications—into the operator BMI.

Another related aspect is the trend amongst device manufacturers to provide the ability to configure their devices (such as terminal servers or printers) using web-based user interfaces. The preferred embodiments allow the user to configure all the devices in their system through a single user interface.

Future-Proofing

The Hendrix architecture is designed to protect the HMI from technological change, placing it in a good position to weather changes in the future and thus extending its shelf-life. The term "future-proof" is, of course, a misnomer. No product is able to insure itself against future technological change, no matter how advanced it may be, unless it is able to continually evolve with these changes. Some products, however, are better placed to adapt to change, by virtue of their architectures. It is in this area that Hendrix offers its advantages, as explained below.

Note also that "future-proofing" has been a promise of previous architectures, but in the past has proved to be an elusive goal. The future-proofing offered by the Hendrix architecture is more extensive than simply the use of the latest software tools, or the introduction of open systems. The Hendrix architecture is unique in several areas:

- It uses commodity third-party components (such as MSHTML) to harness the power of technological change that the internet represents. Standards change, new ones arise, and new technologies become available as the internet develops—and Hendrix is design to grow with them all. New technologies will become available almost by default, and new tools will offer capabilities beyond the scope of any one organisation's development teams.
- An operator or designer of the system of the invention has no need to develop a world-class ActiveX control container, for example, when one already exists. The Internet Explorer engine is a control container par excellence, and is guaranteed to adapt to upcoming technological developments. For example, Microsoft has already demonstrated the next-generation control capabilities slated for Visual Studio 7 (code-named "Rainier"), featuring unprecedented integration between controls and their container. This functionality is already supported by Internet Explorer 5.0, and would come for free in the architecture provided by the preferred embodiments of the invention.
- One way to view this is that whenever Microsoft raises performance expectations in its own products, any ActiveX control container of our own is expected to do the same. By using their components directly, each improvement they make instead turns into a direct benefit for the system operator and, hence the user. There is a direct flow on effect of the technology as extensive redesign is not required to incorporate the new features.
- It is component-based, and thus extremely versatile and able to adapt to change. When new system features become available (for the data binding, authoring, or rendering, for example), only the affected components need to be replaced, not the entire system.
- It adds the operator's value to precisely those areas suited to their needs, addressing requirements specific to industrial control systems, thus ensuring the viability of the operator's products in the long term. Hendrix implementations are not threatened by new user interface technologies, but assisted by them. For example, as commodity editing components and tools become available, the operator simply picks up the functionality of the authoring tool, as appropriate. With prior proprietary systems, this option is clearly not available where the equivalent functionality had to be built into the authoring tool by the operator, usually at a great cost. It is closely coupled with industry standards—not just Microsoft technologies referred to above—and is designed intentionally to be open and extensible. The standards-based nature of the architecture helps protect the architecture, with bodies such as the W3C working to ensure that internet development is an incremental and evolutionary process.

As previously mentioned, no product is future-proof. The Hendrix architecture, however, is designed to be far more adaptive to change than any existing HMI system.

The Hendrix Architecture Overview

The Hendrix architecture describes the components and relationships between them necessary to build a fully functional industrial HMI. The architecture provides the infrastructure for the run time support of HMI display pages and frameworks in which to view, navigate and interact with them.

The Hendrix architecture is an entirely component-based architecture in which each component in the architecture is a COM object. This approach means that the architecture is easily partitioned into standard components that are used in all Hendrix implementations and server specific components that must be implemented for each server system for which the Hendrix architecture will act as an HMI.

The foundation of the Hendrix architecture is Microsoft's core HTML rendering component known as MSHTML. This component forms the basis of an increasing number of Microsoft products including Internet Explorer, Outlook Express, Money98, MSDN Library, Microsoft Management Console and others. It takes the form of a reusable COM object that is available to independent software vendors, such as Honeywell, for use in third party products. The latest version of MSHTML, which forms the basis of Internet Explorer 5, is positioned by Microsoft as an application development platform to rival MEC in terms of performance and stability. In addition, the latest version of MSHTML includes many new features that are pivotal in making it suitable as a basis for an industrial HMI architecture such as the Hendrix architecture.

MSHTML provides the following HMI capabilities in the Hendrix architecture: display file parsing and rendering; ActiveX control hosting; scripting; 2D graphics primitives (VML); and multimedia and animation services.

With MSHTML as its foundation, the Hendrix architecture, as implemented in the preferred embodiments, achieves two broad goals. The first is to add the mechanisms necessary to turn MSHTML into an industrial HMI. The second is to structure these mechanisms in such a way as to facilitate convergence amongst the various operator HMI products. By adopting the Hendrix architecture the operator is able to implement a common HMI framework for its various industrial process control systems which minimise development effort, maximize interoperability of components between systems and, importantly, give customers a consistent suite of user interface tools with which to operate and manage their plants.

To turn MSHTML into an industrial HMI it is necessary to provide mechanisms for data delivery, user initiated commands, navigation, robustness and stability. These mechanisms must be available to different classes of users in user interface frameworks that reflect the needs of each class of user. The personnel that operate the system on a day to day basis require a framework with menus, toolbars and guaranteed access to alarm and status information. On the other hand, managers of the personnel need more casual access along the lines of a regular web browsing experience.

With these mechanisms in place, the Hendrix architecture allows the designer and provider of the system to concentrate on adding value to its HMI in the form of specific display page elements (typically ActiveX controls) that allow users to more effectively interact with and manage both their plant processes and the systems used to control them. The preferred embodiments of the invention also make these controls very easy to write.

Figure 12:
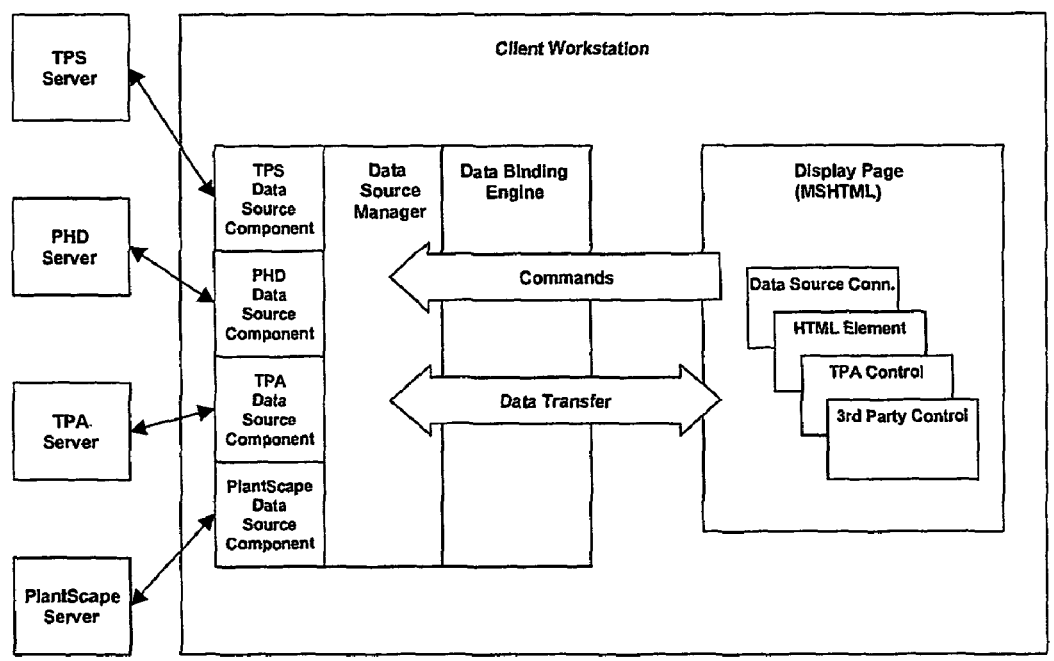
FIG. 12 is a schematic view of the general arrangement of these components in the architecture of a preferred embodiment of the invention.

The three main components in the Hendrix architecture are the MSHTML display page containing a number of display page elements and a small number of infrastructure components, the Hendrix data source manager which contains a number of server system specific data source components and the Hendrix binding engine which transfers data and commands between the data source components and the display page elements. FIG. 12 illustrates the general arrangement of these components.

Figure 13:
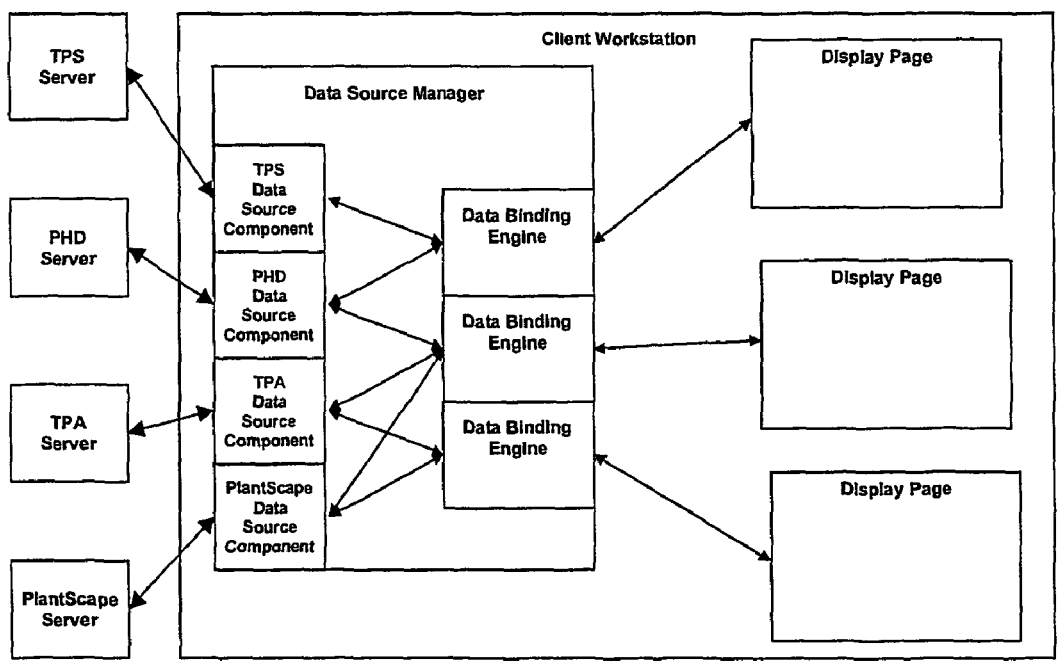
FIG. 13 is a schematic view of a data source manager as shared resource within an embodiment of the invention.

The data source manager used in the preferred embodiments is a resource shared by all display pages on the client machine and each display page has its own binding engine. Data source components are also shared by binding engines, although this need not occur in all instances. FIG. 13 illustrates a data source manager that is used in a preferred embodiment of the invention.

The MSHTML based display page acts as the container for the page elements that make up the display and provides the primary user interface thread of execution. The page elements, in some embodiments, include Honeywell ActiveX controls, third party ActiveX controls, VML graphics elements, HTML elements, HTML scriptlets, Java Applets etc. In fact, anything—control, element, or otherwise—that can be included in an HTML file counts as a page element in the Hendrix architecture.

The display page is constructed using a mixture of standard HTML and Hendrix specific XML tags. The HTML describes the presentation aspects of the display page (that is, the page elements) while the XML tags are used to describe what data is required for the page and how that data is to be applied to the page.

The display page also contains a small number of Hendrix infrastructure components that assist with the parsing of the XML content of the display page, the delivery of data to the display page and the initiation of server commands from display page elements.

At run time the display page appears as an instance of the industry standard Document Object Model (DOM). This object model provides the destination for data provided by the Hendrix data binding engine and provides the basis for the display page scripting environment.

Display pages are preferably encapsulated for reuse. This encapsulation includes the parameterisation of any data references in the display page and the addition of properties, methods and events that allow the encapsulated display to act as a fully fledged component. Encapsulated displays are usually either embedded or linked into containing display pages.

The data source manager is the component that co-ordinates the delivery of data from the various server systems to the Hendrix architecture. The data source manager manages a series of server system specific data source components that encapsulate the details of delivering data to and from particular server systems. Data source components are required for Plantscape, TPS, TPA, QCS, Uniformance, OPC and HCI. Each data source component presents data from a server system in the form of a hierarchical object model.

The data source manager pulls the separate data source component object models together into a unified data source object model that is used as the source of data for the Hendrix binding engine.

The data source components are informed of the data requirements for a particular display page by means of a data source definition that is stored as part of the HTML/XML display page file. The details of the data source definition is a data source component implementation detail. The data source definition is usually the result of a "pre-binding" mechanism that turns the human readable data references used in the display page into machine readable names that provide for more efficient delivery of data at run time or it may simply define the extra information required to deliver the required data such as update rates and the like.

Data source components are used to optionally support indirect data references where an item in the data source object model is used as a place holder for particular objects in the server system which are specified at run time. This provides a level of indirection in the data source that is used to "browse" through objects of the same type.

The preferred data binding engine takes the data provided by the data source object model and applies it to the display page. It does this in a way defined by binding definitions contained in the HTML/XML display page. Each display element that requires data has an associated binding definition that defines what data is required for the element and how it is to be applied to the element.

A key feature of the data binding engine of the preferred embodiments is that it is able to bind data to any property of the DOM. This includes the body element and any container elements that are used to organise other elements on the display page.

The architecture of the binding engine is component based and uses "transformations" to perform the transfer of data from the data source object model to the display page. These transformations allow the transfer of data directly or transform it some way as they transfer the data Examples of where transformations are used include user written "OnDataChange" scripts and data driven page element "dynamics" such as rotation, path animation and break point animation. Transformations are preferably either binary components or written using and XML syntax and script code.

The binding engine executes in an apartment managed by the data source manager and transfers data from the data source object model to the display page in a very efficient manner.

Each server system for which the Hendrix architecture is acting as an HMI has its own set of commands that a user may need to invoke. These include commands directed at the process such as "raise" and "lower" or at the server system itself such as "acknowledge alarm" and "point detail".

These server specific commands are implemented as methods on the root object of each server specific data source component. These commands are executed from page based script code or from server specific "behaviours" associated with display page elements.

In addition there are system wide commands that apply across server systems such as commands to log on to the system or change security levels. These commands are implemented as methods on the root of the unified data source object model provided by the data source manager. Again, these commands are executable from page based script code or from a behaviour associated with display page elements.

In many circumstances it is necessary to allow users to view display pages within some framework that makes the task of viewing, navigation and interacting with display pages easier and safer. Examples include the Plantscape Station framework (that provides a menu, toolbar, alarm zone, status zone, message zone and command zone), the SafeView (which provides window management for multiple displays) and the TPA framework (that allows the user to easily navigate between displays).

The Hendrix architecture itself provides a mechanism for constructing a user interface framework. This is achieved by constructing the framework as a series of display pages that manage other display pages. It is easy to construct frameworks that contain the usual user interface elements such as menus, toolbars, status lines as well as HTML constructs such as framesets. This makes the repertoire of possible frameworks very large indeed.

Hendrix based frameworks in conjunction with SafeView provide a flexible, powerful and safe means of delivering the environments needed by users to more effectively use an HMI.

Figure 14:
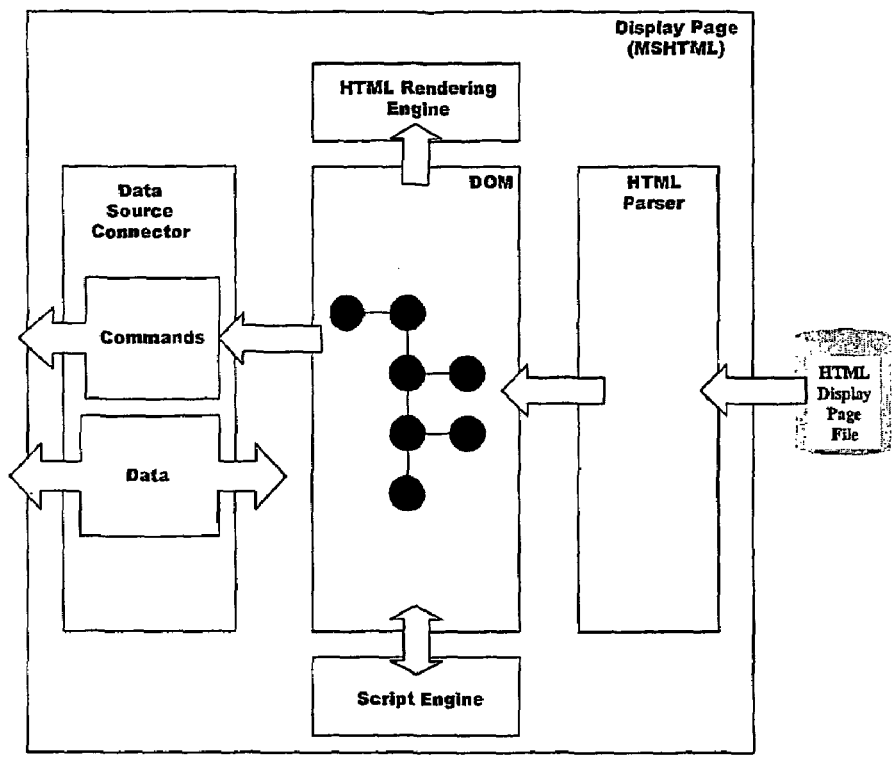
FIG. 14 is a schematic view of the display page structured used in an embodiment of the invention.

At run time a Hendrix display page is an instance of the industry standard Document Object Model (DOM). The DOM contains instances of useful display elements such as ActiveX controls, HTML elements, graphics primitives etc. The DOM is initialised from an HTML file that specifies the initial content of the display page and is created by an authoring tool such as the Honeywell Common Display Builder. An HTML parser parses the HTML file and initialises the DOM. A rendering engine then renders the DOM in a window. Hendrix uses Microsoft's MSHTML component for these functions. FIG. 14 illustrates the general arrangement of the main display page components.

Once initialised, the page is updated with data from the Hendrix data binding engine upon which the HTML rendering engine re-renders the display page so that the user sees the changes to the page (this re-rendering behaviour is what is commonly known as "Dynamic HTML" or DHTML). The flow of data between the data binding engine and the display page is typically bidirectional. Any changes made locally to the display page, by the user or by script code, are re-rendered by the rendering engine and propagated back through the data binding engine.

In addition to the presentation aspects of the display page defined using HTML there are Hendrix specific XML tags in the display page file that define the details of what data is required by the display page and how to apply that data to the display page.

The details of what data is required by the display page are contained in a series of data source definitions. There is one data source definition for each type of data source component (that is, each type of server system) from which data is required for the page. The details of the data source definition are specific to each type of data source component.

The details of how to apply the data to the page are contained in a series of binding definitions. There is one binding definition for each page element that requires data from the server system.

The display page also contains a data source connector that establishes communication with the data source manager. The data source connector also plays an important role in transferring data from the data binding engine of the preferred embodiment and in providing "named data access".

The display page contains components that assist with the parsing and processing of the XML portions of the display page file.

The display page file is completely managed by a common display builder which, in this embodiment is proprietary software developed by Honeywell. This software produces and maintains both the HTML and the XML content of the file.

The split between the HTML and XML portions of the display page file corresponds to a split between the presentation and content aspects of the display page. Since the presentation aspects of the display page are expressed in standard HTML, third party tools can manipulate the presentation to provide functionality not provided by the common display builder. Because third party tools will not understand the XML portions of the display page file the data source definition and the binding definition will remain opaque to those tools.

The immediately following description deals with the basic display page HTML/XML file format, while later description discusses the data source definition and binding definition in detail.

The following example illustrates a very simple Hendrix display page that contains a single page element.

```
    <HTML>
1       <xml:namespace ns="urn:schemas-honeywell-com:hendrix" prefix="HENDRIX"/>
2       <OBJECT ID="Data" CLSID="..."></OBJECT>
3       <OBJECT ID="HendrixExtensions" CLSID="..."></OBJECT>
4       <OBJECT ID="HendrixExtendedElement" CLSID="...">
        </OBJECT>
5       <OBJECT ID="PlantscapeCommands" CLSID="...">
        </OBJECT>
            <STYLE>
6               HENDRIX\:* {behavior: url(#HendrixExtensions)}
7                   .Hendrix {behavior: url(#HendrixExtendedElement)}
8                       .PlantscapeCommands {behavior: url(#PlantscapeCommands)}
            </STYLE>
            <BODY>
9               <SPAN ID="Alpha1" CLASS="Hendrix; PlantscapeCommands" BINDINGDEF="Alpha1BindingDef">
                </SPAN>
10              <HENDRIX:BINDINGDEF ID=
                "Alpha1BindingDef">
                    <DATA ID="DataRef1" REF="OPC.Modbus.A100.PV"/>
                    <BINDING SOURCE="DataRef1" TARGET="PageElement.InnerHTML"/>
                </HENDRIX:BINDINGDEF>
            </BODY>
11      <HENDRIX:DATASOURCEDEF ID="OPC" CLSID="DA943720-8048-11d2-8ED5-000000000000">
            <SERVER NAME="modbus">
                <GROUP UPDATEPERIOD="500">
                    <ITEM NAME="A100.PV"/>
                </GROUP>
            </SERVER>
        </HENDRIX:DATASOURCEDEF>
    </HTML>
```

The file begins with an XML namespace declaration that establishes the use of the Hendrix namespace in this file (1). This step is followed by the data source connector (2) and the two components that assist with the processing of the XML content of the page (3 and 4) and a component that implements Plantscape command behaviour (5). A STYLE block is used to associate convenient names with the infrastructure components (6,7 and 8). The body of the display page then contains a single HTML element (9). This SPAN element has a binding definition associated with it (10). This binding definition specifies that the data item OPC.Modbus.A100.PV is bound to the InnerHTML property of the SPAN element. Finally, there is a data source definition for the OPC data source component (11) that specifies the details of how to get the item A100.PV from the OPC server called Modbus.

Note that in this example there is only one data source definition in the file. In other embodiments, where the display page requires data from more than one server system, there are data source definitions for each type of server system.

The most commonly used categories of display page element are ActiveX controls, VML graphics elements and HTML elements. As mentioned elsewhere, the ActiveX controls are either or both of Honeywell or third party controls. VML graphics elements include built in simple shapes such as rectangles, lines, ellipses, arcs etc or more complex shape types. HTML elements include the full suite of normal web page elements such as DIV, SPAN, IMAGE, TABLE, INPUT, OPTION, SELECT etc.

The architecture of the invention, as provided in the preferred embodiments, allows this wide variety of display page elements to be treated equally with respect to supplying data to them from server systems. This is achieved by the binding engine assuming most of the responsibility for transferring data from the data source components to the display page elements. The display page elements simply have to offer properties to which data can be delivered. A similar situation exists with respect to server and system command behaviours. Command functionality is added to page elements by the Hendrix architecture without the behaviour having to be explicitly coded into the elements themselves.

This effective separation of presentation, content and behaviour in the Hendrix architecture means it is easy to write ActiveX controls that work well in the Hendrix architecture. Most controls do not need to worry at all about how data is supplied to them or how command behaviours are associated with them. The control designer is free to concentrate on the presentation aspects of the control which makes the task of designing controls much simpler. This also makes the system incredibly robust.

There are, however, a small number of requirements that ActiveX controls used as Hendrix page elements must meet to be fully integrated into the Hendrix architecture. These fall into two main categories: requirements that make the controls "Hendrix compatible" and requirements that make the controls "Hendrix aware".

The first requirement of Hendrix compatible controls is that they provide property change notifications if they are to write changed values back to the server system. This is because the binding engine uses these notifications to know when to send a new value back to the data source object model. This corresponds to the properties of the element being marked as [bindable] in the element's type library.

A page element property that is bindable may support optimistic binding or pessimistic binding. Optimistic binding means that the element will simply notify the binding engine that the property has changed, after which the binding engine will propagate the new value back to the binding source in the data source object model. If, for some reason, the value cannot be changed on the server system, for security reasons perhaps, the data source object model will need to notify the binding engine that the value has changed back to the previous value and have the binding engine propagate that value back to the page element.

In the case of pessimistic binding the page element will ask the binding engine if the property value can change. The binding engine forwards this request on to the binding source where security considerations etc. can be checked. If the value can be changed the page element then changes the value and notifies the binding engine. If a page element supports pessimistic binding its properties will be marked as [bindable, requestedit].

The Hendrix architecture supports both types of binding. If a property of a page element does not support either type of binding it can only be used for read only data.

The other requirement of a Hendrix compatible control that allows complete integration in the Hendrix architecture is that the control be windowless so that command behaviours are associated with the element. If the element has a window, for example an ActiveX control that does not conform to the OC96 specification, the command behaviour will not receive user input.

Note that page elements that do not meet these requirements are still usable in the Hendrix architecture, but they will suffer from the two limitations noted above.

Hendrix aware controls are controls that know about the Hendrix architecture and that use it to their advantage. An example is a trend control that knows how to interact with the data binding engine to access more historical data as the user scrolls the trend. Another example is a combobox control that directly request the delivery of its list only when the user clicks on the control to drop the list down.

Another important aspect of Hendrix aware controls is that they are designed with properties that correspond to properties on the server supplied data source object models so that the binding of data to the control is as direct as possible and hence as efficient as possible.

In short, Hendrix aware controls are the controls that work best with the Hendrix architecture. Non-Hendrix aware controls are still usable in the preferred embodiments, but may require small amounts of script code to effect full integration.

The Hendrix architecture encapsulates the mechanisms used to communicate with a server system at run time. These mechanisms include the delivery of data to the Hendrix architecture and the routing of commands back to the server system.

A Hendrix data source is a component that encapsulates a server system at run time. It consists primarily of data reference objects that encapsulate the details of delivering particular data items from the server system. The data references are organised into a data reference object model, which is used by the Hendrix data binding architecture as input. The data reference object model is also accessible by display page script code and Hendrix transformations. The data reference object model also provides the means by which commands are routed to the server system. Commands are implemented as methods on data references within the data reference object model.

The delivery of data from a server system involves many server system specific details. For this reason data sources need to be developed for each type of server system. Even within a single server system there may be different types of data items that are delivered in different ways which means data reference objects need to be developed for each type of data item in each server system.

Figure 15:
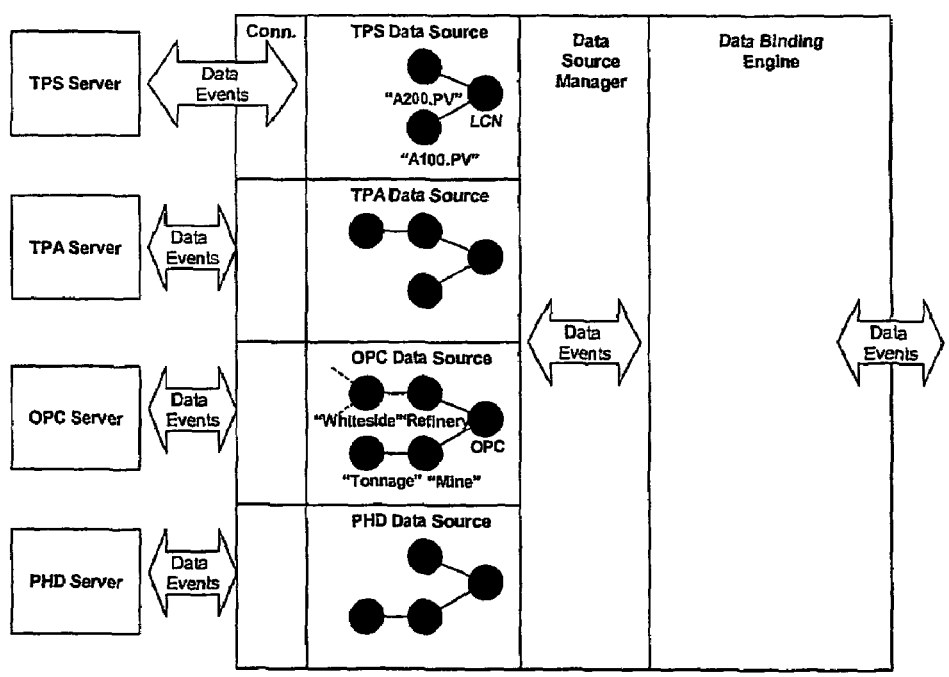
FIG. 15 is a schematic representation of the data source architecture used in a preferred embodiment of the invention.

The data source manager is the Hendrix component responsible for coordinating the delivery of the data required by display pages. It manages both the server system specific data sources and the binding engine that transfers the data from the data source components to the display page. FIG. 15 illustrates the general arrangement of these components.

When a display page is called up, the data source manager accepts URLs for the data source definitions and binding definitions from the data source connector on the display page. It parses the data source definitions and instantiates the necessary data sources. It then passes the data source definitions to the data sources so that they can construct their data reference object models. The data sources then pass references to their individual object models back to the data source manager which then makes them available to the binding engine together with the binding definitions for the page. The binding engine then binds the data references in the data reference object models to the display page according to the binding definition. The data sources are then instructed by the data source manager to begin delivering data.

A Hendrix data source implements a memory resident hierarchical data reference object model. This object model consists data reference objects. These data reference objects provide the means by which data from the underlying server system is presented to the Hendrix architecture.

A data source appears as in-process COM object to the data source manager. In order for a data source to be usable on a machine other than the server system itself it must include a mechanism for populating its object model over the network The mechanism to do so is an implementation detail of each data source.

The main task of a data source is to provide an initialisation service to the data source manager. This initialisation service allows the data source manager to pass a stream containing a data source definition to the data source. This data source definition contains the information necessary for a data source to construct and initialise its data reference object model. Once initialised, the data source returns the root of its object model to the data source manager.

The data reference object model is used as input to the Hendrix data binding engine. However, before the binding engine transfers data to the display page it needs to bind to the data references. It does this according to a binding definition associated with the display page.

Once the data source has been initialised and the binding engine has bound to its data references, the data source will be started so that it connects to the server system and begins delivering data to the data binding engine. The delivery of data is actually performed by individual data references.

When the data references are no longer required the data source is stopped and the data source closes any connections it has with the server system. The binding engine then release all data references. The data source manager will uninitialise the data source during which the data source will discard its data reference object model. The data source manager usually caches a data source in the uninitialised state for future use.

There is a one-to-one relationship between display pages and data sources. A data source will only ever be supplying data to a single display page. The one data source manager, however, is able to supply data to multiple display pages. In this case the data source manager is managing multiple data sources for multiple display pages. These multiple data source instances may make use of shared resources for communicating with the server system. This sharing of data includes the sharing of physical network connections and the consolidation of data delivery to avoid the duplicate transmission of data that is common to multiple display pages. This behaviour is a data source specific implementation detail.

A key concept in the Hendrix data delivery mechanism is that of the data reference. A data reference is an object that refers to a named data item in a server system. A data reference encapsulates the details of delivering the data to which it refers from a server system to the Hendrix architecture.

A data reference typically augments the name of the referenced data item with the additional information required to affect the delivery of the data item. This additional information includes one or more of update rates, time intervals for historical data, additional query parameters and the like.

Data references deliver data to the Hendrix architecture via property change notifications, OLE DB rowset notifications and events.

A data reference has the following basic structural elements:

1. An ID by which it is known to the Hendrix architecture.
2. An associated name from the server system namespace which identifies the data item to which the data reference refers.
3. One or more properties, OLE DB rowsets, methods and/or events that represent the referenced data item to the Hendrix architecture.
4. A set of properties that define the additional information required for the delivery of the referenced data item (also known as data delivery properties).

The ID is a read only property. The data reference ID is largely an internal name for the data reference and is rarely seen by end users.

The name is optionally a read/write property.

Since the ID of the data reference and the name to which it refers are separate properties, a data reference provides a natural form of indirection. If the associated namespace name is changed at runtime, the data reference then refers to a different data item in the server system. This runtime indirection is an optional property of data references that is difficult to implement in some cases. If so, it is easily disabled by simply making the name property read only.

The set of properties, methods and events that represent the data item to the Hendrix architecture (and can be bound to display page elements) depend on the type of the referenced data item. In many cases a single property that represents the value is all that is necessary. The value property is typically the default property on the data reference. This makes the syntax for accessing the value slightly more compact.

A slightly more complex example is provided by data items that have an associated quality indication In this case, the data reference includes a property for the value (the default property) and a property for the quality indicator.

The data delivery properties are read only or read/write properties depending on the capabilities of the server system. Again the specific set of properties required depends on the server system and the type of the referenced data item. The data delivery properties include propertes that control the transmission of data from the server system such as update rates or information that helps to completely identify a data item in cases where a name from a server system namespace is not sufficient.

The following example further illustrate the basic data reference concept and its practical implementation.

Figure 16:
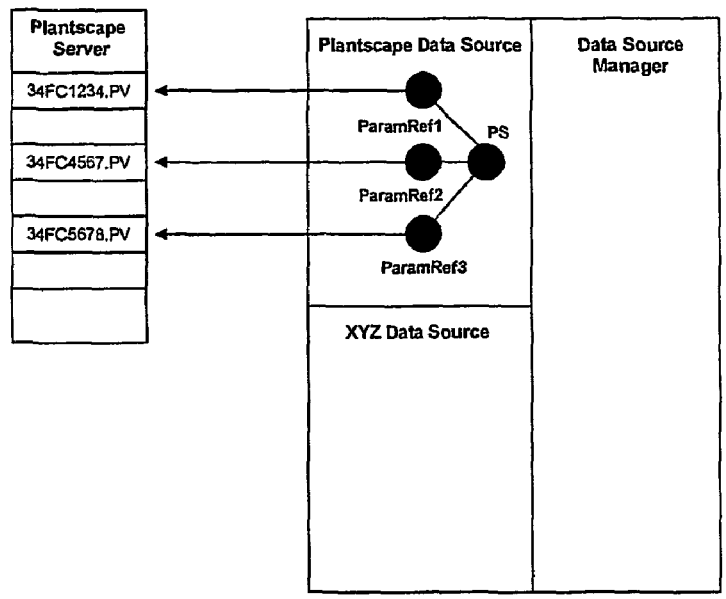
FIG. 16 is a schematic view of a data source used in an embodiment of the invention and which includes several data references.

Consider a data reference that refers to an item in a Plantscape server called "34FC1234.PV". The data reference's ID might be ParamRef1 and the associated namespace name would be "34FC1234.PV". FIG. 16 illustrates a data source with several data references.

The Hendrix architecture knows the value of the referenced data item as ParamRef1 (or ParamRef1.Value). If the data item includes a quality indication the Hendrix architecture knows it as ParamRef1.Quality.

Script code for changing the namespace, in some embodiments, takes to following form:

ParamRef1.name="34FC2222.PV"

As far as the Hendrix architecture is concerned nothing has changed, the data reference ParamRef1 is still supplying data, but behind the scenes it is now getting data from another item in the Plantscape server. Of course, this implies that the new data item in the server is of the same type as the previously referenced data item so that the same data reference object is used to reference it.

Data references are also organized in a hierarchy if this better reflects the structure of server system data. A hierarchical organization allows multilevel indirection to occur.

Figure 17:
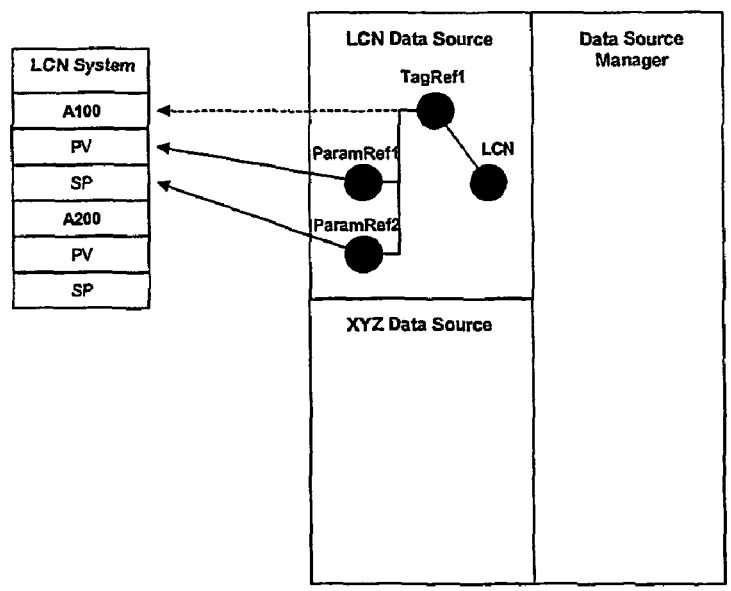
FIG. 17 is a schematic view of a data source used in an embodiment of the invention and which includes hierarchical data references.

The following example shows how hierarchical data references in an LCN data source provide multilevel indirection. Consider two data references that refer to different parameters of the same tag in an LCN system. ParamRef1 refers to "A100.PV" and ParamRef2 refers to "A100.SP". FIG. 17 illustrates this example.

Where the desired effect is to change both of these data references to look at the same parameters of another tag, "A200", the namespace name of both data references could be changed as above to refer to "A200.PV" and "A200.SP" respectively. Alternatively, and as implemented in some embodiments, a separate data reference is used for the tag name called TagRef1 that initially refers to "A100" with ParamRef1 and ParamRef2 now referring to "PV" and "SP" respectively. The Hendrix architecture then knows "A100.PV" and "A100.SP" as TagRef1.ParamRef1 and TagRef1.ParamRef2.

The following script code is all that would be required to change the references from "A100.PV" and "A100.SP" to "A200.PV" and "A200.SP".

TagRef1.name="A200"

It is up to the data source to make sure that all data references below TagRef1 now refer to the correct parameters in the server system.

Another common application of hierarchical data references is when a data source provides data from multiple server systems simultaneously. An example of this is an OPC data source. In this case a data reference refers to the server and data references that refer to the items within the server would appear as children of the server reference. The associated namespace name for the server reference is, for example, the machine name of the OPC server and the data delivery properties for the server reference includes, for example, information required to connect to the server such as the ProgID or CLSID of the OPC server.

Support for hierarchical data references is entirely optional and adds to the complexity of the data source implementation.

Data references are preferably organized into collections. Collections occur at any level in a hierarchical data reference.

In some embodiments, the data references have predefined sub-objects. An example is a server system that supplies all relevant parameters for a given named tag (eg A100). If a data reference with the ID DataRef1 refers to "A100" then the Hendrix architecture knows its parameters simply as DataRef1.PV, DataRef1.SP etc without the need for explicit data references for each parameter.

Data references that are appear as predefined sub-objects are referred to as implicit data references.

As noted above, data references expose the data they refer to as properties. The basic property data types supported are VARIANT and OLE DB Rowset.

The following VARIANT types are supported:
VT_UI1, VT_I2, VT_I4, VT_R4, VT_R8, VT_CY, VT_DATE, VT_BSTR, VT_VARIANT VT_BOOL, VT_NULL, VT_ERROR Safe arrays of these types are also supported (VT_ARRAY|*).

In other embodiments of the invention a data reference also exposes data to the binding engine in the form of an OLE DB rowset. The rowset is exposed as a sub-object of the data reference. In this case the information required to establish the OLE DB session and create the rowset is usually part of the data delivery properties of the data reference.

Further embodiments have data references that include data delivery properties that allow finer control over the reference that than provided by simply changing the associated name. An example is a data reference that refers to a single element in an array. In such an embodiment, the data reference has an index associated with it in addition to namespace name. Consider a data reference with the ID ArrayRef1 that refers to "Analyzer1.ConcentrationData". To fully identify a single element within the array an index is also required. The data reference definition for the reference includes an initial value for the index and it is subsequently changed using script code as follows.

ArrayRef1.Index=2

A further example of a more complex data reference is one that refers to data in a relational database that requires a number of SQL query parameters to fully specify the reference.

Data references exist to supply data to the data binding engine. They do this through property change notifications. As the data referred to by a data reference changes in the server system it is delivered to the data reference using a server system specific mechanism. The data reference then notifies the binding engine that a data reference property has changed. The notification mechanism allows the data reference to pass the changed data to the binding engine as part of the notification which means that it is not necessary for the data reference to cache the data internally. There are, however, some server systems in which it is advantageous to cache the data within the data reference.

In addition to providing property change notifications a data reference is used, in some embodiments, to also fire events. These events are mapped on to methods on display page elements or consumed by the binding engine.

Similarly, data references are also used, in some embodiments, to also expose methods. These methods are typically commands associated with a particular type of data reference. For example, a data reference that provides access to a segment of an array in a server system provides commands (methods) that allow the segment to be scrolled along the length of the underlying array.

Data references are accessible from display page script code via the root of the data source object or via display page elements to which they are bound. Accessing the root of the data reference object model can be done as follows Data.data_source_namespace_identifier Where Data is the SGML ID of the display page's data source connector and data_source_namespace_identifier identifies the data source. A more detailed example is as follows:

Data.OPC.ServerRef1.name="Refinery2"

Accessing a data reference via a display page element is done as follows:

Ref=Alpha1.DataRefs(index)

Where index is either the ID of the data reference or the associated name. The IDs of bound data references are searched first. If the associated name is associated with more than one bound data reference, the first is returned. If the display element is bound to a hierarchical data reference then the lowest level data reference is returned.

Each display page has associated with it a series of data source definitions, one for each data source from which data is required. Each data source definition contains the data source specific information required to construct a data reference object model that contains the data references required by the display page.

The data source definitions are stored in an XML document. Each data source definition is enclosed in a HENDRIX: DATASOURCE element. This element has attributes that identify the namespace with which the data source is associated and the CLSID of the data source component. The content of the DATASOURCE element is a data source specific detail. At a minimum it contains information on how to construct data reference objects that reference the required namespace names.

The format of a data source definition is assumed to be valid XML. If it is not valid XML it must be enclosed in a CDATA section.

The following example illustrates a data source definition for an OPC data source (CLSIDs elided for clarity).

```
<HENDRIX:DATASOURCE NAMESPACE="OPC"
CLSID="DA943720-8048-11d2-8ED5-000000000000"
        CONNECTSTRING="SERVER=OPCX...">
    <SERVER NAME="Modbus">
        <GROUP UPDATERATE="5000">
            <!-- the following corresponds to a reference to
"OPC://Modbus.34FC1234.PV" -->
            <DATAREF ID="DataRef1"
                NAME="34FC1234.PV"/>
        </GROUP>
    </SERVER>
</HENDRIX:DATASOURCE>
```

The above example illustrates that the organization of the data source definition is dependent on the server system that the data source encapsulates. In this case the organization is by OPC server and group.

The following example shows how a data source definition that includes binary data might look.

```
<HENDRIX:DATASOURCE NAMESPACE="LCN"
CLSID="DA943721-8048-11d2-8ED5-000000000000">
    <![CDATA[FE12345AB65C98AFABE192F87E2A26C...
        78C67BAE451F536D]]>
</HENDRIX:DATASOURCE>
```

In this case the organization is not obvious because the definition is an opaque blob of binary data. All that matters is that this definition is meaningful to the LCN data source.

If a data source supports hierarchical data references, the data source definition will need to include the hierarchical relationships between data references.

As discussed above, data source definitions define the set of data references required by a display page. At run time, the entire data source definition is loaded into a data source so that the data source is able to construct the required data reference object model.

During the display building process data source definitions need to be updated as the user adds and removes references to data in the display page. Since the user deals primarily with server system namespace names rather than data reference IDs, an important design time task is to take a server system namespace name and add a data reference of the correct type to the data source definition. These namespace names come from either the Hendrix namespace browser or from direct user input.

This task is handled by a design time component known as a "data source definition editor". A data source definition editor is able to add and remove data references from a data source definition. They are used by the common display builder. They also supply property pages that are used in the common display builder to allow the user to configure the data delivery properties for a data reference.

A data source is an in-process COM object that implements the IHendrixDataSource interface. This interface allows the data source manager to initialise, start and stop the data source. The main purpose of the data source is provide a data reference object model to the data binding engine. This data reference object model consists of a hierarchy of data reference objects and collections of data reference objects. In fact the data reference object model is a standard automation object model, with the exception that a more efficient form of connection point mechanism is used.

The data source is initialised with a data source definition that informs the data source of what data is required from the server system. Once initialised, the data source is transitioned to the running state, in which it delivers data to the data binding engine via the data reference objects.

Figure 18:
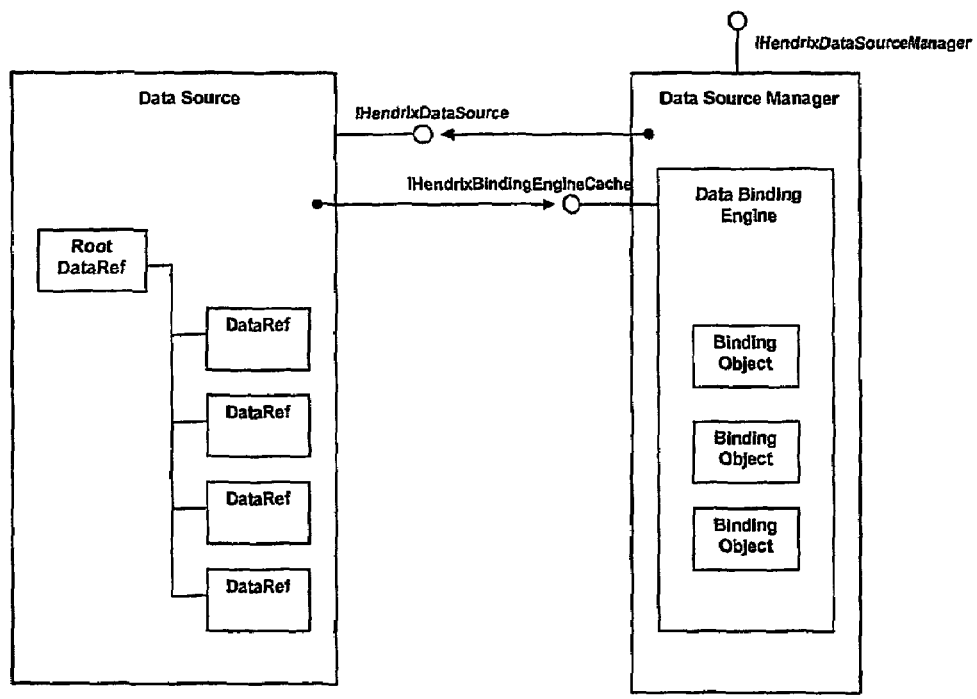
FIG. 18 is a schematic view of the relationship between the data source manager, the data binding engine and the data source.

The data source also exerts some high level control over the transmission of data from the data binding engine to the display page. This is achieved via the IHendrixBindingEngineCache interface. This is useful when a data source wants to ensure that an update is delivered immediately to the display page, rather than cached for later delivery as part of a larger update packet. FIG. 18 shows the relationship between the data source manager, data binding engine and data source.

A data reference is a COM object that exposes the IDispatch interface and supports property change notifications. OLE DB rowsets are exposed as sub-objects of the data reference. This allows the data reference to expose more than one rowset. Hierarchical data references and collections of data references are implemented using sub-objects in the normal OLE Automation fashion.

A data reference notifies the data binding engine of changes to properties via the IHendrixNotify interface provided by the binding engine. Data references that fire events do this via IDispatch.

OLE DB Rowsets expose IRowset (and related interfaces such as IAccessor, IConnectionPointContainer etc). An OLE DB rowset notifies the data binding engine of changes to the rowset via the IRowsetNotify interface provided by the binding engine. A rowset data reference, in some embodiments, also exposes IDispatch if it occurs within a hierarchical data reference in order to provide access the lower levels of the reference.

Figure 19:
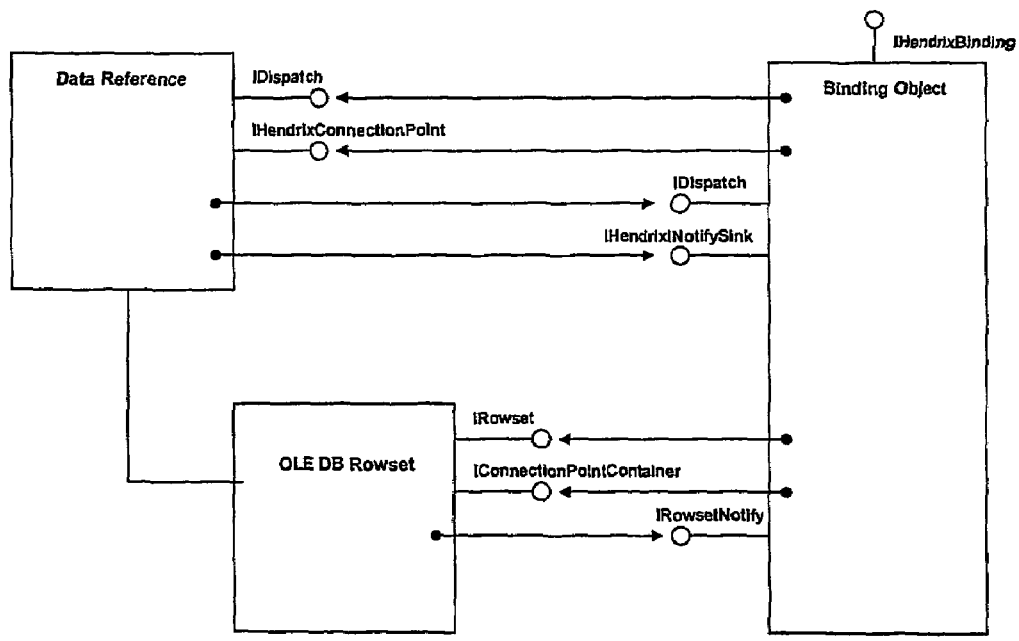
FIG. 19 is a schematic view of the relationship between a data reference that exposes a property, an event and a rowset to a binding object which is part of the Hendrix data binding architecture.

FIG. 19 illustrates the relationship between a data reference that exposes a property, an event and a rowset to a binding object which is part of the Hendrix data binding architecture.

The previous description has gone to the presentation and content aspects of the Hendrix architecture, that is the HTML/XML display page and the data source architecture. The addressee's attention is now directed toward the mechanism that maps the content onto the presentation. The data binding architecture is a key element that gives the Hendrix architecture much of its flexibility and power. More particularly, the data binding architecture provides a means of binding data to virtually anything on the display page in a very efficient manner. It also provides a very flexible data transfer mechanism that accommodates the transformation, combination and filtering of data provided by the Hendrix data source architecture.

MSHTML provides its own data binding mechanism for binding data from OLE-DB data sources to HTML elements and ActiveX controls. This mechanism is deficient in that it expects data in a tabular form, which is inappropriate for much of the data required in an Industrial HMI, and it only binds data to a limited set of properties in the DOM. For these reasons, the Hendrix architecture includes its own data binding mechanism.

The MSHTML data binding mechanism does, however, provide good support for binding to HTML tables. For this reason an interface to the MSHTML data binding mechanism for tabular data from server systems is also available.

Figure 20:
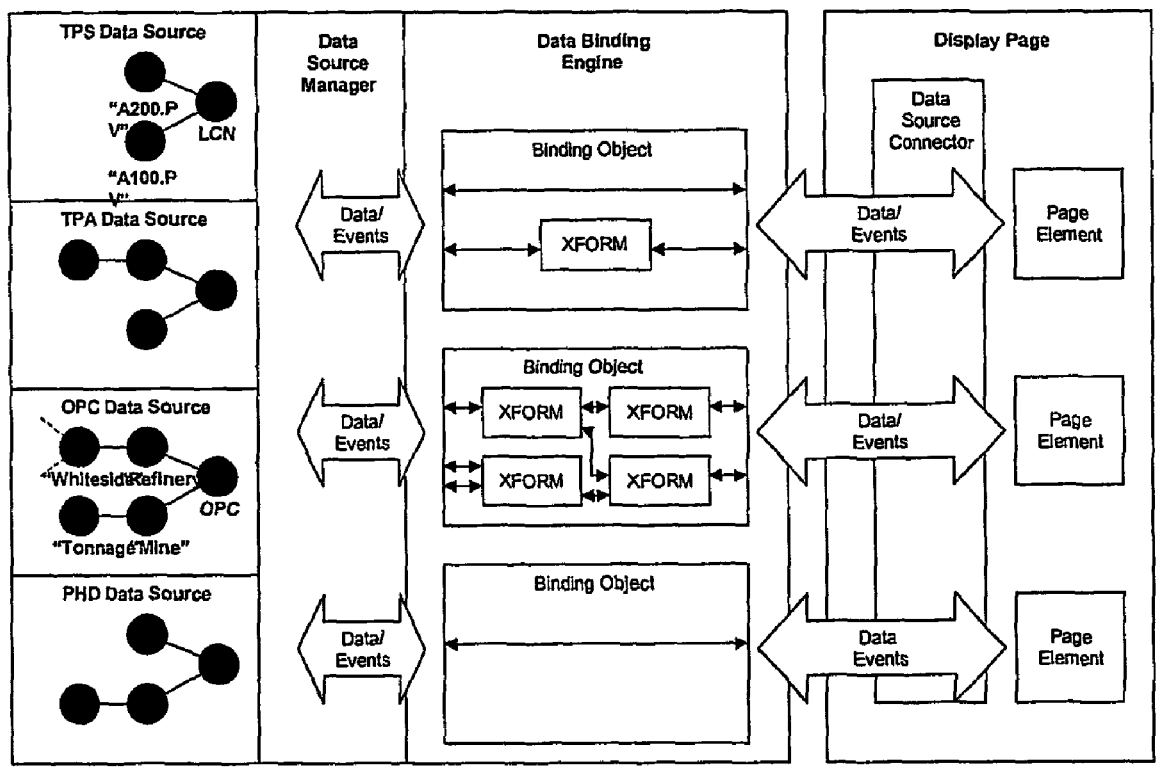
FIG. 20 illustrates the broad components in the Hendrix data binding architecture.

The Hendrix data binding architecture is based on a high performance binding engine that maps properties from the data reference object model on to properties of DOM. It does this in an entirely general way so that any property in the data reference object model is mapped on to any property in the DOM. FIG. 20 illustrates the broad components in the Hendrix data binding architecture.

The binding engine uses a series of binding definitions supplied from the HTML/XML display file that defines how to map data from data reference object models to the display page. The binding engine moves data between properties in the data reference object model and the display page in response to changes in those properties. It can move data in either direction so that data changed in the display is propagated back to the data reference object model and then on to the various server systems. A specialised form of data binding is OLE DB rowset binding where a rowset exposed in the data reference object model is mapped on to either a rowset or an OLE DB Simple Provider in the display page for binding to HTML tables.

The binding engine also map events in the data reference object model to methods in the display page and vice versa. Binding definitions are discussed in more detail below.

The internal architecture of the binding engine is componentised. The transfer of data from the data reference object model to the display page is made through tranformations. The simplest form of transformation is one that directly transfers a property or event from the data reference object model to the display page. More complex transformations include a transformation of the data in some way, or use several properties from the data reference object model to derive a value that is then transferred to the display page. Transformations are selectively chained together to form more complex transformations. Transformations are either supplied by end users, consultants to those users, or the provider of the system.

The binding engine executes in an apartment managed by the data source manager while the display page executes in its own apartment. Any changes to data in the data reference object model are detected by the binding engine which then transfers the data to the data source connector in the display page which applies the updates to the display page elements. The binding engine maintains an internal cache of updates that are transferred to the data source connector in batches to minimize inter-apartment round-trips and minimize display page redrawing. This batching of updates only occurs for transfers from the data reference object model to the DOM. Transfers in the other direction are always immediate. An important consequence of this architecture is that the main display page's thread's involvement in the handling of incoming data is minimized making it more responsive to user interaction.

Binding definitions are used to tell the binding engine how to map data from the data reference object model on to the display page. Binding definitions are part of the HTML/XML display page. There is one binding definition per display page element that requires data. This organization makes it easier to manage the binding definitions in the common display builder. It also makes it easy to access the binding definition via the display page element at run time from script code in the display page.

Each binding definition explicitly defines the mapping of data from the data reference object model on to the display page element. The definition takes the form of a HENDRIX:BINDINGDEF element. The following example illustrates the broad features of a binding definition.

```
<!-- the display page element -->
    <SPAN ID="Alpha1" CLASS="Hendrix"
BINDINGEF="Alpha1BindingDef"><SPAN>
    <!-- the binding definition -->
    <HENDRIX:BINDINGDEF ID="Alpha1BindingDef">
        <BINDING TYPE="Property" SOURCE="OPC.DataRef1"
TARGET="PageElement.InnerHTML"/>
    </HENDRIX:BINDINGDEF>
    <!-- the data source definition -->
    <HENDRIX:DATASOURCE NAMESPACE="OPC"
CLSID="DA943720-8048-11d2-8ED5-000000000000">
        <SERVER NAME="Modbus">
            <GROUP UPDATERATE="5000">
                <!-- the following corresponds to a reference to
"OPC://Modbus.A100.PV" -->
                <DATAREF NAME="A100.PV" ID="DataRef1"/>
            </GROUP>
        </SERVER>
    </HENDRIX:DATASOURCE>
```

Each binding definition consists of one or more bindings that define a property to property mapping between properties of data references and properties of the page element. In this example there is a single binding that maps data from OPC.Modbus.A100.PV to the InnerHTML property of the page element with which this binding definition is associated, in this case the SPAN element Alpha1.

Note that the type of the binding in this example is "Property". This is the default type and is omitted, as required, from the BINDING element.

The source and target of a binding are a property of a sub-object of a data reference or the page element, as in the following example. However, in other embodiments this is not the case.

```
<HENDRIX:BINDINGDEF ID="Group1BindingDef">
    <BINDING SOURCE="OPC.DataRef1.PV"
TARGET="PageElement.Alpha1.Value"/>
    <BINDING SOURCE="OPC.DataRef1.SP"
TARGET="PageElement.Alpha2.Value"/>
</HENDRIX:BINDINGDEF>
```

At run time, each binding definition results in the creation of a binding object within the data binding engine.

A binding that binds an event to a method is of type "Event". If the signature of an event does not match that of the method to which it is bound a transformation is necessary to map the event on to the method.

An important application of event binding is to bind a user interface element that generates events to methods (commands) on data references.

The binding definitions described in above provide for a direct mapping from the data reference object model to the display page. In many cases however, the data needs to be transformed, combined or filtered in some way before being applied to the display page. There are many examples where such transformations are required. One example is data driven dynamics such as rotation, translation, path animation and break point animation that is to be applied to page elements. In these cases the data to be delivered to the display page is derived from data references and the result is applied to the display page. Another example is where a value to be delivered to the display page is the result of some user written data driven script code as in the case of GUS data reference expressions and OnDataChange scripts. A further example is where an event is being mapped on to a method with an incompatible signature.

To accommodate these sorts of examples the binding engine's data transfer mechanism is componentised to allow it to be extended with components to provide arbitrarily complex transformations to be performed as data and events are transferred from the data reference object model to the display page.

The three main types of transformation are property, event and OLE DB Rowset transformations. Property transformations transform data. Event transformations map an event on to a method facilitating argument conversion and other processing. OLE DB Rowset transformations function as OLE DB consumers and map a rowset into either a set of discrete properties or another rowset. Mapping to a set of discrete properties is used to unpack a rowset and apply its contents to a variety of display page properties, while mapping to another rowset is used to perform queries, sorting, filtering or data reduction with the result being another OLE DB rowset (similar to the functions performed by OLE DB service providers).

Transformations are objects with a series of "terminals" which are used as inputs and outputs to the transformation. The transformations are "wired" into the binding definitions.

Transformations also include a programmatic interface that allows it to be configured at display building time and manipulated at run time. This interface includes methods, properties and events.

The following example illustrates how, in one embodiment, a transformation that derives an angle of rotation from a data reference is included in a binding definition.

```
<!-- the display page element -->
<v:rect ID="Rect1" CLASS=
"Hendrix" BINDINGDEF="Rect1BindingDef" STYLE="..."/>
    <!-- the binding definition -->
    <HENDRIX:BINDINGDEF ID="Rect1BindingDef">
        <XFORM ID="RotationDyn" DEF=
"CLSID:0EDB0680-81C8-11d2-8ED6-000000000000"
    PROPERTIES="InitialAngle:0; RotationSpan:270; RangeLow:50;
RangeHi:150"/>
        <BINDING SOURCE="OPC.DataRef1"
TARGET="RotationDyn.Value"/>
        <BINDING SOURCE="RotationDyn.Angle"
TARGET="PageElement.style.rotation"/>
    </HENDRIX:BINDINGDEF>
    <!-- the data source definition -->
    <HENDRIX:DATASOURCE NAMESPACE="OPC"
CLSID="DA943720-8048-11d2-8ED5-000000000000">
        <SERVER NAME="Modbus">
            <GROUP UPDATERATE="5000">
                <!-- the following corresponds to a reference to
"OPC://Modbus.A100.PV" -->
                <DATAREF NAME="A100.PV" ID="DataRef1"/>
            </GROUP>
        </SERVER>
    </HENDRIX:DATASOURCE>
```

In this example, the binding definition includes the XFORM element which declares a transformation known as "RotationDyn" in this binding. The transformation is a binary component identified by the CLSID in the DEF attribute. The rotation transformation has a series of properties used to control the transformation from value to angle. Initial values for these are specified using the PROPERTIES attribute.

Once declared, the transformation is simply connected into the data transfer mechanism using two separate bindings. The rotation transformation has two terminals for this purpose, "Value" and "Angle". The effect of this binding definition is that the value of the referenced data item is converted to an angle of rotation and delivered to the rotation property of the VML rectangle.

In this example the transformation was a binary component that was written in C++. However, in other embodiments use is made of this and/or other programming languages such as Visual Basic, Java and the like. This would be appropriate in this case since the rotation transformation could be very widely used and overall performance of the Hendrix architecture would benefit from a binary implementation.

Another option is to construct transformations using an XML syntax and script code. Following, there is a description of the use of XML transformations, more detail on constructing binary transformations, and a more complex example that reproduces GUS functionality.

Transformations provide an extremely powerful and flexible way to extend the Hendrix data binding architecture. The previous example, a common data transformation was packaged into a binary transformation component so that it could be used to provide rotation dynamics for display page elements. In the following example, the data transformation is one that is widely used across many different display page elements. This large scale reuse and the performance implications justify the inclusion of a binary transformation component.

There are many cases where a "one off" transformation is required for a single instance of a display page element. This is the case when a user wants to tailor the delivery of data to the display page using some data driven script code. A common example is when a page element requires a data value that is the result of some expression involving several data references. XML based transformation components allow ease of construction of transformations that contain user written script that is executed as part of the binding engine's data transfer mechanism.

The following is a simple example showing an XML transformation that uses script code to calculate the sum of two data values.

```
<HENDRIX:XFORMDEF ID="Alpha1DataScriptDef">
    <TERMINAL ID="Input1" NOTIFY="Script1"/>
    <TERMINAL ID="Input2"/>
    <TERMINAL ID="Result"/>
    <SCRIPT ID="Script1" LANG="VBScript">
            Result = Input1 + Input2
    </SCRIPT>
</HENDRIX:XFORMDEF>
```

The XFORMDEF element contains the definition of the transformation. It has three terminals; Input1, Input2 and Result. There is a script element that contains VBScript code in this example. The script code uses the terminal IDs in the calculation of the sum. The terminal Input1 has a NOTIFY attribute that names the script element. The effect is that any changes to Input1 will result in Script1 executing. As will be appreciated by those skilled in the art, the terminal Input2 does not have the NOTIFY attribute which means that changes in Input2 will not result in any script executing. Thus, the writer of the XML transformation has complete control over what causes the transformation to transfer data.

The usage of this transformation in a binding definition would be as follows.

```
<HENDRIX:BINDINGDEF ID="Alpha1BindingDef">
    <XFORM ID="ScriptComp" DEF="Alpha1DataScriptDef"/>
    <BINDING SOURCE="OPC.DataRef1"
TARGET="ScriptComp.Input1"/>
    <BINDING SOURCE="OPC.DataRef2"
TARGET="ScriptComp.Input2"/>
    <BINDING SOURCE="ScriptComp.Result"
TARGET="PageElement.Value"/>
</HENDRIX:BINDINGDEF>
```

In this case the DEF attribute of the XFORM element indicates that the transformation is an XML transformation defined in the current display page. The XML transformation, in other embodiments, is defined in a separate file in which case the DEF attribute might have the value "URL: Alpha1DataScriptDef.xml".

It is also easy to construct bidirectional transformations using XML transformations as the following illustrates.

```
<HENDRIX:XFORMDEF ID="SignChangeDef">
    <TERMINAL ID="Input" NOTIFY="Script1"/>
    <TERMINAL ID="Output" NOTIFY="Script2"/>
    <SCRIPT ID="Script1" LANG="VBScript">
        Output = Input * −1
    </SCRIPT>
    <SCRIPT ID="Script2" LANG="VBScript">
        Input = Output * −1
    </SCRIPT>
</HENDRIX:XFORMDEF>
```

In this example two separate script elements, which perform complementary transformations, execute in response to changes in the input and the output.

XML transformations also include a programmatic interface consisting of properties, methods and events. The following example illustrates an XML transformation that provides such properties and an event.

```
<HENDRIX:XFORMDEF ID="BreakPtDef">
    <PROPERTY ID="CurBreakPt"/>
    <PROPERTY ID="BreakPt1" NOTIFY="Script1"/>
    <PROPERTY ID="BreakPt2" NOTIFY="Script1"/>
    <PROPERTY ID="BreakPt3" NOTIFY="Script1"/>
    <PROPERTY ID="BreakPt4" NOTIFY="Script1"/>
    <EVENT ID="OnBreakPt"/>
    <TERMINAL ID="Input" NOTIFY="Script1"/>
    <SCRIPT ID="Script1" LANG="ECMAScript">
    if(DataVal < BreakPt1 && !(CurBreakPt == 1)
    {
        CurBreakPt = 1;
            FireEvent("OnBreakPt");
        }
        else if(DataVal < BreakPt2 && DataVal > BreakPt1 &&
                !(CurBreakPt == 2)
    {
        CurBreakPt = 2;
            FireEvent("OnBreakPt");
        }
        else if(DataVal < BreakPt3 && DataVal > BreakPt2 &&
                !(CurBreakPt == 3)
    {
        CurBreakPt = 3;
            FireEvent("OnBreakPt");
        }
    if(DataVal < BreakPt1 && !(CurBreakPt == 4)
    {
        CurBreakPt = 4;
            FireEvent("OnBreakPt");
```

-continued

```
        }
    </SCRIPT>
</HENDRIX:XFORMDEF>
```

This transformation fires the OnBreakPt event whenever the input value enters a new break point region. The break point regions as defined by the four properties BreakPt1, BreakPt2, BreakPt3 and BreakPt4 control the configuration of the transformation and the property CurBreakPoint reflects the current state of the transformation.

A transformation appears at run time as a subobject of the page element that it is associated with. This allows script code in the display page to access the transformation's properties and methods and receive any events it generates. This is illustrated in the following example which makes use of the above transformation.

```
<SPAN ID="Alpha1" CLASS="Hendrix"
BINDINGDEF="Alpha1BindingDef"/>
</SPAN>
<HENDRIX:BINDINGDEF ID="Alpha1BindingDef">
    <XFORM ID="BreakPt" DEF="BreakPtDef"
PROPERTIES="BreakPt1:40; BreakPt2:80; BreakPt3:120;
BreakPt4:160"/>
    <BINDING SOURCE="LCN.DataRef1"
    TARGET="BreakPt.Input"/>
</HENDRIX:BINDINGDEF>
<SCRIPT FOR="Alpha1.BreakPt" EVENT="OnBreakPt"
LANGUAGE="ECMAScript">
    switch(Alpha1.BreakPt.CurBreakPt)
    {
        case 1: SoundPlayer.Play("normal.wav");
    break;
        case 2: SoundPlayer.Play("alert.wav");
    break;
        case 3: SoundPlayer.Play("highalert.wav");
    break;
        case 4: SoundPlayer.Play("codered.wav");
    break;
        }
    </SCRIPT>
```

Note that, in this example, there is no data actually transferred by the binding engine to the display page. Instead, the information is retrieved from the transformation by a display page script when the transformation generates an event. Note also that the transformation is actually out-of-apartment with respect to the page element with which it is associated. This means that accessing the transformation incurs the usual performance penalty for such cross apartment calls.

It is also important to note in this example that the script code in the XML transformation is executed in the binding engine on a thread managed by the data source manager, while the script code responding to the event fired by the transformation executes in the display page on the main UI thread.

XML transformations are also used to map an event on to a method when there is a mismatch between their signatures which means that the binding engine cannot bind them directly. The following example shows how an XML transformation is used to map an event with one argument on to a method with two arguments. The transformation supplies the value of the second argument itself.

```
<HENDRIX:XFORMDEF ID="Alpha1EventXFormDef">
    <TERMINAL ID="Input" NOTIFY="Script1"/>
    <TERMINAL ID="Output"/>
    <SCRIPT ID="Script1" LANG="VBScript">
        Method(Input.args(1), 10);
    </SCRIPT>
</HENDRIX:XFORMDEF>
<HENDRIX:BINDINGDEF ID="Alpha1BindingDef">
    <XFORM ID="EventXForm" DEF="Alpha1EventXFormDef"/>
    <BINDING TYPE="Event" SOURCE=
"TPA.DataRef1.Recalculate" TARGET="EventXForm.Input"/>
    <BINDING TYPE="Event" SOURCE="EventXForm.Output"
TARGET="PageElement.Rescale"/>
</HENDRIX:BINDINGDEF>
```

Note that the bindings in this case are of the type "Event". The default binding type is "Property".

Note also the use of the args collection of the "Input" terminal. This collection is always available even on terminals used for properties in which case args(1) contains the property value.

XML transformations are also used to alter the semantics of the default transformation that is implied by a binding definition that binds data directly from the data reference object model to the display page without the explicit use of transformations. This default transformation has an equivalent XML definition as follows.

```
<HENDRIX:XFORMDEF ID="DirectBindingDef">
    <TERMINAL ID="Input" NOTIFY="Connection1"/>
    <TERMINAL ID="Output" NOTIFY="Connection2"/>
    <CONNECT ID="Connection1" FROM="Input" TO="Output"/>
    <CONNECT ID="Connection2" FROM="Output" TO="Input"/>
</HENDRIX:XFORMDEF>
```

The CONNECT elements form a direct connection from one terminal to another. In this case, the default case, the connections are notified of any changes to their source terminals creating the effect of a bidirectional connection. The semantics are changed by changing the NOTIFY attributes, adding extra connections etc. For example, a transformation that broadcasts a value to several page elements follows.

```
<HENDRIX:XFORMDEF ID="DirectBindingDef">
    <TERMINAL ID="Input" NOTIFY="Connection1;
Connection2; Connection3"/>
    <TERMINAL ID="Output1"/>
    <TERMINAL ID="Output2"/>
    <TERMINAL ID="Output3"/>
    <CONNECT ID="Connection1" FROM="Input" TO=
"Output1"/>
    <CONNECT ID="Connection2" FROM="Input" TO=
"Output2"/>
    <CONNECT ID="Connection3" FROM="Input" TO=
"Output3"/>
</HENDRIX:XFORMDEF>
```

In this case changes in the input are propagated to the outputs but changes in the outputs are not propagated back to the input. This is different to the effect that would be obtained if the following binding definition without explicit binding connections were used.

```
<HENDRIX:BINDINGDEF ID="Group1BindingDef">
    <BINDING SOURCE="OPC.DataRef1"
TARGET="PageElement.Alpha1.Value"/>
    <BINDING SOURCE="OPC.DataRef1"
TARGET="PageElement.Alpha2.Value"/>
    <BINDING SOURCE="OPC.DataRef1"
TARGET="PageElement.Alpha3.Value"/>
</ENDRIX:BINDINGDEF>
```

The following example illustrates how transformations are used to reproduce GUS functionality. The scenario considered is that of a text object with an OnDataChange script that references one data value and a rotation dynamic driven by a data reference expression that is the sum of two other data values.

Firstly, an XML transformation is defined to capture the OnDataChange script and the data reference expression used to drive the rotation dynamics.

```
<HENDRIX:XFORMDEF ID="Alpha1ScriptDef"
    <TERMINAL ID="Input1" NOTIFY="OnDataChangeScript"/>
    <TERMINAL ID="Output1"/>
    <TERMINAL ID="Input2" NOTIFY="DataReferenceExpr"/>
    <TERMINAL ID="Input3" NOTIFY="DataReferenceExpr"/>
    <TERMINAL ID="Output2"/>
<SCRIPT ID="OnDataChangeScript" LANG="VBScript">
        Output1 = Func(Input1)
</SCRIPT>
<SCRIPT ID="DataReferenceExpr" LANG="VBScript">
        Output2 = Input2 + Input3
</SCRIPT>
</HENDRIX:XFORMDEF>
```

Input1 is the input to the OnDataChange script and Output1 is the result Input2 and Input3 are inputs to the data reference expression and Output2 is the result of the data reference expression. This XML transformation and the binary rotation transformation discussed earlier are now used in a binding definition for a display page element.

```
<OBJECT ID="Alpha1" CLASS="Hendrix" CLSID="..."
BINDINGDEF="Alpha1BindingDef">
    </OBJECT>
    <HENDRIX:BINDINGDEF ID="Alpha1BindingDef">
        <XFORM ID="Alpha1Script" DEF="Alpha1ScriptDef"/>
        <XFORM ID="RotationDyn" DEF=
"CLSID:0EDB0680-81C8-11d2-8ED6-000000000000"
        PROPERTIES="InitialAngle:0; RotationSpan:270; RangeLow:50;
RangeHi:150"/>
        <BINDING FROM="LCN.DataRef1" TO=
"Alpha1Script.Input1"/>
        <BINDING FROM="Alpha1Script.Output1"
TO="PageElement.Value"/>
        <BINDING FROM="LCN.DataRef2" TO=
"Alpha1Script.Input2"/>
        <BINDING FROM="LCN.DataRef3" TO=
"Alpha1Script.Input3"/>
        <BINDING FROM="Alpha1Script.Output2"
TO="RotationDyn.Input"/>
        <BINDING FROM="RotationDyn.Angle"
TO="PageElement.Rotation"/>
    </HENDRIX:BINDINGDEF>
```

As will be appreciated by a skilled addressee, given the teaching herein, a data source definition that defined DataRef1, DataRef2 and DataRef3 as referring to LCN://A100.PV, LCN://A200.PV and LCN://A300.PV respectively is also required.

In this example, two transformations are chained together to build up the required combination of data transformations to achieve the desired result.

From the preceding description, it is clear that explicit transformations are used when data needs to be transformed as it is transferred to the display page. The transformation is, in some cases, one that adds real value to the data as it is transferred—as in the case of a rotation dynamic—or it is, in other cases—simply to massage the data slightly into a form that the controls on the display page expect. This latter category of transformations is largely eliminated for the controls of the system provider or designer as a close correspondence between the form of the data as delivered by data source components and the form expected by the controls on the display page is designed into the system. This is also possible for controls targeting a specific server system. To achieve this for controls that are reusable across provider server systems requires convergence on the details of the object models supplied by the various data source components.

The present embodiments also support another desired feature of an industrial BIN, that being the ability to issue commands to the server system. These commands are often issued from page elements themselves as in the case of selecting a page element and pressing a function key to call up a point detail or right clicking a page element to pop up a context menu from which an action can be selected. Commands are, in some embodiments, also issued from the user interface framework as in the case of the-operator entering a command into the command zone or selecting a menu item from the framework's menu.

Part of the power and flexibility of the architecture used in the embodiments of the invention comes from the separation of content from presentation. This is achieved through the use of distinct data source and data transformations that free the page elements from most of the work involved in the provision of data to the display page. This has the added and unexpected benefit that data is available to be provided to any page element, not just those supplied by the system designer or provider. A similar approach is taken with commands that are issued to the server system. These are abstracted out of page elements into distinct components that allow the commands to be issued from any page element, not just those supplied by Honeywell or another system provider.

The command architecture of the preferred embodiments also allows command behaviour to be associated with any page element and for commands from page elements and the user interface framework to be routed to the server system.

Commands are implemented as methods on objects in the data source object model. Commands are, in some cases, system wide—such as commands to change operator security level—or server specific—such as acknowledging alarms or calling up a point detail. These different classes of commands are implemented at the level of the data source object model.

System wide commands are implemented on the root of the data source object model. Server specific commands are implemented on the root node of each data source component object model. The commands are usually accessed via script code or via command behaviours associated with display page elements.

The Hendrix architecture allows command behaviour to be associated with any page element on a display page. This means, for example, that a user is able to select a third party control on a page and right click on it to pop up a server specific context menu or press a function key to perform a server specific action such as point detail.

In the Hendrix architecture this ability to associate server command behaviour with any page element leverages the DHTML behaviour mechanism provided by MSHTML. A DHTML behaviour is a component that encapsulates behaviour that would normally be coded into a page element or added to it via script code. A behaviour component "wraps" any page elements it is applied to, extending its object model and run time behaviour. This mechanism provides the means by which server specific command behaviour is extracted out of page elements in a form that is able to be associated with any page element.

In practice, server command behaviours fall into several distinct categories. In these cases, several individual behaviours are implemented as part of the one behaviour component.

The command behaviour component implements the standard behaviour interfaces such as IElementBehavior and IElementBehaviorFactory. Command behaviours respond to user events such as keystrokes and mouse clicks, and initiate the appropriate server commands when these events occur. It issues the commands via the command methods in the data source object model.

Associating a command behaviour with a page element is as simple as applying the behaviour to the element via the standard CSS mechanisms. The following example shows how a command behaviour is associated with a third party gauge control.

```
<!-- a third party gauge control -->
<object id="alpha1" CLASS="PlansctapeCommands"
classid="clsid:36D15A51-1558-11d2-8dfA-00C04FF010A0" style=
"position:absolute; top:500; left 500; height: 50; width: 100">
    <param name="needleStyle" value="4">
    <param name="rangeLow" value="0">
    <param name="rangehigh" value="100">
</object>
```

In other embodiments alternative associations are utilised.

In the case of a user interface framework, commands are usually issued directly to the data source object model, although this is dependent on the user interface element issuing the command and the implementation strategy used in constructing the framework.

The ability to reuse display pages as building blocks for other display pages is an important factor in minimizing the engineering cost of developing display pages for Honeywell and other provider server systems. This holds is both for standard displays that are shipped with a system and for displays built for a customer site by consultants or the customers themselves.

The Hendrix architecture provides three mechanisms for achieving display page reuse. These are encapsulation, interface extension and data reference parameterisation. Encapsulation refers to preparing a Hendrix display page for later reuse by storing it in a separate file so that it is available for being embedded or linked into a containing display. Interface extension refers to adding properties, methods and events to the display page so that it is available to be treated as a fully fledged component in a containing display page. This greatly increases the utility of reusable display pages. Data reference parameterisation refers to defining data references using tokens that are substituted in the containing display when the display is linked or embedded.

Note that the previous description relies upon the file format aspects of display page reuse. Display page reuse is also an important source of requirements for the Honeywell common display builder.

A Hendrix encapsulation is formed when display page elements are contained within a HENDRIX:ENCAPSULATION element and is stored in a separate file. The following example the encapsulation of a span tag that displays LCN.A100.PV and is stored in the file SimplePaceplate.htm

```
<HENDRIX:ENCAPSULATION>
    <CONTENT>
        <SPAN ID="PVSpan" CLASS="Hendrix"
BINDINGDEF="PVSpanBindingDef"/><SPAN>
            <HENDRIX:BINDINGDEF ID="PVSpanBindingDef"/>
                <DATA ID="DataRef1" REF="LCN.A100.PV"/>
                <BINDING FROM="DataRef1"
TO="PageElement.InnerHTML"/>
            </HENDRIX:BINDINGDEF>
    </CONTENT>
</HENDRIX:ENCAPSULATION>
```

The encapsulated display page elements are contained in the CONTENT elements.

An embedded instance of the encapsulation follows:

```
<DIV ID="Faceplate1" CLASS="HendrixEncapsulation"
DEF="SimpleFaceplate.htm">
    <!-- content of faceplate appears inline here -->
<DIV>
```

The embedded encapsulation appears as a DIV in the containing display page with the HendrixEncapsulation behaviour applied to it.

Interface extension is achieved in the Hendrix architecture using the DHTML behaviour mechanism provided by MSHTML. This mechanism was briefly discussed earlier with reference to command behaviours. DHTML behaviours provide a general mechanism for extending the object model of any display page element with properties, methods and events.

Properties, methods and events are added to an encapsulated display by adding an INTERFACE element to the encapsulation. The following example provides an illustration.

```
<HENDRIX:ENCAPSULATION>
    <INTERFACE>
        <PROPERTY ID="Prop1"/>
        <METHOD ID="Method1"/>
        <EVENT ID="Event1"/>
        <SCRIPT LANGUAGE="VBScript">
            sub Method1(x)
            if#Encapsulation.Prop1 = 0 and x > 0 then
                            #Encapsulation.FireEvent("Event1");
            end sub
        </SCRIPT>
    </INTERFACE>
    <CONTENT>
        <OBJECT ID="PVSpan" CLASS="Hendrix"
BINDINGDEF="PVSpanBindingDef"/><SPAN>
            <HENDRIX:BINDINGDEF ID="PVSpanBindingDef"/>
                <DATA ID="DataRef1" REF="LCN.A100.PV"/>
                <BINDING FROM="DataRef1"
TO="PageElement.InnerHTML"/>
            </HENDRIX:BINDINGDEF>
    </CONTENT>
</HENDRIX:ENCAPSULATION>
```

Note the use of the #Encapsulation symbol to refer to the properties and methods of the current encapsulation.

An embedded instance of the encapsulation could look like:

```
<DIV ID="Faceplate1" CLASS="HendrixEncapsulation"
DEF="SimpleFaceplate.htm" Prop1="1">
    <!-- content of faceplate appears inline here -->
</DIV>
```

Note that Prop1 is given an initial value inline in the DIV element's start tag.

The properties, methods and events are now available on the embedded instance for use in script code in the containing display page as follows.

```
Faceplate1.Prop1 = 2
Faceplate.Method1(3)
<SCRIPT FOR="Faceplate1" EVENT="Event1"
LANGUAGE="VBScript">
    'event handler code here
</SCRIPT>
```

An encapsulation, as used in some embodiments, includes data reference tokens that are used to parameterise data references that appear in the encapsulated display page. The following illustration shows one method of parameterising the data reference in the previous examples.

```
<HENDRIX:ENCAPSULATION>
    <INERFACE>
        <TOKEN ID="PointID/>
    </INTERFACE>
    <CONTENT>
        <SPAN ID="PVSpan" CLASS="Hendrix"
BINDINGDEF="PVSpanBindingDef"/><SPAN>
            <HENDRIX:BINDINGDEF ID="PVSpanBindingDef"/>
                <DATA ID="DataRef1" REF="##PointID.PV"/>
                <BINDING FROM="DataRef1"
TO="PageElement.InnerHTML"/>
            </HENDRIX:BINDINGDEF>
    </CONTENT>
</HENDRIX:ENCAPSULATION>
```

The data reference now includes the symbol ##PointID, which is an instance of the token PointID. PointID is declared as a data reference token using a TOKEN element in the INTERFACE part of the encapsulation When the encapsulated display page is embedded or linked into another display page the data reference tokens are given values which are then substituted into the tokenised data references within the encapsulated display page.

The following example illustrates how the encapsulation is used in a containing display page.

```
<DIV ID="Faceplate1" CLASS="HendrixEncapsulation"
DEF="SimpleFaceplate.htm"
        PointID="LCN.A100">
    <!-- rest of faceplate appears inline here -->
</DIV>
```

In this case the token PointID is given the value LCN.A100.

When determining what data references exist in the embedded (or linked) encapsulation, the Honeywell common builder performs a token pasting operation to complete any parameterised data references.

The data reference tokens are accessible at run time as part of the embedded (or linked) encapsulation's object model. For example, the following line of would cause the bindings that depend on the token to be unbound and then rebound to new objects in the data source object model.

Faceplate1.Tokens("PointID")="LCN.A200"

This assumes that the data source object model already contains the data for LCN.A200. The containing display page will look after this detail using the technique suggested earlier with reference to data binding definitions.

If token values are omitted from an embedded encapsulation at the time it is embedded, the data references and binding definitions that depend on them are ignored. Token values are then supplied at run time causing the binding definitions to take effect at that time.

Figure 21:
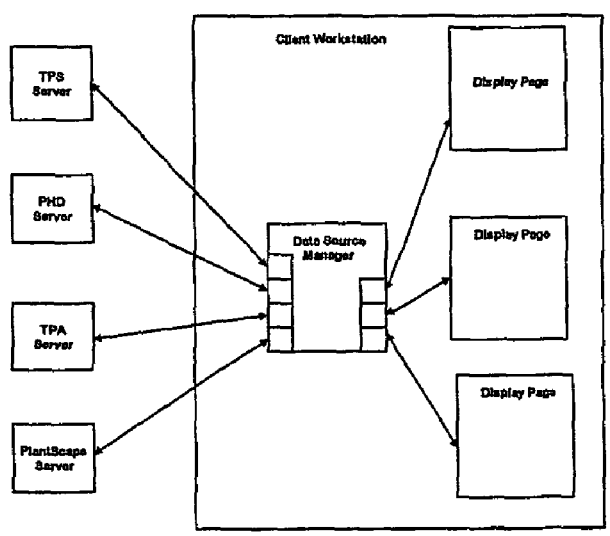
FIG. 21 is a schematic representation of a "thin client, remote server" system provided by an embodiment of the invention.

As discussed so far in this description, the Hendrix architecture typically consists of a client machine on which display pages are viewed and one or more server systems from which data is delivered to the client. The data is delivered to the client machine by the server system specific data source components and presented to the data source manager in the form of hierarchical object models. The data source manager consolidates the various data source component object models into a single data source object model. The binding engine, which is also managed by the data source manager, then transfers the data from the object model to the display page as changes occur. This arrangement is shown in FIG. 21.

Figure 22:
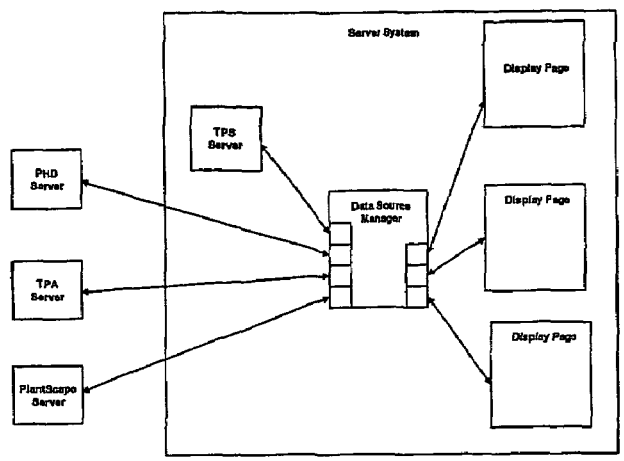
FIG. 22 is a schematic representation of a "thin client, single node" system provided by an embodiment of the invention.

The client portion described above is also, in the preferred embodiments, run on a server system. This is usually necessary in cases where a data source component does not include a remoting mechanism for delivering data to a separate client machine. FIG. 22 illustrates this arrangement.

These two topologies both feature a thin client and are suitable in some control room scenarios where conventional workstations are the norm and network connections are regarded as potential points of failure.

There are, however, other topologies for the Hendrix architecture that are used in other embodiments. As discussed in previously, the data binding engine executes in an apartment managed by the data source manager. The motivation for this is to offload the work associated with delivering data and transforming to a thread other than the main user interface thread. Communication between the binding engine and the display page is an efficient batch transfer mechanism that minimizes inter-apartment round trips. This split between the servers systems and the data source manager (different machines) and the data source manager and the display page (different apartments) makes Hendrix a three-tier architecture. The data source manager and the components it manages form the middle tier. If the interface between the data source manager and display page is made remotable, as is the case in some embodiments, then a number of other network topologies are possible.

Figure 23:
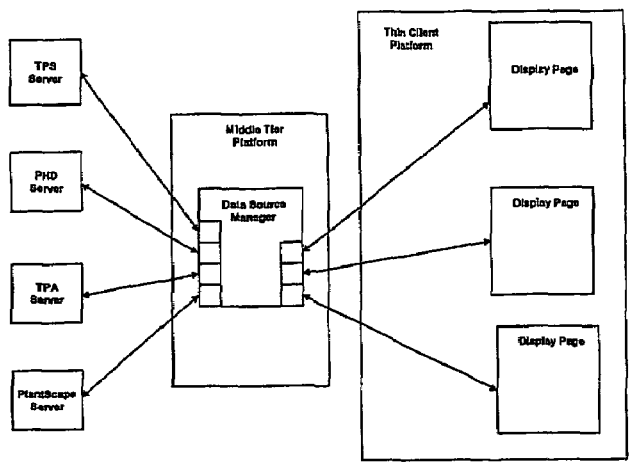
FIG. 23 is a schematic representation of a "very thin client, distinct middle tier" system provided by an embodiment of the invention.
Figure 24:
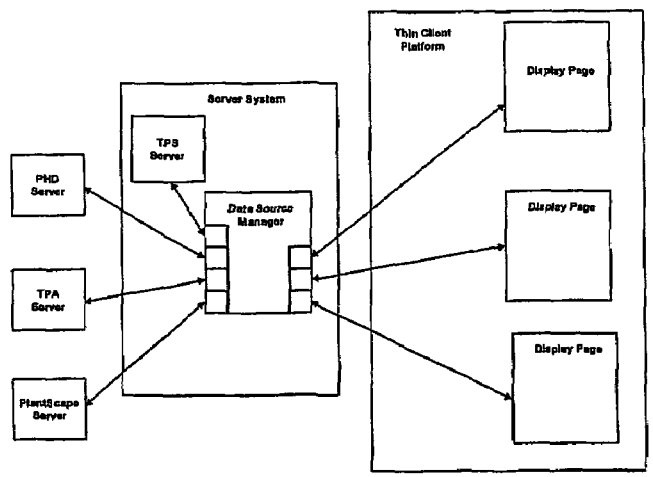
FIG. 24 is a schematic representation of a "very thin client, middle tier" system provided by an embodiment of the invention.

These topologies feature a very thin client and would be suitable for very thin client platforms such as hand held and wearable computers. One locates the middle tier on one of the server systems while the other locates it on a distinct machine. These are illustrated in FIG. 23 and FIG. 24.

The thin client topologies allow the data source manager to be shared across display pages on the same machine while the very thin client topologies allow the data source manager to be shared across displays on different machines. This allow the data source manager to act as a common "display database".

Another advantage of the very thin client approach is that only the data actually needed on the page is sent to the client rather than all of the data required to derive the needed data, thus minimizing the volume the data communications to the client. This is important for clients operating over low bandwidth communications links.

Having the middle tier on a distinct machine is also important where computationally expensive transformations are performed in transformations as occurs where historical data from server systems is being prepared for a complex 3D data visualization. This functionality enables very thin clients to present the visualization and also avoid loading the server systems with the computational burden.

In some embodiments the middle tier represents the ideal place for a web server used to deliver display pages to the clients. One implication of this is that it is better for the data source definitions and binding definitions to be stored separately from the display page and passed directly to the data source manager as the display page is delivered rather than having them passed to the client as part of the display page only for them to be sent back to the middle tier.

There are different classes of user of an industrial HMI ranging from those who require casual access to display pages via a web browser to those who spend all day working with display pages at a dedicated console in a control room. These different users have different requirements for the environment in which they use display pages. These differing requirements are reflected in differing display page frameworks. A display page framework is generally some surrounding user interface infrastructure that helps the user to navigate and interact with display pages. This infrastructure includes menus, toolbars, status zones, alarm zones, message zones, command zones, change zones, and the like. Another important class of framework functionality is the window management provided by software such as the commercially available Honeywell SafeView product.

The Hendrix architecture, in conjunction with SafeView, provides a rich tool kit for constructing display page frameworks. Some techniques for constructing frameworks using the Hendrix architecture are described below.

The simplest form of framework is no visible framework at all. This occurs when, for example, SafeView alone is used to manage the user interface of an operator console. This is achieved by using the Hypertext Application (HTA) mechanism available in MSHTML. This allows a display page to appear standalone without any visible framework, much in the same way that present day GUS displays appear.

The common model for casual access to information is the web browser. Internet Explorer provides a state of the art web browsing interface that is ideal for casual access to display pages. Display pages are called up by entering a direct URL in the browser or by any of the other myriad navigation tools available in this environment. Examples include favourites or bookmarks, navigation history and hyperlinks from other display pages or from other HTML pages that are part of the general corporate intranet.

In the case of a web browser, the framework in which pages are viewed is the regular web browser user interface. It does not include any user interface elements that are HMI specific. In general this is not a limitation. In some cases however, there is a need for some extra user interface elements in the display page itself to allow the user to interact with the process or server system in a way that would normally be provided by an HMI specific framework. An example of this is a minimal user interface to allow the user to enter commands into a command zone. This minimal user interface is, in some cases, delivered as a control on the display page whose visibility would be determined by the framework in which the display page is viewed.

Industrial process control systems, such as those provided by Honeywell, are used in many industrial domains. The operational environments that exist in these domains vary greatly depending on the nature of the processes being managed. Even within a particular domain, operational requirements will vary with different operational policies in place at different organizations.

As discussed above, a framework is some user interface infrastructure in which display pages can be viewed, navigated and interacted with. A framework typically contains user interface elements such as menus, toolbars, status zones etc. The Hendrix display page architecture itself provides a perfect mechanism for constructing these frameworks. This is especially true as the Hendrix data binding architecture makes it easy to populate the framework with data from the server system and process.

Third party tools are rapidly emerging with which rich HTML based user interfaces can be constructed. Examples of these include menus and toolbars implemented as binary behaviours for use with MSHTML.

Display page scripting is provided by MSHTML. It supports script code written in any language for which an ActiveX scripting engine implementation is available. The most popular scripting languages on web pages are JavaScript, now known as ECMAScript and VBScript. Microsoft provides ActiveX scripting engine implementations for both languages.

The one aspect of display page scripting that is provided by the Hendrix architecture is named data access.

An important aspect of providing data to a display page is that of making the data available to script code in the display page. In the Hendrix architecture this means making the data source object model accessible to the display page scripting environment. This is done via the data source connector which provides an object model that mirrors the data source object model. This object model actually provides a local, standard OLE Automation version of the data source object model. As an optimisation, the data source connector object model is created on an as needed basis, as it is accessed, by executing script code.

Script code on the page accesses data in the data source object model simply by referring to it via the data source connector which, for convenience, is called "Data" in the display page.

DataOPC.A100.SP=100

This example assumes that the data item OPC.A100.SP actually exists in the data source object model. The earlier description on the data binding architecture describes how to make sure the data source object model contains all of the data that display page script code might require.

Robustness and stability are essential features of an Industrial HMI. The Hendrix architecture is designed in such a way as to minimize the impact of failures in HMI components. The main areas of risk are ActiveX controls in the display page, user written script code in the display page, binary transformations and XML transformations. These are all areas where it is possible for "foreign" components to be introduced into the HMI. These foreign components provide a risk of catastrophic failure or, in less acute cases, simply take too long to execute.

The failure of any one of these components will have a direct impact on the particular display page which those components are a part of or are servicing. The Hendrix architecture is designed such that the impact of any of these failures will be limited to that particular display page. This extends to any user interface framework that is managing a display page. This ensures that even if a display page fails catastrophically, the framework will remain intact so the user is able to continue to receive process and system information through the framework and/or navigate immediately to another display page.

In some embodiments, special components are developed to achieve the desired robustness. For example, specific robust display page containers that execute a display page in a separate process on behalf of a user interface framework.

The script code execution environments (MSHTML and the XML transformations) monitor the execution of script code so that code that takes too long to execute is identified and remedial action taken.

Inter-display communication consists of two aspects:
1. Communication at display invocation time, consisting of the ability of one display being able to pass parameters to another when it is invoked, and
2. Communication after a display is loaded, consisting of the ability to share persistent data between displays, and across display invocations.

A display may be invoked in one of two ways: either in the same window as the calling display (such as a normal hyperlink in the browser) or in a new window. When it comes to passing invocation parameters to such a display, these two scenarios are slightly different.

When changing to a new display in the same window, display parameters are used to transmit some kind of state information (such as the currently selected point, or previously entered user data) to the new display. In the Hendrix environment, there are a number of methods available for this purpose, the first three of which utilise web technologies:
1. Storing the information in a cookie as part of the document object model.
2. Storing the information as structured XML data (available in IE5).
3. Storing the information on the server, by using Active Server Pages and placing the parameters in the hyperlink definition (e.g. http://server/new_display.htm.?param1=20&param2=30).
4. Using the global data repository provided by the global data repository (see below).

As far as Hendrix is concerned, any of these methods are appropriate to pass parameters to a new display. The Hendrix architecture is designed to permit the use of pertinent technologies, but not mandate it. The architecture does not require the use of Active Server Page technology, for example, but likewise it does not prohibit its use where appropriate. Note that adopting a custom form of hyperlink (where parameters are passed locally on the client, for example) would not be appropriate, as the parameter passing mechanism needs to function in both the web browser and the operator environments.

This is not the case when displays are invoked in a separate window, however. In HTML, a new window is opened by a normal hyperlink, or by script, as for a single window. The difference lies in the fact that the system must determine what frame window to use for the new window. Consider the following scenarios:

| Invoking Display | Invoked Display | Expected Behavior |
|---|---|---|
| Display in operator environment | New display | Invoked display should be called up in the operator environment. If custom frame windows are used for the |

| Invoking Display | Invoked Display | Expected Behavior |
|---|---|---|
| | | operator environment, the new display should be called up within such a frame window. |
| Display in browser | New display | Invoked display should be called up in a browser window. |
| Display in operator environment | Popup faceplate | Popup window should be called up in custom faceplate frame window. |
| Display in browser | Popup faceplate | Popup window should be called up in either custom faceplate frame window, or browser window without toolbar/menu. A full browser window is not appropriate for popup faceplates. |

These scenarios illustrate that the behaviour of invoked windows is not fixed, and instead depends on the environment in which they are viewed and the type of display being invoked. Other scenarios are also possible. (Note that popup faceplates have their own specialized requirements, and are described further elsewhere in this description).

While the normal hyperliking mechanism allows the new document be opened in a second window, it does not provide any mechanism for passing arbitrary parameters to this new document. Even more importantly, it is unable to dynamically determine if the new window should be created in a browser window or in a frame suited to the operator environment. To create external windows, and to pass parameters to them, script must be used.

There are a number of possible methods for passing parameters to a new display at invocation time. These include the use of client-side mechanisms such as cookies, structured XML data stores, the global data repository (described below), and even the use of HTML behaviours to allow a display to expose properties, methods and events. None of these methods, however, ensure that the parameters being passed are initialised before the new display begins executing. This result in displays showing invalid data upon invocation, and also, in more extreme cases, result in script errors. While any of these mechanisms are usable in the Hendrix architecture, the standard way to invoke displays and pass parameters to them is provided by the data source connector.

The data source connector provides a method call for the creation of new displays, as follows:

window2=DatacreateWindow(URL [, parameter_string])

Where parameter_string is a single string that is capable of specifying an arbitrary number of named parameters. Its format is modelled on the format used for specifying CSS attributes in HTML, and is a semi-colon delimited list of name/value pairs. Each name/value pair is of the form name: value. For example:

createWindow("display2.htm", "param1:LCN.A100.PV; servername:chevron5");

createWindow("display3.htm", "param2:'embedded string as parameter'");

The data source connector invokes the new display and passes parameters to it according to the following sequence:

1. The data source connector invokes a new display with the given URL via the method appropriate to the current environment (browser or operator). The data source connector is aware of whether it has been loaded in the browser or an operator frame, and is thus able to decide how it should create the new window.

2. The data source connector on the new display obtains a pointer to the invoking data source connector (via the opener property of the window object in the DOM.)

3. The data source connector on the new display retrieves the parameter list. It does this by utilizing the IHendrixDisplayParameters interface exposed by the invoking data source connector. The IHendrixDisplayParameters interface is detailed below.

4. If no parameters are to be passed (the parameter list is empty), or no invoking display exists (the opener property is null), the new data source connector fires the OnPageLoadComplete event into the DOM. Display pages must be written such that no data processing can commence prior to this event being fired.

5. If display parameters are to be passed, the new data source connector retrieves the parameter string, exposes the passed parameters via its own object model as explained below, and fires the OnPageLoadComplete event. The page is then ready to commence normal processing.

The data source connector exposes parameters it has retrieved as part of its own object model, in the displayParameters collection. A collection is used, rather than extending the object model of higher-level objects in the DOM, to avoid the possibility of namespace collisions. Parameters are accessed by name or by index (according to the order they were placed in the original parameter string). So, for the first example above:

val1=Data.displayParameters(0) 'val1="LCN.A100.PV"

val2=Data.displayParameters("servername")

'val2="chevron5"

The Hendrix global data repository is, as its name implies, a global repository of data which facilitates inter-display communication. It is a component of the data source manager, and functions as a data source component, supplying the binding engine with an object model that is able to be bound to elements on a display page. The data repository is thus 'global' in the sense that all displays served by the data source manager are able to access its data. For a single-node system (refer to FIG. 22) this implies that the data is machine-wide. In the case of a distinct middle tier, however (refer to FIG. 23), this implies the ability to share display data across nodes. The global data repository replicates the functionality of the Display Database found in GUS systems.

The Hendrix global data repository has a number of requirements, in that it:

1. Allows the user, through script, to store values in a global repository, from where those values are retrievable by other displays running on the machine. This global data must remain available even after the display is terminated.

2. Allows the user to store values in a local repository. Data in the local database has a lifetime dictated by the lifetime of the display itself—when the display is unloaded or changed, the local data is lost. The original reasons for a local repository were for migration from LCN to GUS. In many ways a local database is no different from user-defined variables in script on a page, and for those embodiments where migration issues are solved, then it would not be required.

3. Allows the user to bind to data values stored in the data repository. This means that one display (or even an external application) is able to drive the data shown on a second display simply by changing values in the data repository.

4. Allows the user to store references to data as variables in the database. These variables are updated live to reflect real process values in a target system.

5. Allows objects on a page to bind to data references in the global data repository. In GUS terminology, this means the ability to reference objects in the global data repository in the body of an OnDataChange script. In the Hendrix architecture, this translates to the ability of the binding engine to map data from the global data repository on to the page.

The above describes how the first three of these requirements (related to storing simple variables) are implemented in the Hendrix architecture. The ability to store references in the repository is discussed elsewhere.

Access to the global data repository is provided by the data source connector on each page. This object provides script on the page access to the data repository functionality via the DOM. The global data repository is based around a name-based collection of user-definable variables, rather than a fixed set of attributes. The user is able to define their own database variable names, allowing for greater flexibility.

The data source connector has three methods related to the storage of simple variables (Add, Item, Remove) and one property (count). These function as follows:

Data.Add:

Adds a new item, in the form of a named variable, to the global data repository. The syntax for this operation is:

Data.Add(name, value)

where name is a string, and value is a variant. For example:

Data.Add("val01", 97.2)

Data.Add("val02", "string_value")

Data.Item

Returns the specified item from the global data repository. The syntax for this operation is:

Data.Item(name)

For example:

savedValue=Data.Item("val01")

Data.Remove

Removes an item from the global data repository. The syntax for the operation is:

Data.Remove(name)

Data.count

Returns the number of user-defined variables in the global data repository collection.

In addition to providing a global repository of data, in which stored variables and data references remain persistent across page changes, the data source connector also provides local storage to display pages. Data stored in the local database only exists during the life of the display, and is accessible by any object in the display. The names of items in the local database are only visible to the display using them.

A display's local database possesses the same functionality as the global database. It is accessed using the DataLocal sub-object, using the same functions as the global database. For example:

Data.Local.Add("val01", 97.2)

Data.Local.Item("val01")

Data.Local.Remove("entity1")

Data.Local.count

Figure 25:
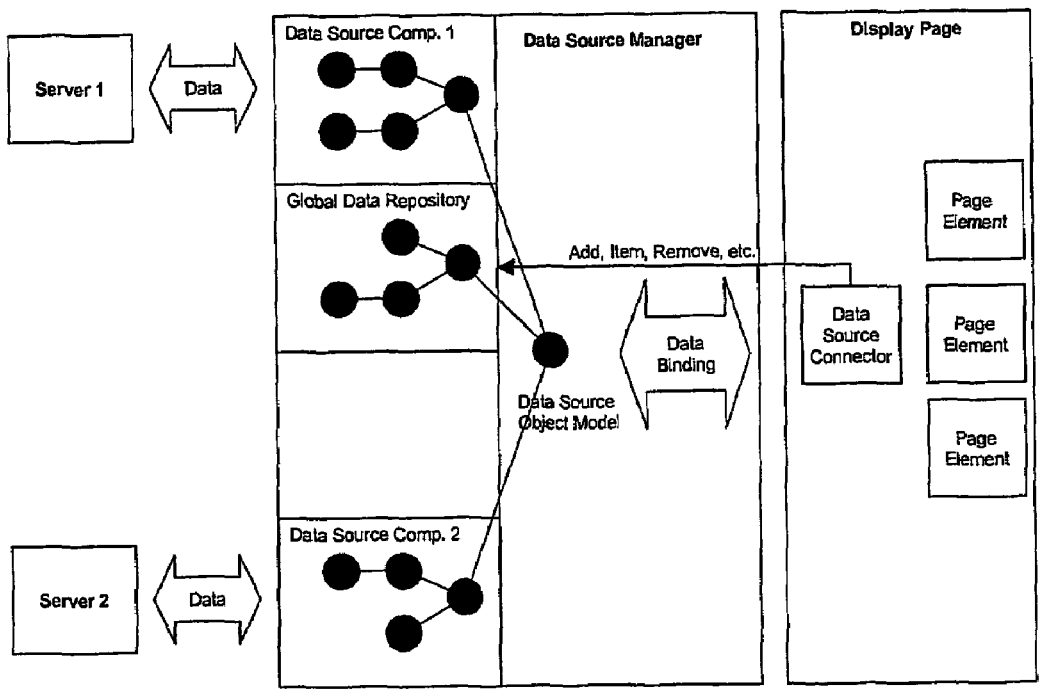
FIG. 25 is a schematic representation of the binding to the global data repository used by an embodiment of the invention.

The Hendrix architecture also provides the ability to bind to data items in the data repository. This is accomplished via the normal data binding mechanisms, with the implication that the global data repository functions as a data source component, managed by the data source manager. This aspect of the architecture is illustrated in FIG. 25.

The binding definition for an object bound to data in the data repository is relatively straightforward. For example:

```
<BODY>
    <SPAN ID="Alpha1" CLASS="Hendrix; PlantscapeCommands" BINDINGDEF="Alpha1BindingDef">
    </SPAN>
```

-continued

```
<HENDRIX:BINDINGDEF ID="Alpha1BindingDef">
    <DATA ID="DataRef1" REF="Data.Item('val01')"/>
    <BINDING SOURCE="DataRef1" TARGET="PageElement.InnerHTML"/>
    </HENDRIX:BINDINGDEF>
</BODY>
```

The global data repository also allows the user to store references to process data, which, when retrieved by a display page, reflect real process variables in a target system. For example, there are circumstances where a user requires to store the value of LCN.A100.PV in the display database variable "var01", and have this variable updated automatically to reflect the value of the process variable. This process is substantially different from the ability to store simple values.

As described above, the data repository behaves like a data source component when it comes to simple values. For data references, however, this is not the case. Data references must continuously retrieve data from the server system, thus placing a load on bandwidth. As items in the data repository are globally persistent, this means that valuable bandwidth could be taken even when no displays are loaded on a machine. This is clearly undesirable. Ideally, data should only be being gathered by data source components when that data is required in some form by a currently loaded display.

To realise this optimisation, the data repository does not behave as a data source component for data references, but as a data source dictionary. It provides a dictionary service to the data source manager, which in turn allows data source components to achieve a form of data indirection when the page is loaded. This facility is explained elsewhere in the specification. To a user, however, the ability to access data references appears no different from the ability to access simple values in the repository, as explained below.

Data references are stored in a similar way to simple variables, through a set of three methods (AddRef, ItemRef, RemoveRef) and one property (countRef). These function as follows:

Data.AddRef

Adds a new item, in the form of a named variable, to the display database. The syntax for this operation is:

Data.AddRef(name, value [, xml_data])

where name is a string, and value is a string name representing either a parameter or an entire object in the data source object model. If an entire object, it is assumed any properties or sub-objects are implicitly included in the display database. For example:

| | |
|---|---|
| Data.AddRef("val01", "LCN.A100.PV") | 'parameter reference |
| Data.AddRef("val02", "LCN.A100") | 'entity (or object) reference |

The optional parameter, xml_data, is an XML structure defining server-specific information pertaining to data collection (e.g. update rates, collection groups, etc).

Data.ItemRef

Returns the specified item from the display database. The syntax for this operation is:

Data.Item(name)

For example:

savedValue=Data.ItemRef("val01")

savedValue2 =Data.ItemRef("val02").PV

Some data source components may have pre-defined server-specific entities intended to represent certain aspects of the server system. As data references are stored as strings, any syntax may be used to reference these items. For example:

Data.ItemRef("val03", "LCN.$AL_ENTY") 'server-specific entity,

Data.RemoveRef

Removes an item from the display database. The syntax for the operation is

Data.RemoveRef(name)

Data.countRef

Returns the number of user-defined data references in the display database collection.

Display page objects are also, in some cases, bound to references in the data repository, the same as simple variables. For example, the following binding definition is used to bind an object to the data reference stored in the item "val01":

```
<BODY>
    <SPAN ID="Alpha1" CLASS="Hendrix; PlantscapeCommands" BINDINGDEF="Alpha1BindingDef">
    </SPAN>
    <HENDRIX:BINDINGDEF ID="Alpha1BindingDef">
        <DATA ID="DataRef1" REF="Data.ItemRef('val01')"/>
        <BINDING SOURCE="DataRef1" TARGET="PageElement.InnerHTML"/>
    </HENDRIX:BINDINGDEF>
</BODY>
```

As mentioned previously, the data repository does not actually store references to data, in an attempt to reduce possible bandwidth usage. Instead, it supplies a dictionary of reference information that the data source manager uses to look up when a page is loaded. A typical sequence is as follows:

1. Initial display stores a reference to "LCN.A100.PV" in the data repository reference "val01".

2. Subsequent display is loaded, with a reference to "Data.ItemRef('val01')" in its data definition, along with the usual fixed data references (e.g. LCN.A101.PV). It passes this data definition to the data source manager.

3. The data source manager detects that an indirect data reference through the data repository is required. It queries the data repository to resolve this to a reference to actual data.

4. The data source manager then hands the fully-resolved data source definition to the appropriate data source, which then constructs its part of the data source object model.

5. The binding engine binds directly from the data source component to the page. No binding is performed from the data repository to the page.

Figure 26:
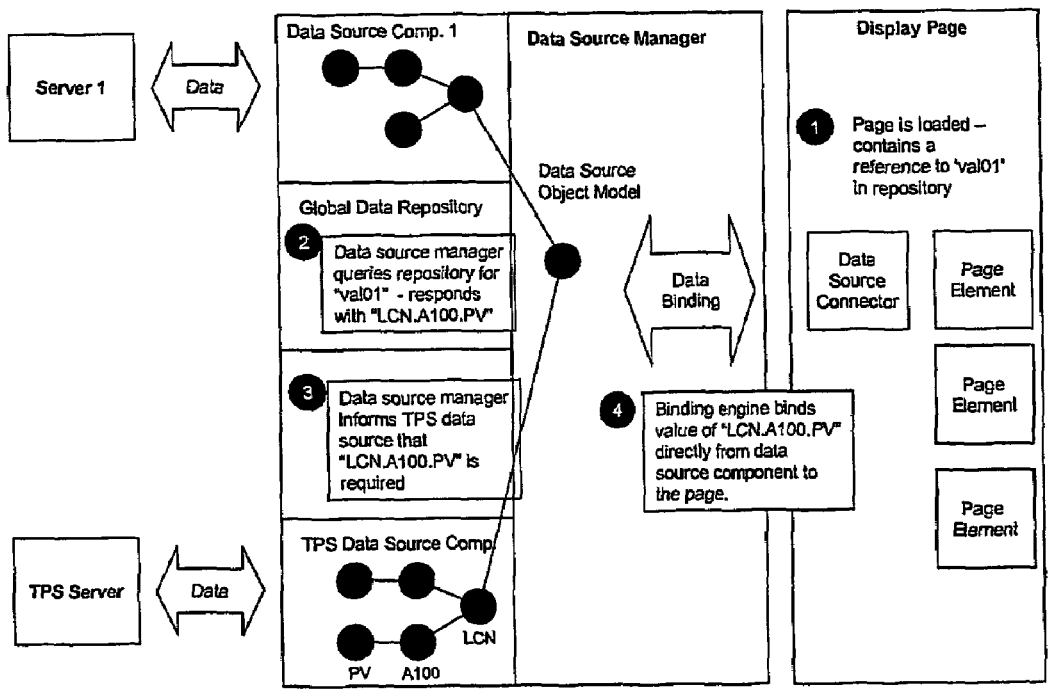
FIG. 26 schematically illustrates the sequence of events upon page callup.

FIG. 26 schematically illustrates the sequence of events upon page callup.

In this scenario, dynamic data is only retrieved by a data source component when it is required by a page. When the page is unloaded, the data source component unloads any referenced data from its object model. The only persistent data is the dictionary lookup information in the data repository that maps "val01" to "LCN.A100.PV".

This process results in efficient use of communications bandwidth between data source components and their respective servers. It does, however, bring into question the issue of performance. For systems where the mapping between human-readable data reference name and actual machine identifier is slow, a performance penalty will be paid every time a page is loaded. This performance penalty is avoided by allowing the data repository to store pre-binding information along with the dictionary item.

This concept is similar to the ability to perform a pre-binding step in the builder. For data defined at build time, the data source component supplies a service to the builder which translates the human readable data tags into machine identifiers. This server-specific information is then stored with the data definition, and passed to the data source component at runtime to enable fast callup of the page. In the case of the data repository, the situation is similar. When the data reference is first defined (via a call to Data.AddRef), the data source manager queries the data source component for any pre-binding information it may supply. This pre-binding information is then stored in the repository along with the dictionary item. On page callup, when the data reference is actually required, the pre-binding information is passed to the data source component in order to ensure fast retrieval of the data.

At runtime, it is possible for a display to change the reference stored in the data repository. In the above example, with a page element bound to "LCN.A100.PV" via indirection through "val01" in the repository, the following script code is executed on the display:

Data.AddRef("val01", "LCN.A200.PV")

This script not only alters the dictionary reference stored in the repository, but also re-bind any page elements currently bound to LCN.A100.PV to LCN.A200.PV. This implies the following capabilities of the architecture:

1. The data source component must be able to incrementally add LCN.A200.PV to its object model.

2. The data repository must be aware that page objects are currently bound to objects in the data source object model via an indirection through "val01", and inform the data source manager when its value changes.

3. The binding engine must be able to dynamically re-bind to the new data element.

Dynamic binding (in which bindings between data objects and page elements are modified at runtime) differs from static binding (in which bindings are defined at build time and created when the page is initially invoked). To achieve dynamic binding, the binding engine exposes the IHendrixDynamicBinding interface. The data source manager uses this interface at runtime to tell the binding engine to set up a binding between data and a new object in the display database.

Popup window functionality differs slightly from more generic inter-display communication, in that the invoked popup window generally encapsulates specialized functionality, and is expected to behave differently on screen from a normal display window. Examples of this include faceplates, where extra functionality is required to determine which faceplate to invoke, as well as complex lifetime management for push-pin type popup windows.

The invocation of popup windows involves several distinct areas of functionality, each of which imposes requirements on the Hendrix architecture:

Identification

A standard method is required for identifying which popup window needs to be invoked. In the case of faceplates, this will depend on the currently selected object, or tag name in the system.

Invocation

The architecture must accommodate a standard method for the invocation of popup windows.

Position Management

In some systems, operators are accustomed to activating a large number of modeless popup windows. When multiple displays are shown on a single machine, some way must be provided to manage these popup windows.

Lifetime Management

Popup windows must have the ability to be "push-pinned", so that they are not terminated when the originating display changes. The architecture must provide lifetime management services to facilitate this functionality.

Preferences

The TPA system requires the ability to "store" an arrangement of faceplates for a display, so that when the operator returns to that display the arrangement of faceplates reappears in the configured positions on screen, without having to be invoked individually by the operator.

The above limitations are now discussed in more detail with reference to the way in which the preferred embodiments of the invention accommodate these limitations.

The ability to identify which faceplate to invoke for a given point or tag, or object on a display, must be accessible from script, and also activated inherently as part of the architecture (for example, when a screen object is double-clicked).

First consider the scripting case. When the point name is known, the associated faceplate name is retrieved by a simple call on the data source connector:

faceplateName=Data.getFaceplate(point_name)

where both point_name and faceplateName are strings. The point identifier must be fully qualified, in that it identifies the data source on which the point resides ("LCN.A100", for example). The faceplate name is a URL.

At times, however, the point name will not be known, and the user will want to determine the faceplate associated with an HTML element directly. This functionality is provided by the same method on the data source connector, only taking a reference to an element in the DOM instead of a string:

faceplateName=Data.getFaceplate(element)

The element is specified directly via the element ID, or by specifying its position in the DOM (document.group1.text1, for example).

The above methods provide the ability to identify a faceplate name via script. In general, however, it is preferable that faceplate invocation is not handled through script on a page (as it would then need to be written for every object on that page), but instead as an inherent part of the architecture. This capability is provided by a binary HTML behaviour, which is then applied to all objects on a page. The behaviour is then responsible for the method of invocation (right-click, double-click, etc.), for identifying which faceplate to invoke, and the invocation itself.

In the case of a binary behaviour, the method used to retrieve the faceplate name is still the same: method calls on the data source connector. It is envisaged that the faceplates are invoked as part of a converged user interface, although as to how these behaviours are standardized across all Hendrix implementations is not relevant. This is a matter for the style guide and has no impact on the architecture.

Note also that this method of faceplate identification places specific requirements on the architecture components, as follows:

1. The data source connector must expose the getFaceplate method call.
2. The data source manager, and specific data source components beneath it, must be able to map a point name to a faceplate name, to enable the first type of call to getFaceplate to work.
3. The binding engine must be able to provide a backward mapping from an object in the DOM to the data object which is driving it. The data source component, subsequently, must be able to map this data object into a point name, to honour the second type of call to getFaceplate.

There are two types of popup window generally required to be called from script—faceplates representing point details, and data entry dialog boxes intended to return information to the calling window. These are each invoked in different ways.

A dialog box is either modal or modeless. A modeless dialog box, constructed from HTML, is no different from activating a separate display window. In the pure HTML world, this would be accomplished by a call to window.open, with parameters used to specify that no toolbar, menus, etc are required in the invoked window. In the Hendrix architecture, this is accomplished with a call to Data.createWindow. The data source connector needs to be aware of its environment, to decide whether to create the window in a browser window or an appropriate framework window. The need to be able to create a modeless dialog window, however, adds extra requirements to the createWindow method, namely that it accepts the same parameters as the window.open method, allowing the creation of modeless dialog boxes in the web browser environment. Thus the full syntax of the createWindow method is:

window2=Data.createWindow(URL [, parameter_string
[,name
[,features
[,replace]]]]);

where URL and parameter_string are explained above, and name, features, and replace are the same as the parameters used in the window.open method. Information is passed between the dialog box and the calling window as described above.

To create a modal dialog box in a normal HTML page, the window.showModalDialog method is called. Similar to the case for opening separate windows, however, the appearance of the invoked modal dialog depends on the environment in which it is invoked. In the browser environment, it is acceptable to display the standard Internet Explorer dialog, but in the operator environment a more custom frame may be required. Thus the data source connector exposes the following method:

variant=Data.showModalDialog(URL [, vArguments [, sFeatures]])

Here the parameters are the same as those used in the window.showModalDialog method—the only difference is that the frame used for the invoked dialog box is dependent upon the environment.

Faceplate windows are different, in that a faceplate has no parallel in the HTML world. The frame window used for faceplates includes, for example, a pushpin button to allow faceplates to be kept on the desktop even as the underlying page changes. The frame window used for faceplates will be the same in both web browser and operator environments. Faceplates themselves will be created in HTML.

The invocation of a faceplate is executed as a method call on the data source connector. This call often takes multiple forms:

window2=Data.showFaceplate(sURL [, parameter string [, sFeatures]])
window2=Data.showFaceplate(point_name [, parameter_string [, sFeatures]])
window2=Data.showFaceplate(object [, parameter_string [, sFeatures]])

The first of these calls simply specifies the faceplate filename (which may have been previously retrieved by a call to getFaceplate), and an optional display parameter string, using the same method outlined for passing parameters as mentioned above. It also accepts the optional parameter sFeatures, which is used to specify position information on screen, and is identical to the parameter of the same name in the showModalDialog method in the DOM.

The second method passes a string specifying a point name. In this method, the showFaceplate call is responsible for determining which faceplate to invoke, removing the need for the user to call getFaceplate separately.

The third method also removes the need for a separate call to getFaceplate. In this case, an object in the DOM is passed as a parameter, instead of a string specifying a point name. Again, the data source connector is responsible for determining which faceplate to show, and then invoking that faceplate.

Position management is an issue for faceplates in the TPA system, where faceplates move when the main display window is moved, minimise when the main window is minimised, and are constrained to the client area of the parent window. This is not an issue for most other systems (GUS utilizes its own desktop management system in SafeView, for example, and PlantScape conforms to the standards used in Microsoft products, where a modeless push-pinned dialog is moved independently of its parent window). For a system utilizing a large number of faceplates displayed at any one time, however, such as TPA, these solutions are not sufficient, and some form of position management system is required.

Almost any type of faceplate window behaviour can be achieved, as long as the faceplate window has access to the window handle of its intended parent. If the faceplate declares itself as an MDI child window, it will behave as such, even if the parent is not an MDI application. This is the case for TPA faceplates. If the faceplate declares itself as a normal child window, it will minimize with the parent window, but not be constrained to the parent client area. And if the faceplate is a normal window, but sets its parent window to the calling display, it will minimize with the parent, but not be constrained to the parent client area, and move independently of the parent.

The key to this functionality is obtaining the window handle (HWND) of the application containing the calling display. This is simple in the operator environment, as the data source component (which creates the faceplate in its showFaceplate method) is able to obtain this window handle from the framework. In the browser environment, however, this is not possible. This constitutes yet another differentiator between the two environments—faceplates are not as easy to manage in the browser environment. As faceplates are generally associated with process-control type functions, this is an acceptable compromise.

The mechanism used by the data source connector to set the parent window on the invoked faceplate is simply as a property set on the faceplate object—it must expose the parentHWND property to be set by the data source connector. It is up to the faceplate object to decide how it uses this window handle, which in turn dictates its behaviour. (It will be quite feasible to build a generic faceplate container, which depends on information in the individual faceplate HTML definition to decide which behaviour to exhibit. Thus TPA faceplates could function differently from PlantScape faceplates, while still using a single faceplate container window).

Lifetime management of faceplates is an issue in the case of the pushpin functionality required by the TPA system. Normally, when a faceplate is invoked, it is destroyed when the operator changes displays. If the faceplate is "pinned", however, it will remain visible across page changes. If it is subsequently "unpinned", the next page change will destroy the faceplate. The mechanism used in Hendrix to inform faceplates of page changes is as follows:

1. The data source connector on each page retains pointers to each faceplate object it has invoked.
2. Upon page change, the data source connector informs each of these faceplates that the page is changing.
3. The faceplates return a result to the data source connector indicating whether they have destroyed themselves or not, depending on their pushpin state.
4. The data source connector updates its array of pointers to indicate the remaining faceplates, then persists this information so that it can be retrieved by the data source connector on the new display. (The ability to persist COM pointers across page changes is already possessed by the data source connector, as connection information also needs to be persisted across page changes, so that a new page can connect to the same data source as the previous page).
5. The data source on the new page retrieves the pointers to the faceplates it needs to manage, so that it can subsequently inform them when it is being destroyed.

Preferences, where they pertain to faceplates, concern the ability of an operator to define a set of faceplates that they want to be called up each time a particular display is invoked. This is done in a similar way to the lifetime management of faceplates. The data source connector on a page already retains an array of pointers to the faceplates it has invoked. When asked to persist preference information, it requests configuration information from these faceplates (such as position, point name, etc.), then persists this information in a structured XML data store. This information is stored on a per-user, per-display basis. It then exposes a method, showPreferenceFaceplates, which will retrieve this information and invoke the faceplates, in the required positions, as required.

In summary, then, the last three functionalities impose certain requirements on both the data source connector and the faceplate object as used in the preferred embodiments. These requirements are as follows:

The faceplate object must expose the queryDestroy method, which is called by the data source connector when it is being unloaded. This method returns a value indicating whether the faceplate did, in fact, destroy itself. (The faceplate must also expose a destroy method, which destroys the faceplate regardless of pushpin state.)

The data source connector must expose the showPreferenceFaceplates method.

The data source connector must expose the persistFaceplatePreferences method, which will cause it to query all open faceplates for their position information, and store this information in structured XML data.

The faceplate object must expose methods which returns configuration information (such as current position on screen, as set by the operator, and current point name). The data source connector calls these methods when storing faceplate preferences.

The faceplate object must expose the parentHWND property, which, when set, it will use to create itself as a child of that window.

The following features are set out to provide the addressee with some additional insight into the architecture of the preferred embodiments.

IHendrixBinding

---

[ object, uuid(11877500-CA13-11D2-B6EA-00C04FF010A0) ]
interface IHendrixBinding : IUnknown -continued

```
{
    // TBD
};
```

IHendrixBinding is implemented by the binding engine's internal binding objects.
IHendrixBindingEngineCache

```
[ object, uuid(11877501-CA13-11D2-B6EA-00C04FF010A0) ]
interface IHendrixBindingEngineCache : IUnknown
{
    HRESULT Flush( );
    HRESULT QueryMode([out]BOOL *pbCacheOn);
    HRESULT SetMode([in]BOOL bCacheOn);
};
```

IHendrixBindingEngineCache is implemented by the Hendrix data binding engine to allow data sources to control the binding engine's transmission cache. This cache is used to buffer updates to the display page to minimize round trips between the binding engine and the display page.
IHendrixCollection

```
[ object, uuid(11877502-CA13-11D2-B6EA-00C04FF010A0) ]
interface IHendrixCollection : IDispatch
{
};
```

IHendrixCollection is implemented by collection subobjects. It is an empty interface used as a type indicator for the binding engine navigating the object model via IHendrixDataRef
IHendrixConnectionPoint

```
[ object, uuid(11877503-CA13-11D2-B6EA-00C04FF010A0) ]
interface IHendrixConnectionPoint : IUnknown
{
    HRESULT Connect([in] riid,
        [in, iid_is(riid)]IUnknown *pNotifySink,
        [out]DWORD *pdwCookie);
    HRESULT Disconnect([in]DWORD dwCookie);
};
```

IHendrixConnectionPoint is an improved version of the standard connection point mechanism. It requires only one transaction to establish the connection.
IHendrixDataRef

```
[ object, uuid(11877504-CA13-11D2-B6EA-00C04FF010A0) ]
interface IHendrixDataRef : IDispatch
{
    typedef struct
    {
        REFIID riid;
        [iid_is(riid)]IUnknown *pSubObject;
    } SUBOBJ;
    HRESULT GetSubObjectsOfNames([in,size_is(cNames)]
OLECHAR **rgszNames,
        [in]unsigned int cNames,
        [in]LCID lcid,
        [out,size_is(cNames)] SUBOBJ *rgSubObjects);
```

-continued

```
};
```

IHendrixDataRef is implemented by objects in the data source object model. It is an extension of the standard IDispatch interface that allows the object hierarchy to navigated more quickly.
IHendrixDataSource

```
[ object, uuid(11877505-CA13-11D2-B6EA-00C04FF010A0) ]
interface IHendrixDataSource : IUnknown
{
    HRESULT Init([in]IHendrixBindingEngineCache *pCache,
        [in]IStream *pBindingDefStream,
        [out]IHendrixDataRef **ppDataSourceRoot);
    HRESULT Start( );
    HRESULT Stop( );
};
```

IHendrixDataSource is the main interface exposed by a data source. It allows the data source manager to initialize, start and stop the data source.
IHendrixDataSourceManager

```
[ object, uuid(11877506-CA13-11D2-B6EA-00C04FF010A0) ]
interface IHendrixDataourceManager : IUnknown
{
    //TBD
};
```

IHendrixDataSourceManager is the main interface exposed by the data source manager. It is used primarily by the data source connector in the display page and by any run time frameworks managing display pages.
IHendrixNotifySink

```
[ object, uuid(11877507-CA13-11D2-B6EA-00C04FF010A0) ]
interface IHendrixNotifySink : IUnknown
{
    HRESULT OnChange([in]DISPID dispid,
        [in]VARIANT newVal);
};
```

IHendrixNotifySink is implemented by the binding engine's internal binding objects. It is used by data reference objects to notify the binding engine of changes to property values.

The next part of this document provides a description of the Hendrix data source architecture. In particular, it describes the components and interactions relevant to any data source implementation. There is provided an overview of the architecture and how data sources relate to the rest of the Hendrix architecture as well as a description of the components that comprise a data source in detail including required interfaces and interactions with other components.

This document focuses on the implementation of Hendrix data sources. A data source is a component that exposes data, events and methods provided by a specific server system to the Hendrix data binding engine. The data binding engine then provides the means by which these data, events and methods are bound to the presentation elements in a display page.

A data source provides a means of encapsulating all of the mechanisms required to access a server system from an HMI. It encapsulates the mechanisms for establishing and securing connections to a server system, delivering data to and from a server system, delivering events from the server system to the HMI and invoking methods on the server system from the HMI.

Figure 27:
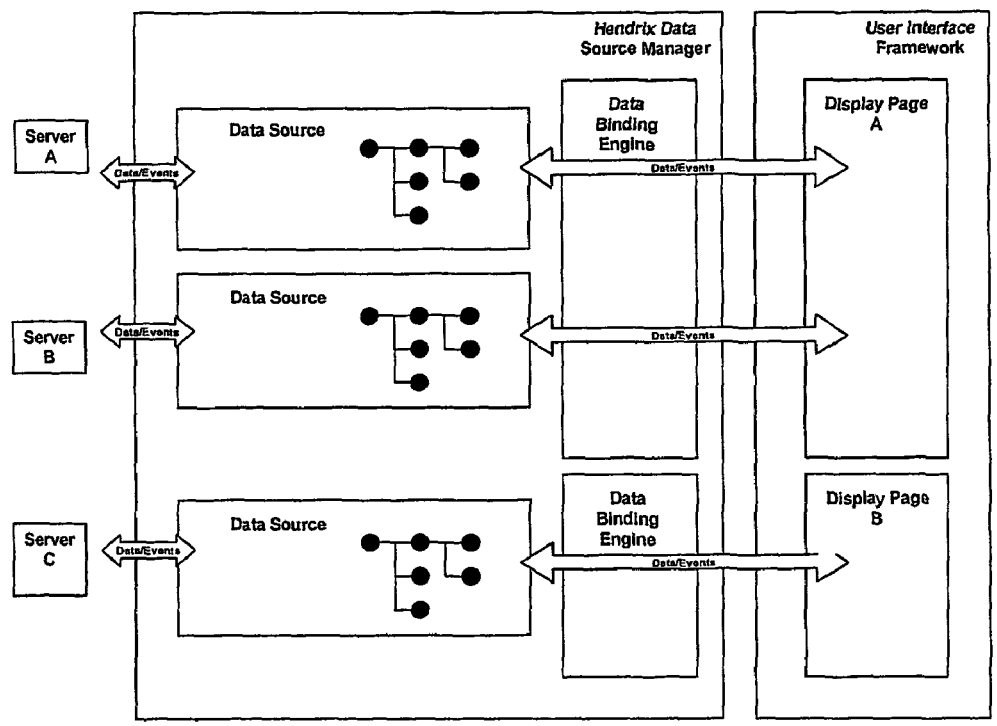
FIG. 27 schematically illustrates the general arrangement of the Hendrix data source architecture.

A data source implementation of the preferred embodiments actually consists of two main parts. The first is the data source component itself, which is responsible for the overall operation of the data source such as establishing connections to server systems and persistence of the data source. The second part is a hierarchy of data objects, called the data object model, which exposes the server system data, events and methods to the Hendrix data binding engine. The data source component also acts as the root of the data object model. FIG. 27 illustrates the general arrangement of the Hendrix data source architecture.

A Hendrix user interface framework hosts one or more display pages. A user interface framework uses the services of a Hendrix data source manager to manage a set of data sources that supply data to the display pages it hosts. The data source manager provides an execution environment for data sources that includes a number of services that they require in order to provide efficient, secure access to data.

Hendrix data sources, as used in the present embodiments, are in-process COM objects. They belong to the Honeywell Data Source component category identified by the following GUID.

CATID_HDXDataSource={E2156A20-640F-11d3-B766-00C04FF010A0}

This component category is used by interested parties (e.g. the Hendrix display builder) to learn what data source implementations are available on a system.

Figure 28:
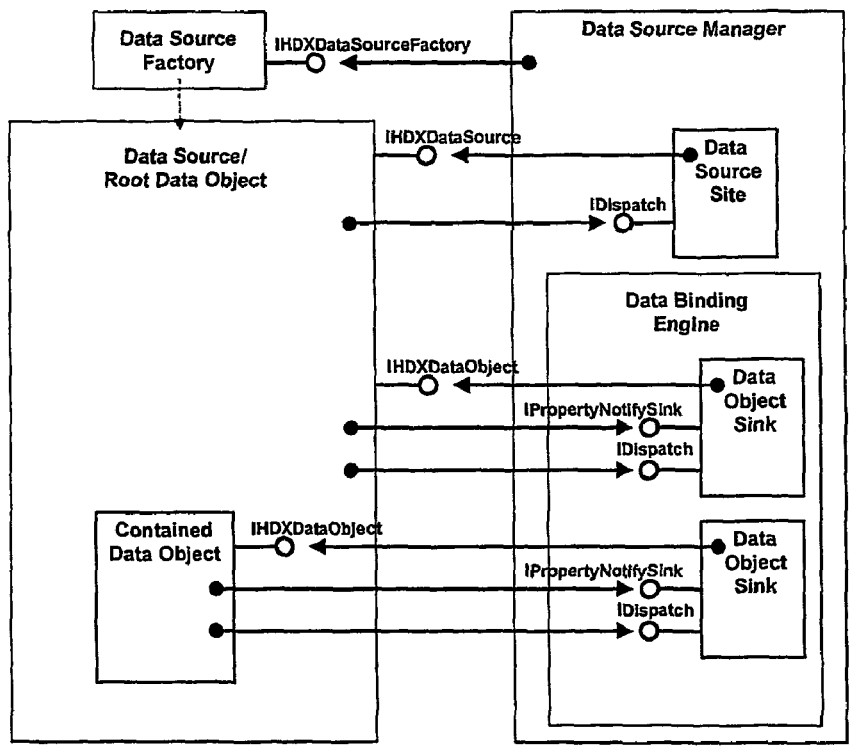
FIG. 28 schematically illustrates the components that constitute a data source, the main COM interfaces they implement and the main relationships they have with other parts of the Hendrix architecture.

FIG. 28 illustrates the components that constitute a data source, the main COM interfaces they implement and the main relationships they have with other parts of the Hendrix architecture.

The only externally createable object in a data source implementation is the data source factory. The data source factory is a regular COM object (not a class object) that is used to manufacture instances of a particular data source implementation. The data source factory is cached by the data source manager for the lifetime of the data source manager and provides an opportunity for a data source implementation to share resources such as network connections between data sources (concurrently and serially). A regular COM object is used rather than a COM class object to enable data sources to be implemented in Visual Basic. The data source factory implements IHDXDataSourceFactory, which is used to manufacture a new data source instance.

The main COM interfaces implemented by a data source are IHDXDataSource and IHDXDataObject. IHDXDataSource allows the data source manager to access the methods that control the overall operation of the data source. IHDXDataObject allows the data source manager to access the methods used to control individual data objects in the data object model.

Data sources and data objects implement a number of other COM interfaces to complete the functionality required by the data source manager and clients of the data source manager. These interfaces are described in further detail below.

Hendrix data sources expose a set of standard properties that control their behaviour in various circumstances. There are currently two standard properties defined, these are "SimulatedData" and "QualityOfService".

SimulatedData is a boolean property whose value indicates whether or not the data source should deliver real or simulated data. Typically, SimulatedData is set to TRUE when the client of the data source manager is the Hendrix Display Builder and set to FALSE when the client of the data source manager is a run time framework.

QualityOfService is an enumeration that indicates to the data source what quality of service is desired. Control room operators would typically require a high quality of service, while a lower quality of service might be adequate for more casual users.

It is up to each data source implementation to decide exactly how it will respond to the various values of these properties. It is expected that this set of properties will expand over time and the architecture allows for this expansion. More information on standard data source properties is provided below.

Each data source has a site object through which it accesses a variety of services. These services are exposed as a set of ambient properties accessible via IDispatch on the site object. The services provided by the site object currently include a data transfer service, a security service and an error logging service.

The data transfer service allows a data source to register data objects with the Hendrix binding engine and to control the transfer of data through the binding engine. The data transfer service is accessible through the "DataTransfer" ambient property. Additional details on the data transfer service are provided below.

The security service allows a data source to discover the credentials of the user currently logged on to the user interface framework and to receive notifications of changes to those credentials. The credentials are available through the "Username" and "Password" ambient properties and the notification service is available through the "Security" ambient property. Further details about the security service are provided below.

The "Error" ambient property can be used to access the error logging service, and is described further below.

The data object model is the means by which a data source exposes individual server system data items to the Hendrix data binding engine. Each data object is in essence a conduit through which data and events are delivered from the server system to the user interface and data and method invocations are delivered to the server system from the user interface. Data objects are arranged in a hierarchy rooted at the top level data source object.

Data objects typically have a set of properties that control what data is to be delivered and how to deliver that data and are referred to as configuration properties. The set of configuration properties constitutes the persistent state of a data object and a data object provides property pages to allow these configuration properties to be configured. The most common client of these property pages will be the Hendrix display builder. Configuration properties typically include the name of the server system data item to be delivered by the data object. The IHDXName interface is used as an abstraction of the details required to specify such names.

Data objects also have a set of properties that expose the actual server system data that is to be bound to a display page. These properties are referred to as dynamic properties. Dynamic properties also support data binding (that is, they are marked as [bindable] in a type library). This means that a data object will issue a property change notification via IPropertyNotifySink whenever a dynamic property changes.

Some properties belong in both sets, that is, they are used to configure the delivery of data in the builder and are bound to a display page at run time.

A data object also defines an outgoing interface if it supports events. Events are fired into the binding engine using an implementation of IDispatch provided by the binding engine.

Since many server systems contain different types of data items, data object models contain different types of data objects. These types expose the data, events and methods relevant to the various types of underlying server system data items. Data object types are identified using a syntax similar to COM programmatic IDs (progIDs).

The number and type of data objects in an instance of a data object model are generally determined by the data requirements of the particular display page that the instance services. The user determines these requirements as the display page is constructed.

The actual interface between data objects in a data source and the Hendrix data binding engine is based on the standard COM Automation mechanism. This makes it relatively easy to build data objects using standard COM enabled tools such as ATL, Visual Basic and J++.

In addition to the configuration and dynamic properties discussed above, a data source also provide properties and methods for navigating the data object model. This enables the data object model to be scripted using standard ActiveX scripting engines.

The following automation compatible types are used for properties and method or event arguments on data objects.

VT_UI1, VT_I2, VT_I4, VT_R4, VT_R8, VT_CY, VT_DATE, VT_BSTR, VT_VARIANT, VT_BOOL, VT_NULL, VT_ERROR

Safe arrays of these types are also supported (that is, VT_ARRAY|*). BY_REF properties are not supported.

There are two general cases in which a data source will be persisted. The first is saving the configuration of the entire data source to allow efficient reloading at a later time. The most common scenario will be saving the data source configuration after the data source has been modified by the Hendrix display builder and then loading the configuration when a display page is called up in an operator framework.

The second case is when individual objects in a data source are persisted independently of one another. This occurs primarily when the Hendrix display builder is performing clipboard operations such as cut, copy and paste.

The first case requires that there be an implementation of IPersistStreamInit that saves and loads the entire data source state to and from a stream provided by the data source manager. Performance is of paramount importance in this case so data sources should use a stream format that allows them to load as quickly as possible. This format often contains additional information derived during data source validation in order to facilitate speedy loading.

The second case requires that all data objects in a data source support the persistence interfaces IPersistStreamInit as a minimum and preferably IPersistPropertyBag. In this case performance is not as critical and any convenient stream format is used.

Since all data objects including the root data object are required to implement persistence interfaces to support clipboard operations there needs to be a separate implementation of IPersistStreamInit that is used to serialize the entire data source. This implementation is retrieved via a call to IHDXDataSource::GetPersistenceHelper.

Data objects exist to deliver data from server systems. An important part of configuring a data object to deliver data is the specification of exactly what data to deliver. It is important to realize that the identity of the data object is not the same as the identity of the server system data item that it delivers to the binding engine.

Many data objects are associated with one and one only server system data item. In this case there is a single name property on the data object. It is also possible for a data object to have more than one server system name associated with it. An example of this might be a data object that provides an array of historical data for a number of point parameters. In this case there would be one name property for each point parameter. Such a data object might be used to drive a trend object.

Typically, the user of the Hendrix display builder provides these names. Before a user enters a name the user has to discover what names are available and then choose one. The two main mechanisms for this are to "remember and type" or to provide a namespace browser mechanism that allows the user to navigate a server system's namespace and select names directly from that namespace.

In either case, the process is greatly assisted by providing knowledge of the type of named object required. For example, if a data object is designed to deliver PlantScape point parameter data, the browser is constrained to show only names of PlantScape point parameters.

The IHDXName interface is designed to encapsulate both a server system name and the type of the named object. A data object that requires server system names as part of their configuration exposes one or more sub-objects that expose the IHDXName interface. The builder uses IHDXName::get_Type to constrain the namespace browser or prompt the user. IHDXName::put_Name is then used to set the name.

When data objects are arranged in a hierarchy, the name properties on the data objects are preferably partial names that, when taken together, form a complete name. In such a case IHDXName::get Name would return the partial name and IHDXName::get_FullName would return the complete name up to that point in the hierarchy.

Since a user's primary interest is not in the names of the data objects but in the names of the server system data items that they deliver, there needs to be a way of mapping from server system names back onto data objects. This is required when a user wants to access a data object from script code and will probably not even be aware of the identity of the data object itself. In this case the user supplies the name of the server system data item and the system queries the data objects for one that knows about the requested name.

IHDXDataObject::GetPrimaryName is provided to allow the binding engine to query a data object for the name most likely used by a user to identify it. In the case of data objects with a single name property it is simply that single name property that is returned. In the case of a data object with more than one name property, the data object nominates one of these to be the primary name.

The following part of the specification describes the interfaces that are implemented on data sources and data objects. Particularly, the following table lists the interfaces implemented by Hendrix data sources.

| INTERFACE | OPTIONAL |
| --- | --- |
| IHDXDataSource | No |
| IHDXDataObject | No |
| IHDXDataSourceValidation | Yes |
| IHDXSecurityNotify | Yes |
| IObjectWithSite | Yes |

| -continued | |
| --- | --- |
| INTERFACE | OPTIONAL |
| Idispatch | Yes |
| IProvideClassInfo2 | Yes |
| ISpecifyPropertyPages | Yes |
| IPerPropertyBrowsing | Yes |
| IPersistStreamInit | Yes |
| IPersistPropertyBag | Yes |
| ISupportErrorInfo | Yes |

IHDXDataSourceValidation is only required by data sources that support the validation of their configuration.

IHDXSecurityNotify is only required by data sources that need to be kept informed of changes to the current user's security credentials.

IDispatch, IProvideClassInfo2, ISpecifyPropertyPages and IPerPropertyBrowsing are required only if the data source object itself has persistent build mode properties.

IPersistStreamInit or preferably IPersistPropertyBag is required if the data source object has any persistent configuration properties.

ISupportErrorInfo is optional but the data sources of the preferred embodiments implement this interface so that they provide detailed error information to the data source manager in the event that a method in one of the above interfaces fails.

The following table lists the interfaces implemented by Hendrix data objects.

| Interface | Optional |
| --- | --- |
| IHDXDataObject | No |
| IConnectionPointContainer | Yes |
| IConnectionPoint | Yes |
| IDispatch | Yes |
| IProvideClassInfo2 | Yes |
| ISpecifyPropertyPages | Yes |
| IPerPropertyBrowsing | Yes |
| IPersistStreamInit | Yes |
| IPersistPropertyBag | Yes |
| ISupportErrorInfo | Yes |

The only mandatory interface on a data object is IHDXDataObject. If the data object does more than simply contain other data objects it will need to implement some or all of the other interfaces listed above.

Data objects that deliver data to the Hendrix data binding engine implement IConnectionPointContainer, IConnectionPoint, IDispatch and IProvideClassInfo2.

ISpecifyPropertyPages and IPerPropertyBrowsing are required only if the data object has configuration properties.

IPersistStreamInit or preferably IPersistPropertyBag is required if the data source object has any persistent configuration properties.

ISupportErrorInfo is optional but it is recommended that data sources implement this interface so that they provide detailed error information to the data source manager in the event that a method in one of the above interfaces fails.

This following part of the specification describes the general operation of Hendrix data sources. Two common scenarios are considered in detail. Firstly, data source operation when the client of the data source manager is an operator framework is considered followed by the case where the client of the data source manager is the Hendrix display builder.

Note that these are two common scenarios, not the only possible scenarios. For example, in other embodiments, the Hendrix builder is connected to and starts a data source to provide a live preview mode.

Figure 29:
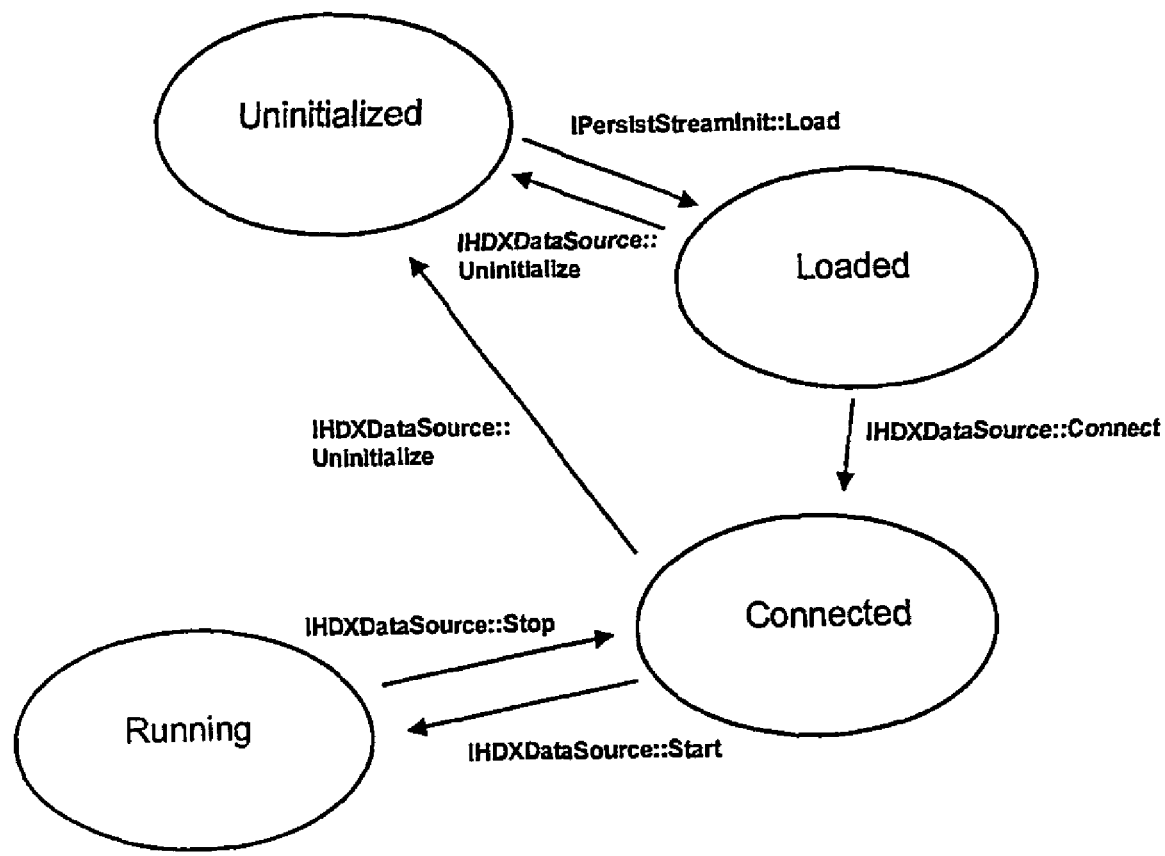
FIG. 29 schematically illustrates the typical data source states and the methods that cause transitions between those states when a data source is being used to provide data to a run time UI framework.
Figure 30:
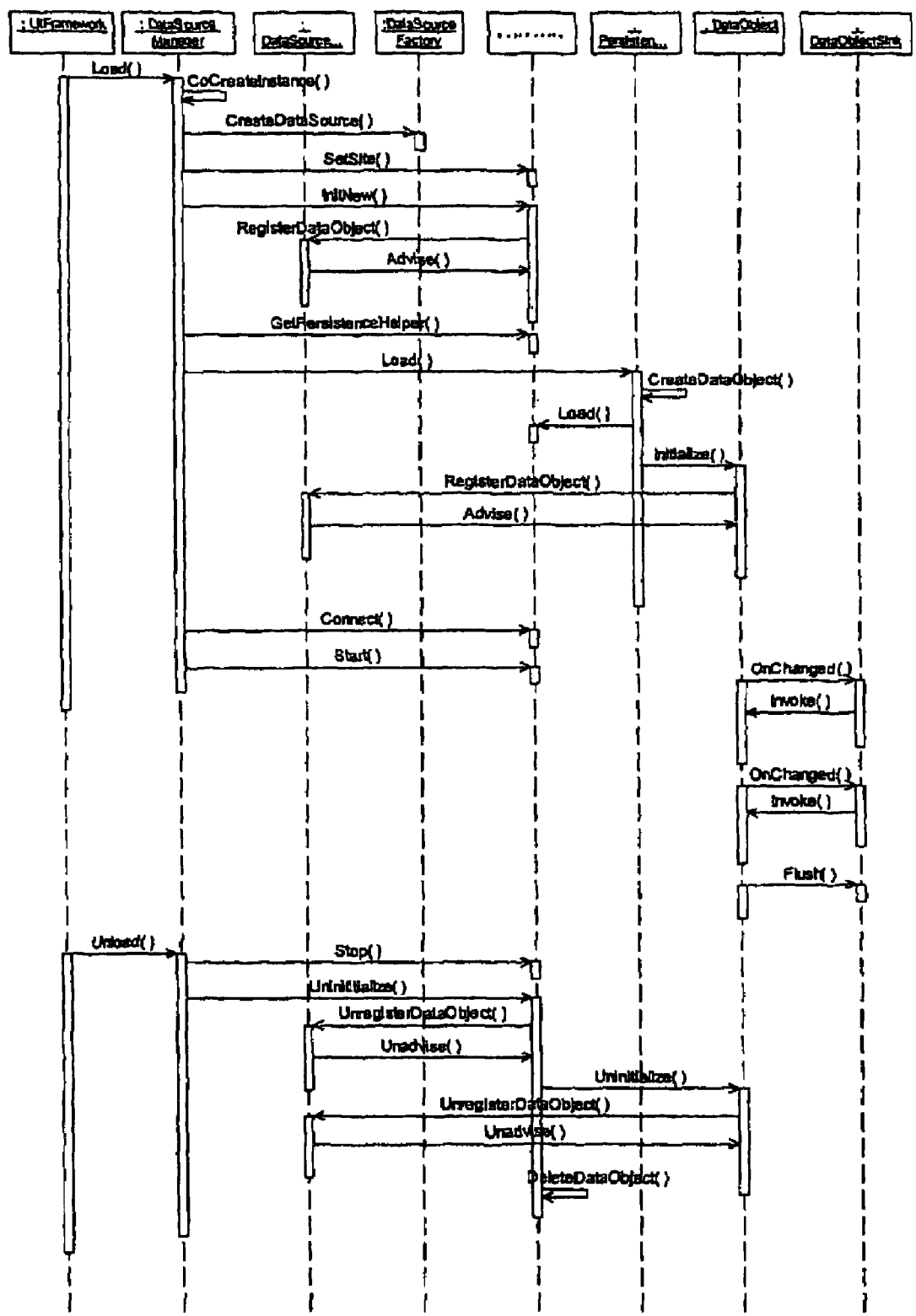
FIG. 30 is a UML sequence diagram that illustrates the basic operation of a Hendrix data source at run time.

FIG. 29 illustrates the typical data source states and the methods that cause transitions between those states when a data source is being used to provide data to a run time UI framework. This is also referred to as run mode operation. FIG. 30 is a UML sequence diagram that illustrates the basic operation of a Hendrix data source at run time in more detail.

Data source initialisation commences with the initialisation of the top level component with calls IObjectWithSite::SetSite and IPersistStreamInit::InitNew or IPersistPersistStreamInit::Load. During initialisation, the root object is registered with the data binding engine using IHDXDataTransfer::RegisterDataObject. IHDXDataTransfer is accessible through the "DataTransfer" ambient property on the site object. Once the root object has been initialised, the data sources are fully initialised via the persistence helper object.

Connection is initiated via a call to IHMXDataSource::Connect. The process of connecting to a server system can fail, and this typically occurs for one of two reasons. The first is that there is a problem establishing a connection to the server system. This might be due to network or configuration problems. The second reason for connection to fail is that the current user does not have authority to view the data provided by the data source. The check to verify that a user is authorised to use a data source is typically performed by using a combination of the current user's username and some configuration properties of the data source. For example, a data source providing properties that restrict its use to a particular plant area. During connection, the data source checks that the current user is a member of the specified area. If the check fails then the data source returns an error code that distinguishes this authorisation failure from more general connection failures.

When the data source manager encounters an authorisation failure in one of the data sources for a display page, the initialisation of all data sources for the display page is aborted and the user interface framework is alerted to the fact.

Once a data source has been successfully connected it is started. Prior to IHDXDataSource::Start being called, the data binding engine will have hooked each registered data object up to a sink object that will receive property change notifications and events from it. This hookup is performed using the standard IConnectionPoint mechanism.

IHDXDataSource::Start is a signal to the data source to begin delivering data by calling IPropertyNotifySink::OnChanged and honouring the subsequent call to IDispatch::Invoke by the binding engine to retrieve the changed property value.

Events are fired into the binding engine by a data object using IDispatch::Invoke.

The data source calls IHDXDataTransfer::Flush to have data updates propagated to the display page. This mechanism allows a data source to accumulate a batch of data updates before having them applied to the display page in a single transaction, thus greatly improving performance of the data transfer mechanism. IMXDataTransfer::Flush is implicitly called whenever an event is fired by a data source. This ensures that the state of the page is up to date when the display page method that the event is bound to is called.

When the data source is no longer required, it will first be stopped with a call to IHDXDataSource::Stop. The data source is then restarted by another call to IHMXDataSource::Start or un-initialised with a call to IHDXDataSource::Uninitialise.

During IHDXDataSource::Uninitialise the data source should un-register its data objects and release the data source site object.

Figure 31:
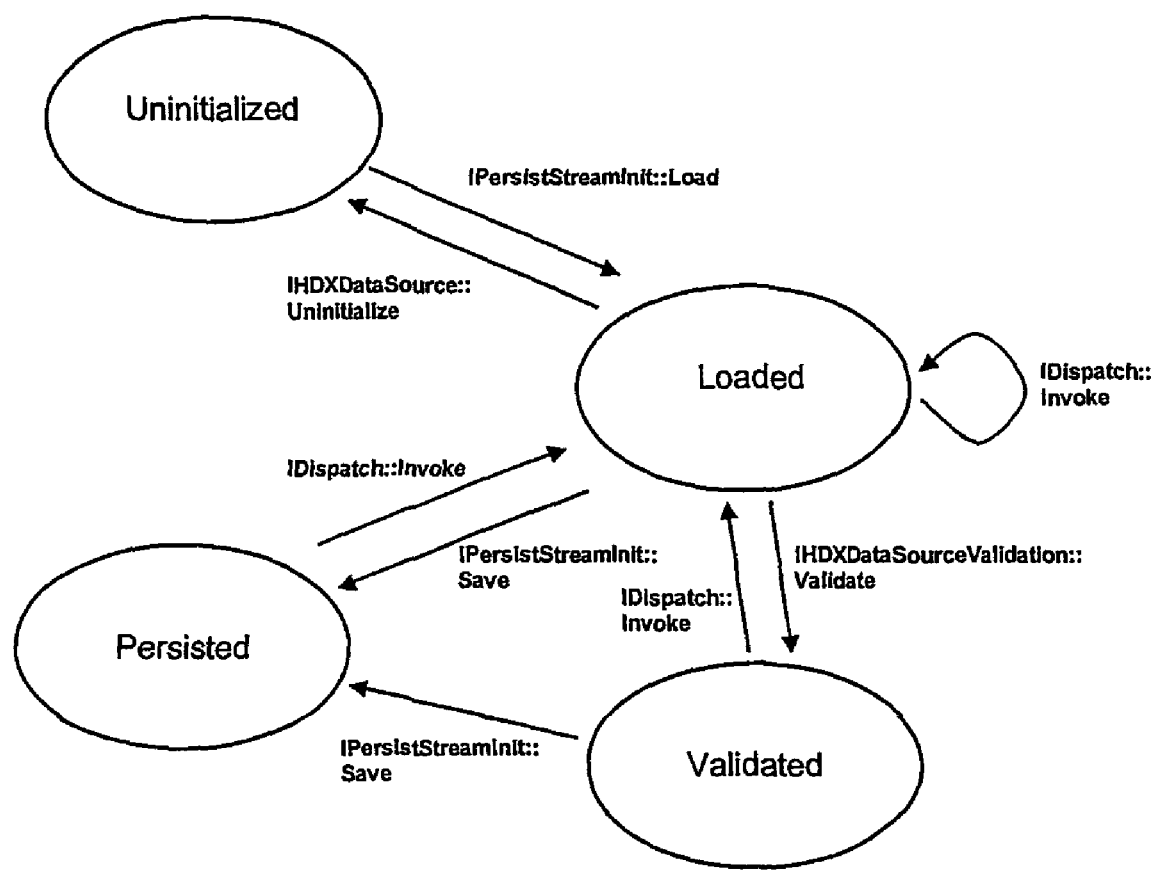
FIG. 31 schematically illustrates the typical data source states and the methods that cause transitions between those states when a data source is being used by the Hendrix display builder.

One of the main jobs of the Hendrix display builder is to construct and configure data sources for later use in a run time UI framework. FIG. 31 illustrates the typical data source states and the methods that cause transitions between those states when a data source is being used by the Hendrix display builder. This is also referred to as run mode.

The main causes of state transitions in build mode are changes to the configuration of data source properties. This is indicated by the calls to IDispatch::Invoke in the state transition diagram, although calls to IHDXDataObject::CreateObject and IHDXDataObject::DeleteObject cause similar transitions. These calls occur as the user interacts with the builder to modify the configuration of the data sources for a display page.

In build mode, the "Loaded" is also used as a dirty state, in which the data source configuration contains changes that have not been saved.

The "Validation" state is only applicable to data sources that implement IHDXDataSourceValidation. The call to IHDXDataSourceValidation::Validate is a signal to the data source to do whatever it has to do to check that the current configuration is valid. This step is also used to generate additional information that is used internally within the data source at run time if the process of generating this information is too time consuming to be done during the frequently called IPersistStreamInit::Save method.

Figure 32:
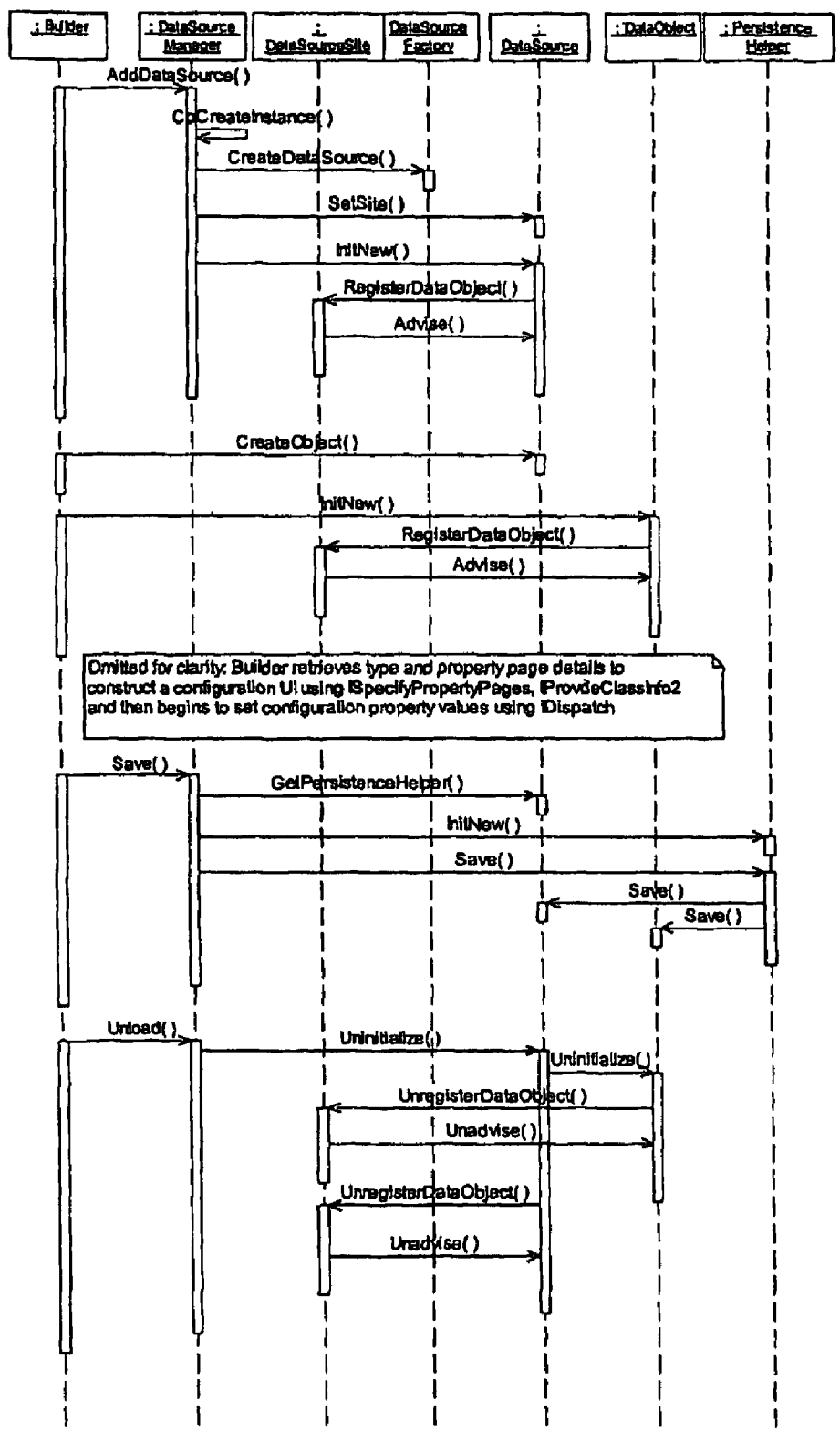
FIG. 32 is a UML sequence diagram that describes a build mode sequence of events in which a new data source is created and configured to have a simple data object model consisting of a root data object containing one child data object.

FIG. 32 is a UML sequence diagram that describes a build mode sequence of events in which a new data source is created and configured to have a simple data object model consisting of a root data object containing one child data object.

In this scenario, initialisation consists of calls to and IObjectWithSite::SetSite and IPersistStreamInit::InitNew. During initialisation the data source registers the root data object.

After instantiation and initialisation the data object model is constructed. Object model construction commences at the root object. Data objects (other than the root object) are created by calls to IHDXDataObject::CreateObject( ) on the container of the new data object. As a data object is able to contain data objects of different types, a parameter in the IHDXDataObject::CreateObject( ) call identifies the type of data object to create. The builder retrieves a list of types supported by a container by calling IHDXDataObject::GetCreatableTypes. As an example, the type of a PlantScape data object that delivers a point parameter is "PlantScape.PointParam".

IHDXDataObject::CreateObject returns an ID that is later used to remove the data object with a call to IHDXDataObject::DeleteObject. This D is assumed to be unique within the data object model and persistent. It is also used in the call to IHDXDataTransfer::RegisterDataObject.

To construct a configuration user interface, the builder uses the standard interfaces IDispatch, IProvideClassInfo2, ISpecifyPropertyPages and IPerPropertyBrowsing on individual data source objects.

Once the data object model has been constructed and configured, it is validated via a call to IHDXDataSourceValidation::Validate and saved with a call to IPersistStreamInit::Save. Validation, in some embodiments, requires that a transient connection to a server system be established. It is the responsibility of the data source to save the state of the data source component as well as all of the objects in the data object model.

There are two additional services available to data sources that assist their operation. The first of these is the security service. The security service provides access to the current user's username and password via the "Username" and "password" ambient properties. These credentials are used to secure a data source in any way that is appropriate to a particular data source. It is up to each data source to verify that these credentials are authentic.

In addition, a data source is registered with the security service to receive notifications of changes to these credentials by calling IHDXSecurity::Advise. IHDXSecurity is accessible through the "Security" ambient property. The data source will be notified of changes through a call the IDXSecurityNotify interface implemented by the data source.

The second additional service is a logging service that allows data sources to write diagnostic and error messages to a central log maintained by the data source manager. IHDXError::LogError is used to write messages to the log. IHDXError::RaiseError logs the error in the log file and propagates the error to the user interface framework. Each message is assigned a severity level that is used to filter the writing of messages to the log. IHDXError is accessible through the "Error" ambient property.

Hendrix data sources are implemented using any tool that allows you to construct COM objects with the required interfaces. Two common choices will to write them in C++ using Microsoft's Active Template Library or in Microsoft's Visual Basic. It is also be possible to write a Hendrix data source in Java using Microsoft's J++.

The Hendrix SDK includes two sample data source implementations, one in C++ using ATL and the other in Visual Basic. ATL's fine grained approach to COM object implementation makes it possible to pull together a data source and data object implementation from the individual implementations of standard COM interfaces provided by ATL. The only interfaces for which there are no built in implementations are IHDXDataSource, IHDXDataSourceValidation, IHDXSecurityNotify, IHDXDataObject and IHDXName.

If a data source exposes a complex data object model, requires high performance operation or wishes to perform complex internal resource management, C++ and ATL are the best implementation strategy.

Many of the interfaces required on a Hendrix data source are a subset of the interfaces on an ActiveX control. This means that one implementation strategy is to implement the data source and data objects as ActiveX controls. Visual Basic makes it easy to construct a Hendrix data source out of ActiveX controls.

All that needs to be done is to import the Hendrix Data Source type library and implement an ActiveX control for the data source and an ActiveX control for each type of data object in the data source. Implementations of IHDXDataSource, IHDXDataSourceValidation, IHDXSecurityNotify, IHXDataObject and IHDXName are then added to the controls, as required.

The Hendrix data source manager is free threaded, that is, it executes in a COM Multithreaded Apartment (MTA). The data transfer mechanism between a data source and the Hendrix data binding engine involves a great many method calls, especially if the data source supports a complex data object model. For this reason, in those embodiments where the data sources require high performance, they are written so that they can also execute in an MTA. This means that they need to be thread safe and marked in the registry as ThreadingModel=Both or ThreadingModel=Free.

It is possible to build a single threaded data source but its performance will be less than that of a multithreaded data source due to the presence of an apartment boundary between the data source and the rest of the data source manager. This may not be a serious limitation for many simple data sources.

This part of the document details the COM interfaces, standard and ambient properties and enumerations relevant to the implementation of a Hendrix data source. The header file containing these definitions for C++ developers is called HDXDS.H and the type library for Visual Basic developers is called HDXDS.TLB. These files are included in the Hendrix SDK.

The preferred Hendrix data source interfaces are set out below.

```
IHDXDataObjext
IHDXDataObject is implemented by all data objects in a data source's data
object model.
    interface IHDXDataObject : IUnknown
    {
    HRESULT CreateObject([in] BSTR bstrType,
            [in, out] long* plID),
            [out, retval] IDispatch** ppNewObject);
    HRESULT DeleteObject([in] long lID);
    HRESULT GetParent([out, retval] IDispatch** ppParent);
    HRESULT GetID([out, retval] long* plID);
    HRESULT GetType([out, retval] BSTR* pbstrType);
    HRESULT GetCreatableTypes([out, retval] SAFEARRAY(BSTR)* pTypes);
    HRESULT GetPrimaryName([out, retval] IHDXName** ppName);
    };
    IHDXDataObject::CreateObject
    Creates a new data object as a child of the current object.
    HRESULT CreateObject([in] BSTR bstrType,
            [in, out] long* plID,
            [out, retval] IDispatch** ppNewObject);
    Parameters:
    bstrType    The type of the data object to create.
    plID        The address of where to store the ID used to subsequently
identify the data object. This ID is generated by the data source.
    PpNewObject    A reference to the newly created data object.
    Return Code:
    S_OK        The method succeeded.
    HDX_E_INVALIDTYPE    The container does not support the requested type
of data source object.
    HDX_E_NOTCONTAINER        The data object is not a container and
cannot be used to create further data objects.
    E_FAIL    The method failed.
    The ID returned from this function is used in calls to
IHDXDataObject::DeleteObject, IHDXDataTransfer::RegisterDataObject and
IHDXDataTransfer::UnregisterDataObject.
    The ID needs to be persistent.
    The newly created data object is registered with the Hendrix data binding
engine using IHDXDataTransfer::RegisterDataObject prior to this method returning.
    IHDXDataObject::DeleteObject
    Deletes the specified data object.
    HRESULT DeleteObject([in]long lID);
    Parameters:
    lID    The ID of the object to be deleted.
    Return Code:
    S_OK        The method succeeded.
    HDX_E_OBJECTNOTFOUND    The requested data object did not exist.
I.e. the ID was not valid.
    HDX_E_NOTCONTAINER        The data object is not a container and
cannot container other data objects.
    E_FAIL    The method failed.
    If the data object being deleted is a container object then all contained objects
are to be implicitly deleted as well.
    Prior to being deleted, data objects must be unregistered with the Hendrix data
binding engine using IHDXDataTransfer::UnregisterDataObject.
    IHDXDataObject::GetParent
    Returns the parent of the data object.
    HRESULT GetParent([out, retval] IDispatch** ppParent);
    Parameters:
    ppParent    Pointer to the IDispatch interface on the data object's parent.
    Return Code:
    S_OK        The method succeeded.
    HDX_E_NOPARENT    The data object does not have a parent. This
would be returned if IHDXDataObject::GetParent was called on the root object.
    E_FAIL    The method failed.
    IHDXDataObject::GetID
    Returns the ID of the data object.
    HRESULT GetID([out, retval] long* plID);
```

-continued

```
    Parameters:
    pIID   Pointer to the location in which to store the ID of the data object.
    Return Code:
    S_OK       The method succeeded.
    E_FAIL     The method failed.
    The ID returned by this method is the same ID returned by
IHDXDataObject::CreateObject.
    IHDXDataObject::GetType
    Returns the type of a data object.
    HRESULT GetType([out, retval]BSTR *pbstrType);
    Parameters:
    pbstrType   The type of the data object.
    Return Code:
    S_OK       The method succeeded.
    E_FAIL     The method failed.
    IHDXDataObject::GetCreatableTypes
    Returns a list of the types supported by a container object.
    HRESULT GetCreatableTypes([out, retval] SAFEARRAY(BSTR)* pTypes);
    Parameters:
    pTypes     A safe array of BSTRs containing the types of objects that can be
created by the data object.
    Return Code:
    S_OK       The method succeeded.
    HDX_E_NOTCONTAINER      The data source object is not a container
object, and cannot be used to create further data objects.
    E_FAIL     The method failed.
    IHDXDataObject::GetPrimaryName
    Returns the primary name of the data object.
    HRESULT GetPrimaryName([out, retval]IHDXName **ppName);
    Parameters:
    ppName     Pointer to the IHDXName interface on the data object's primary
name.
    Return Code:
    S_OK       The method succeeded.
    HDX_E_NONAME      The data source object does not have any names
associated with it.
    E_FAIL     The method failed.
    The primary name of a data object is the server system name most likely to be
used by a user to identify the data object.
    IHDXDataSource
    IHDXDataSource is implemented by all Hendrix data sources.
    interface IHDXDataSource : IUnknown
    {
        HRESULT Connect( );
    HRESULT Start( );
    HRESULT Stop( );
        HRESULT Uninitialize( );
    HRESULT GetPersistenceHelper([out, retval]IPersistStreamInit **ppHelper);
    };
    IHDXDataSource::Connect
    Requests a data source to establish a connection with its data provider.
        HRESULT Connect( );
    Parameters:
    None.
    Return Code:
    S_OK       The connection was successfully established and the data source
can now be started.
    HDX_E_CONNECTFAILED       The connection failed for some reason
other than a failure of authorisation.
    HDX_E_NOTAUTHORIZED       The connection may have succeeded but
the current user is not permitted to view the data provided by the data source.
```

Returning HDX_E_NOTAUTHORIZED means that the loading of the display page for which the data source was to supply data will be aborted. This mechanism allows a data source to check the current user against criteria that is specified in the data sources persistent state in order to restrict data viewing to particular users.

```
    IHDXDataSource::Start
    Signals the data source object model to begin delivering data and events.
        HRESULT Start( );
    Parameters:
    None.
    Return Code:
    S_OK       The method succeeded.
```

```
E_FAIL    The method failed.
IHDXDataSource::Stop
Signals the data source object model to stop delivering data and events.
    HRESULT Stop( );
Parameters:
None.
Return Code:
S_OK      The method succeeded.
E_FAIL    The method failed.
A call to IHDXDataSource::Start might follow the call to
IHDXDataSource::Stop.
IHDXDataSource::Uninitialize
Un-initialises the data source object model.
    HRESULT Uninitialize( );
Parameters:
None.
Return Code:
S_OK      The method succeeded.
E_FAIL    The method failed.
The data source should release its references to the data source site object in
IHDXDataSource::Uninitialize.
IHDXDataSource::GetPersistenceHelper
Retrieves the implementation of IPersistStreamInit used to persist the state of
the entire data source.
    HRESULT GetPersistenceHelper([out, retval]IPersistStreamInit **ppHelper);
Parameters:
ppHelper  The implementation of IPersistStreamInit that persists the entire
data source.
Return Code:
S_OK      The method succeeded.
E_FAIL    The method failed.
IHDXDataSourceFactory
IHDXDataSourceFactory is implemented by a Hendrix data source factory
object.
    interface IHDXDataSourceFactory: IUnknown
    {
    HRESULT CreateDataSource([out] IHDXDataSource** ppDataSource);
    };
IHDXDataSourceFactory::CreateDataSource
Creates a new instance of the data source.
    HRESULT CreateDataSource([out] IHDXDataSource** ppDataSource);
Parameters:
ppDataSource    Pointer to the newly created data source.
Return Code:
S_OK      The method succeeded.
E_FAIL    The operation failed.
IHDXDataSourceValidation
IHDXDataSourceValidation is implemented by a Hendrix data source object
model that supports validation.
    interface IHDXDataSourceValidation: IUnknown
    {
    HRESULT Validate( );
    HRESULT QueryNeedsValidating([out,retval]VARIAINT_BOOL* pbResult);
    };
IHDXDataSourceValidation::Validate
Requests a data source to attempt validation.
    HRESULT Validate( );
Parameters:
None.
Return Code:
S_OK      The method succeeded.
HDX_E_VALIDATEFAILED    Validation failed.
IHDXDataSourceValidation::QueryNeedsValidating
Queries the object model to determine if it needs to be validated.
    HRESULT QueryNeedsValidating([out,retval]VARIANT_BOOL* pbResult);
Parameters:
pbResult  TRUE if the data source requires validation, FALSE otherwise
Return Code:
S_OK      The method succeeded.
IHDXDataTransfer
IHDXDataTransfer is implemented by Hendrix data source site object.
    interface IHDXDataTransfer : IUnknown
    {
    HRESULT FlushBuffer( );
        HRESULT RegisterDataObject([in]long lID,
            [in]IUnknown *pDataObjectUnk);
        HRESULT UnregisterDataObject([in]long lID);
    };
IHDXDataTransfer::Flush
```

-continued

Requests that Hendrix data binding engine flush all data updates accumulated since the last call to IHDXDataTransfer::Flush.
    HRESULT Flush( );
Parameters:
None.
Return Code:
S_OK    The method succeeded.
IHDXDataTransfer::RegisterDataObject
Registers a data object with the Hendrix data binding engine.
    HRESULT RegisterDataObject([in]long lID,
        [in]IUnknown *pDataObjectUnk);
Parameters:
lID    The ID of the data object being registered.
pDataObjectUnk    A pointer to the IUnknown interface on the data object being registered.
Return Code:
S_OK    The method succeeded.
E_FAIL    The method failed.
IHDXDataTransfer::UnregisterDataObject
Un-registers a data object with the Hendrix data binding engine.
HRESULT UnregisterDataObject([in]long lID;
Parameters:
lID    The ID of the data object being unregistered.
Return Code:
S_OK    The method succeeded.
E_FAIL    The method failed.
IHDXError
IHDXError is implemented by site objects to allow components to asynchronously generate error messages.
interface IHDXError: IUnknown
{
    HRESULT RaiseError([in]BSTR bstrSource,
        [in]BSTR bstrDescription,
        [in]BSTR bstrHelpFile,
        [in]unsigned long ulHelpContext,
        [in]long lCode);
    HRESULT LogError([in]BSTR bstrSource,
        [in]BSTR bstrDescription,
        [in]long lCode);
};
IHDXError::RaiseError
Used to notify the framework that an error has occurred.
    HRESULT RaiseError([in]HDX_ERRORLEVEL level,
        [in]BSTR bstrSource,
        [in]BSTR bstrDescription,
        [in]BSTR bstrHelpFile,
        [in]unsigned long ulHelpContext,
        [in]long lCode);
Parameters:
level    The severity of the error. See the HDX_ERRORLEVEL enumeration for details.
bstrSource    The source of the error.
bstrDescription    The description of the error.
bstrHelpFile    The help file for the error.
ulHelpContext    The help file context for the error.
lCode    The error code.
Return Code:
S_OK    The method succeeded.
Errors raised with IHDXError::RaiseError are logged in the Hendrix log file and propagated to the UI Framework.
IHDXError::LogError
Used to write an error message to the log file.
    HRESULT LogError([in]HDX_ERRORLEVEL level,
        [in]BSTR bstrSource,
        [in]BSTR bstrDescription,
        [in]long lCode);
Parameters:
level    The severity of the error. See the HDX_ERRORLEVEL enumeration for details.
bstrSource    The source of the error.
bstrDescription    The description of the error.
lCode    The error code.
Return Code:
S_OK    The method succeeded.
Errors raised with IHDXError::LogError are logged in the Hendrix log file and are not propagated to the UI Framework.
IHDXName
IHDXName is implemented by data source objects.
interface IHDXName: IDispatch

```
{
[propget, id(0)]HRESULT Type([out, retval]BSTR *pbstrType);
[propget, id(1)]HRESULT Name([out, retval]BSTR *pbstrName);
[propput, id(1)]HRESULT Name([in]BSTR bstrName);
[propget, id(2)]HRESULT FullName([out, retval]BSTR *pbstrFullName);
};
```
IHDXName::get_Type
Returns the type of a named server system data item.
[propget, id(0)]HRESULT Type([out, retval]BSTR *pbstrType);
Parameters:
pbstrType    The type of the named server system data item.
Return Code:
S_OK      The method succeeded.
E_FAIL    The method failed.
IHDXName::get_Name
Returns the name of a server system data item.
[propget, id(1)]HRESULT Name([out, retval]BSTR *pbstrName);
Parameters:
pbstrName   The name of a server system data item.
Return Code:
S_OK      The method succeeded.
E_FAIL    The method failed.
IHDXName::put_Name
Sets the name of a server system data item.
[propput, id(1)]HRESULT Name([in]BSTR bstrName);
Parameters:
bstrName    The name of a server system data item.
Return Code:
S_OK      The method succeeded.
E_FAIL    The method failed.
IHDXName::get_FullName
Returns the full name of a server system data item.
[propget, id(2)]HRESULT FullName([out, retval]BSTR *pbstrName);
Parameters:
pbstrName   The full name of a server system data item.
Return Code:
S_OK      The method succeeded.
E_FAIL    The method failed.
IHDXSecurity
IHDXSecurity is implemented by the Hendrix data source manager.
interface IHDXSecurity: IUnknown
```
{
    HRESULT Advise([in]IHDXSecurityNotify *pNotifySink,
        [out, retval]long *plCookie);
    HRESULT Unadvise([in]long lCookie);
};
```
IHDXSecurity::Advise
Establishes an advisory connection with the security service.
    HRESULT Advise([in]IHDXSecurityNotify *pNotifySink,
        [out]long *plCookie);
Parameters:
    pNotifySink    A pointer to the IHDXSecurityNotify interface that is to
receive security notifications.
    plCookie       A cookie identifying the advisory connection.
Return Code:
S_OK      The method succeeded.
E_FAIL    The method failed.
    The caller of IHDXSecurity::Advise( ) should remember the returned cookie so
that it can revoke the connection at a later time.
IHDXSecurity::Unadvise
Revokes an advisory connection with the security service.
    HRESULT Unadvise([in]long lCookie);
Parameters:
lCookie     A cookie identifying the advisory connection.
Return Code:
S_OK      The method succeeded.
E_FAIL    The method failed.
IHDXSecurityNotify
    IHDXSecurityNotify is implemented by a Hendrix data source component that
needs to know about changes to the security access token.
interface IHDXSecurityNotify: IUnknown
{
HRESULT OnCredentialChange( );
};
IHDXSecurityNotify::OnCredentialChange
Notifies the implementation of changes to the user's security credentials.
HRESULT OnCredentialChange( );
Parameters:
None.

-continued

```
    Return Code:
    S_OK      The method succeeded.
    User credentials consist of the user name and password. These credentials are
accessible via the Username and Password ambient properties.
    There follows some details on the Hendrix data source standard properties.
    SimulatedData
    Type
        VARIANT_BOOL
```

Description

Indicates whether real or simulated data is required from the data source. If the value is TRUE then the simulated data is required.

A data source may respond to a value of TRUE by not generating any data at all, if simulated data is too difficult to generate.

QualityOfService

Type

HDX_QUALITYOFSERVICE

Description

Indicates the desired quality of service to be provided by the data source. Possible values are HDX_QUALITYOF-SERVICE_LOW, HDX_QUALITYOFSERVICE_MEDIUM and HDX_QUALITYOFSERVICE_HIGH.

It is up to the data source implementation to determine if it is possible to provide different levels of quality of service. Refer to the HDX_QUALITYOFSERVICE enumeration for further details.

The following is a description of the Hendrix data source ambient properties.

```
    DataTransfer
    Type
        IHDXTransfer *
    Description
        Contains a pointer to the IHDXTransfer interface.
    Error
    Type
        IHDXError *
    Description
        Contains a pointer to the IHDXError interface.
    Password
    Type
        BSTR
    Description
        Contains the current user's username.
    Security
    Type
        IHDXSecurity *
    Description
        Contains a pointer to the IHDXSecurity interface.
    Username
    Type
        BSTR
    Description
        Contains the current user's username.
```

The following is a description of the Hendrix data source enumerations.

```
    HDX_DATASOURCE_ERROR_CODES
    enum {
    HDX_E_NOPARENT            = -2147221504,
    HDX_E_NONAME              = -2147221503,
    HDX_E_INVALIDTYPE         = -2147221502,
```

-continued

```
    HDX_E_NOTCONTAINER        = -2147221501,
    HDX_E_CONNECTFAILED       = -2147221499,
    HDX_E_NOTAUTHORIZED       = -2147221498,
    HDX_E_VALIDATEFAILED      = -2147221497
    } HDX_DATASOURCE_ERROR_CODES;
```

Description

Enumerates the Hendrix specific error codes returned by Hendrix interface methods.

```
    HDX_ERRORLEVEL
    enum {
    HDX_ERRORLEVEL_INFO         = 0,
    HDX_ERRORLEVEL_WARNING      = 1,
    HDX_ERRORLEVEL_ERROR        = 2
    } HDX_ERRORLEVEL;
```

Description

Enumerates the severity levels for messages being written to the data source managers message logging service.

```
    HDX_QUALITYOFSERVICE
    enum {
    HDX_QUALITYOFSERVICE_LOW     = 0,
    HDX_QUALITYOFSERVICE_MEDIUM  = 1,
    HDX_QUALITYOFSERVICE_HIGH    = 2
    } HDX_QUALITYOFSERVICE;
```

Description

Enumerates the possible levels of quality of service that a data source may be asked to provide.

For the benefit of the addressee, the description is now directed toward an overview of the runtime used in the preferred embodiments. Firstly, this will require some explanation as to what constitutes a Hendrix runtime. Hendrix is designed around providing users with two ways to view and control plant information: the operator environment, designed primarily for security and reliability, and the web browser environment, where universal, flexible, secure data access is the prime concern. Development groups wishing to base their user interfaces on the Hendrix architecture must develop components for both of these environments; the combination of which is referred to jointly as a Hendrix runtime.

In the operational environment, the runtime centres around the concept of the operator framework (sometimes referred to as the operator runtime framework).

In the web browser environment, the runtime centres around Hendrix displays being rendered in Microsoft's Internet Explorer web browser, with the assistance of numerous Hendrix-specific components which facilitate the connection to live process data. Some of these components are generic, and form part of the Hendrix toolkit that has been developed by the Honeywell Software Center. Others, however, are product-specific and need to be implemented by each development group individually.

Figure 33:
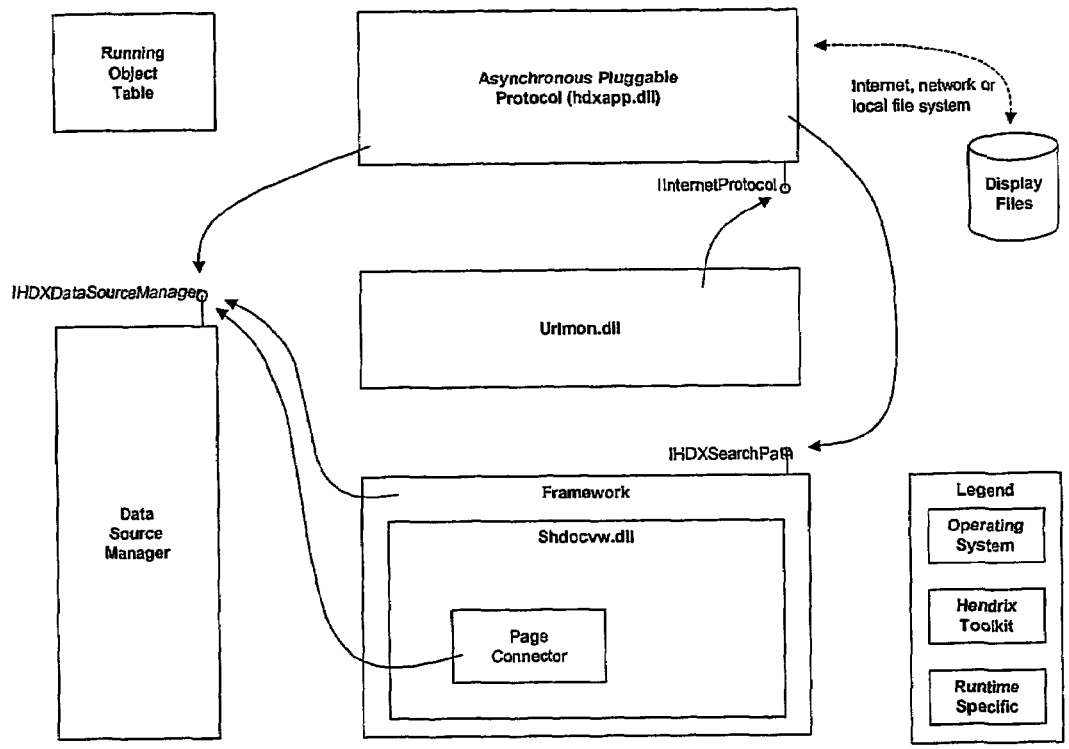
FIGS. 33 and 34 are a schematic representation of the various components used in the Hendrix runtime environment.
Figure 34:
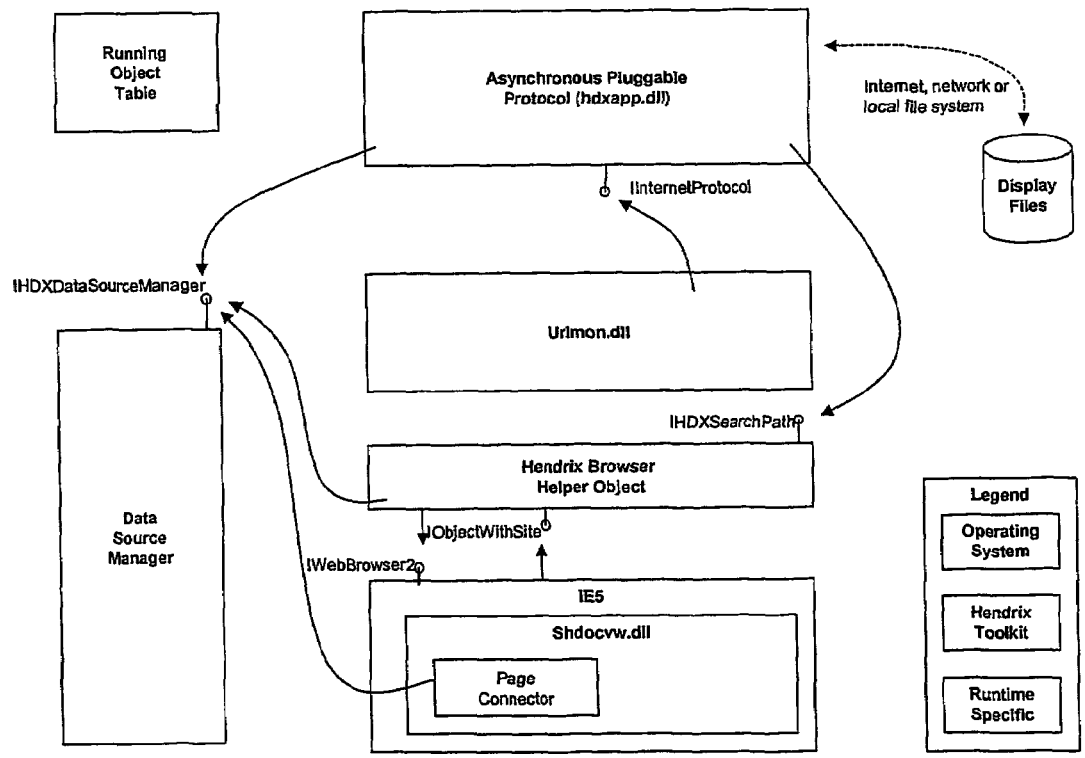

The Hendrix runtime, in both environments, consists of a number of distinct components. FIG. 33 and FIG. 34 illustrate—for both the operator framework and the browser environment—those components most closely related to the user interface itself Data-related components, such as Hendrix data sources manipulated by the Data Source Manager, are dealt with elsewhere in the Hendrix documentation set.

Note that some of the components are supplied by Microsoft as part of the operating system, others components are part of the Hendrix toolkit, while other components must be developed by each development group implementing a Hendrix runtime.

The responsibilities of the various components shown in FIG. 33 and FIG. 34 are as follows:

Data Source Manager (DSM)

The Data Source Manager is responsible for managing data sources and connections, and for transferring data from data sources to elements on an HTML page via the page connector.

Framework

The operator framework corresponds to the application window (or windows) interface artifacts such as toolbars and menus, which are tailored for the operational environment. It also provides desktop management functionality, where appropriate, and participates in the lifetime management of the data source manager.

Browser Helper Object (BRO)

The browser helper object provides additional application-level functionality to the browser, and fulfils the responsibilities that are otherwise handled by the framework in the operational environment. It co-operates in the lifetime management of the data source manager, for example, closing it when Internet Explorer itself is closed.

Shdocvw.dll

The shdocvw.dll provides the functionality of the web browser control, which is used by both the framework and Internet Explorer for HTML rendering and navigation. This DLL uses MSHTML for the rendering of HTML content. If a framework requires lower-level control over the rendering process it optionally hosts MSHL directly.

Page Connector

The display page connector is placed on every Hendrix display file, and is responsible for managing the delivery of data to objects on a page. It is part of the Hendrix toolkit.

Urlmon.dll

Urlmon.dll is a system component responsible for assisting in the transfer of remote data (such as HTML via HTTP) to applications which require it. The web browser control uses urlmon.dll to download HTML files.

Asynchronous Pluggable Protocol (APP)

Sitting on the other side of urlmon.dll is the Hendrix Asynchronous Pluggable Protocol. This protocol is responsible for handling page call-up security, path substitution to enable easy page call-up and to assist in internationalisation, and participating in the instantiation of the data source manager. Its responsibilities are discussed in detail below.

Running Object Table

The Running Object Table (ROT) is used to assist in the connection of data source managers to the correct page connector in the runtime. This is to facilitate the ability to maintain communication with the data source manager across page changes. It is envisaged that later revisions of the architecture will require a custom object to fulfill this purpose, as a three-tier architecture may require greater functionality than that provided by the ROT.

The preferred embodiments of the invention deal with implementing Hendrix-compliant versions of the framework and the browser helper object.

The Asynchronous Pluggable Protocol (henceforth referred to as the APP) is part of the Hendrix toolkit. A description of APPs in general can be found in the MSDN Library (under "Asynchronous Pluggable Protocols Overview"). In essence, these are components responsible for downloading information to be interpreted by the Internet Explorer web browser, the web browser control, or other internet-enabled applications. Protocols are represented textually as the first part of a URL up to the colon, and are provided by the system for all major protocols:

ftp (e.g. ftp://ftp.microsoft.com)
file (e.g. file:c\debug.txt)
mailto (e.g. mailto:head.honcho@honeywell.com)
http (e.g. http://www.microsoft.com)

In the Hendrix architecture the APP implements the "page" protocol. Its main responsibilities revolve around page callup security, and path substitution, as follows.

All URLs to Hendrix pages (as created in the Hendrix builder) are of the form page://pagename (or page://pagename.htm). To browse directly to a Hendrix page in Internet Explorer, typing a URL of this form is sufficient. (Normal HTTP addresses are allowed well, but the architecture will redirect these pages so that they use the page protocol).

When a page URL is activated, the APP is invoked. Its first responsibility is to turn this URL into a fully-qualified URL. It does this by querying the framework for the current display search path, and then locating the file within that search path. For example, if the current search path is c:\Honeywell\displays\English, the URL page://display1.htm will resolve to c:\Honeywell\displays\English\display1.htm.

This path substitution mechanism is intended to provide the framework with control over which displays are shown. The current path depends on the chosen operator language, the current department being viewed, or other factors—it is completely up to the framework each time a page is called up.

APPs are inherently stateless, and must query the framework for the search path each time a page is accessed. It obtains access to the framework through the ROT, as described later in this document.

Once the URL is fully resolved, the APP authenticates the user to ensure the current operator has sufficient security privileges to call up the display. It does this by downloading (from the internet or local file system) the relevant file and associated data binding definitions, and queries the DSM for permission to open the file. The APP obtains access to the DSM through the ROT.

The DSM in turn attempts to activate the relevant data sources for the file. If any of these fail due to insufficient security privileges, the DSM indicates to the APP that the operator is not allowed to view the file. The APP then passes no information to the browser, leaving the operator on the current page. If successful, however, the APP passes the HTML to the browser, and the page is called up normally.

The interfaces which allow the framework to co-operate with the APP in this way are described below.

This part of the specification discusses the main implementation strategies for a Hendrix framework, and then details the responsibilities of the framework, as far as the Hendrix architecture is concerned. This functionality is divided into two sections: basic and advanced. Basic functionality covers hosting the web browser control, instantiation of the Data Source Manager, and participation in the call up of Hendrix displays. Advanced functionality covers all other issues concerning the framework, such as participation in page callup security, popup windows, path substitution, error handling, security, and internationalisation.

In essence, a Hendrix framework is any application capable of hosting Microsoft's Web Browser Control (shdocvw.dll), which in turn plays host to the MSHTML rendering engine. The implication of this is that any technology is conceivably useable to implement a Hendrix framework: Visual Basic, Microsoft Foundation Classes, the Active Template Library, etc.

For this reason, this detailed description does not concern itself with any one particular implementation strategy, but instead focuses on what functionality these frameworks must implement if they are to participate in the Hendrix architecture. In some cases the document does present sample C++ ATL and/or MFC code, but this is for illustrative purposes only: it does not imply that this is the only way this functionality is available to be implemented.

The MSDN Library and MSDN Online provide several excellent samples illustrating how to host the web browser control, in various technologies. These are listed below and the content thereof is incorporated herein by way of cross-reference. All samples listed (apart from MFCIE, which is in the MSDN Library) can be found as part of the download of IE5 headers and libraries from MSDN Online, at http://msdn.microsoft.com/downloads/samples/internet/setup/entry.htm.

MFC

MFCIE sample, illustrating the use of the CHtmlView class.

The MFCIEEvtSpy sample, which illustrates how to sink Internet Explorer events.

The article "Creating a web browser-style application" in the MSDN Library

ATL

The AtlBrowser sample

Visual Basic

The VBWebBrowser sample, illustrating a full-functioned VB web browser.

The WBCustomizer sample, illustrating how to implement the IDocHostUIHandler interface from Visual Basic.

The DrillVB sample, which demonstrates how to traverse the DOM from an external application.

Framework Implementation

Upon application startup, the framework performs the following tasks:

1. Start the Data Source Manager
2. Register a pointer to the running DSM in the Running Object Table. This is so that other Hendrix components (specifically, the Page Connector and the APP) are able to obtain access to the correct DSM, when required.
3. Register a pointer to the framework itself in the ROT. This allows the APP to access the correct framework when it requests path information.

These actions are discussed in greater detail below.

The following IDL is usually sufficient to indicate how the DSM is to be activated.

```
[
    uuid(9C657542-64B8-11D3-80D0-00C04F6847A2),
    helpstring("HDXDataSourceManager Class")
]
```

```
coclass HDXDataSourceManager
{
    [default] interface IHDXDataSourceManager;
};
```

Upon startup the framework simply needs to activate and bind to this object. In ATL this may consist of little more than the following line:

hr=m_spDSM.CoCreateInstance(CLSID_HDXDataSourceManager),

As already described, the ROT is used to store references to a running instance of the DSM for each instance of the framework (in some systems multiple frameworks may be running simultaneously on a single node).

This system relies on the fact that in the Hendrix architecture there is a one-to-one relationship between instances of the DSM and instances of the framework. Each instance of the framework has a unique process ID, which is what is used to identify itself in the ROT.

The DSM is registered in the ROT by means of an item moniker. The name of this item moniker takes the following format:

!HDX:DSM:pidscxxx where xxxx is the process ID of the framework in question (e.g. 1234).

The following code sample illustrates how registration may be performed in ATL.

```
CComBSTR bstrDelim("!");
CComBSTR bstrItem("HDX:DSM:pid=1234");
CComPtr<IMoniker> spMoniker;
// create a moniker to the DSM
hr = CreateItemMoniker(bstrDelim, bstrItem, &spMoniker);
// now register it in the ROT
CComPtr<IRunningObjectTable> spROT;
GetRunningObjectTable(NULL, &spROT);
hr = spROT->Register(NULL, m_pDSM, spMoniker,
    &m_dwDSMCookie);
```

The framework is registered in a similar manner to the DSM. In the case of the framework, the format of the item moniker is:

!HDX:RT:pid=xxxx

Note that RT (runtime) is used as this moniker is also used by the Browser Helper Object.

The following code thus illustrates registration of the framework in ATL:

```
// pUnkThis is assumed to be an IUnknown * to the framework itself.
// This interface must be able to be queried successfully for
// IHDXSearchPath, as described in section 3.3, "Advanced Framework
    Functionality".
CComBSTR bstrDelim("!");
CComBSTR bstrItem("HDX:RT:pid=1234");
CComPtr<IMoniker> spMoniker;
// create a moniker to the DSM
hr = CreateItemMoniker(bstrDelim, bstrItem, &spMoniker);
// now register it in the ROT
CComPtr<IRunningObjectTable> spROT;
GetRunningObjectTable(NULL, &spROT);
hr = spROT->Register(NULL, pUnkThis, spMoniker,
    &m_dwRTCookie);
```

Context menus are, in general, specific to an individual application. If a framework wishes to implement context menus other than those provided by Internet Explorer, it needs to implement the IDocHostUIHandler interface. The samples described elsewhere in this specification all demonstrate how to achieve this in various programming environments. It should be noted that it is much easier to do this in C++ than VB.

Upon application shutdown, the framework removes any references to the DSM or to itself stored in the ROT. Following on from the previous examples, it does this with the following calls:

hr=spROT->Revoke(m_dwDSMCookie);
hr=spROT->Revoke(m_dwRTCookie);

The framework then calls Release( ) on the Data Source Manager to cause it to unload itself from memory. After this the framework terminates.

Some detail is provided below to explain how a Hendrix framework behaves to support the more advanced functionality provided by the Hendrix architecture. Each of these is dealt with separately. It will be appreciated by those skilled in the art, given the teaching herein, that modifications and alternatives are available.

Security

The framework participates in the acquisition of security credentials from the user, which are then passed to the DSM and on to the respective data sources.

Display Path Management and Internationalisation

As mentioned earlier in this description, the framework is responsible for determining which sets of displays are presented to a user, through the use of display search paths.

Search paths are implemented in the Hendrix architecture through the use of the IHDXSearchPath interface. The APP queries the Unknown interface it retrieves from the ROT for this interface. The framework implements this interface if it is to rely on partially-formed URLs for page callup.

Path substitution forms the core of a number of mechanisms for Honeywell products. Two examples are internationalisation and the notion of departments in OCS.

For internationalisation, path substitution provides a mechanism to dynamically switch between different sets of displays, each built for different languages. For example, a framework might start viewing English displays only, stored in c:\Honeywell\displays\English. Upon page callup, the APP requests this path from the framework, and resolves this to the relevant English display accordingly.

Upon change of operator, however, the framework switches language as appropriate. If a Finnish operator were to log in, the framework switches the search path to c:\Honeywell\displays\Finnish, and the APP thenceforth calls up the Finnish displays.

In OCS, an operator logs in to various departments. The current department will determine which displays the operator will view. Underlying the OCS system, displays from differing departments are each stored in different directories. The OCS Hendrix framework thus dictates which displays are called up according to department, by passing the relevant display path to the APP when requested.

Frameworks have the capability of participating in the popup window functionality provided as part of the Hendrix toolkit. This participation consists of:
1. The ability to specify how many popup windows are to be active at any one time;
2. The ability to specify if popup windows themselves are available to activate other popup windows;
3. The ability to store and retrieve popup configurations Developers of Hendrix runtimes are provided with the flexibility of choice, as this functionality is optional; and only needs to implemented it if it is intended to utilise popup window functionality in the framework being developed.

The framework specifies how many popup windows are able to be loaded at any one time by exposing a Hendrix-specific property, maxPopups, to objects on the page through IDocHostUIHandler. This interface allows a hosting application to extend the DOM via the window.external property. Thus, if the framework sets window.external.maxPopups to two, at most two popup windows will be displayed at any one time.

Similarly, the framework governs whether popup windows are to activate other popup windows by exposing a custom property, window.external.popupFromPopups, which it sets either to true or false accordingly.

The popup functionality of the Hendrix architecture possesses the ability to store and retrieve configurations of popup windows. This is exposed by an object on every Hendrix display named "WindowManager". An abridged version of the IDL for the WindowManager is shown below.

```
[
    object,
    uuid(034DB16D-AE01-11D3-BE8D-00C04F7915FE),
    dual,
    helpstring("IPopupFactory Interface"),
    pointer_default(unique)
]
interface IPopupFactory : IDispatch
{
    HRESULT CreatePopupWindow([in] BSTR lpPageFile,
[in] int iXpos, [in] int iYpos,
                    [in] int iWidth, [in] int iHeight);
    HRESULT SavePopupConfig([in] BSTR bstrName);
    HRESULT LoadPopupConfig([in] BSTR bstrName);
    HRESULT CloseAllWindows( );
};
```

In most cases the creation of popup windows is performed by objects on the page itself, and does not require the assistance of the framework. (If the framework does wish to create popup windows, it still does so by calling the CreatePopupWindow method of the WindowManager object embedded in the current page.)

In some embodiments, the Hendrix framework requires the ability to close all popup windows. This functionality is often presented to the operator as a single toolbar button in the framework. It is available through the CloseAllWindows method.

Some Hendrix frameworks also store current configurations of popup windows for later retrieval. This is achieved via the SavePopupConfig and LoadPopupConfig methods. These methods accept a string which uniquely identifies the configuration name. In most cases this string does little more than identify the current operator.

The Hendrix architecture, in some embodiments, incorporates an error handling capability. Some framework support is required to enable this functionality.

The discussion of framework implementation up until this point incorporates only the ability to instantiate the Hendrix architecture, and call up Hendrix displays. For a large number of framework implementations, this functionality will be sufficient. This is especially the case for GUS-style frameworks, where all functionality is placed in the displays for a system, with the framework a simple frame window (or windows) around the web browser control.

For many other frameworks, however, greater functionality is required. In particular, the framework needs to be able to issue commands (triggered by toolbar buttons or menu items, for example) to the relevant data sources.

Figure 35:
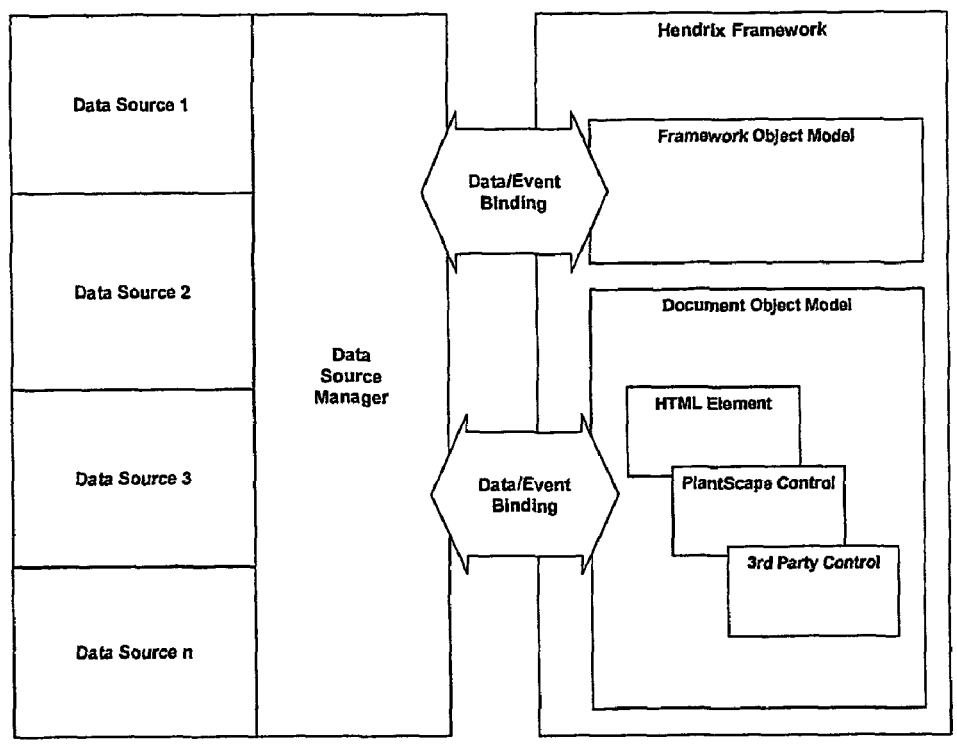
FIG. 35 is a schematic representation of the framework binding used in an embodiment of the Hendrix architecture.

This scenario corresponds to binding an event fired by the framework to a method on the data source, which is functionality provided by the Hendrix binding engine for objects on an HTML page. The Hendrix architecture allows frameworks to participate in this functionality as well, firing events through the binding engine to data sources, as shown in FIG. 35.

There are two ways Hendrix development groups constructs their frameworks to participate in this type of data/event binding:

1. Construct the framework user interface primarily from HTML. This is achieved in a number of ways: frames in an HTML application, or by multiple instances of the web browser control embedded in a Win32 application. PlantScape's first implementation of a Hendrix framework, for example, implements the status zone and alarm zone completely in HTML. Note that this does not necessarily require extensive HTML scripting, as these areas of HTML consist of ActiveX controls to provide arbitrarily complex functionality. In this scenario, the HTML portions of the framework conform to the Hendrix file format, including a definition for binding data and events from an appropriate data source. The page connector on each page then simply connects to the data source manager and binds events as appropriate.
2. Construct the framework user interface using the Win32 API. In this case, the framework provides an object model which participates in the Hendrix binding mechanism.

Some additional functionality that is available for use in the Hendrix framework is SafeView conformance. Framework implementations are fully SafeView-compliant to facilitate full convergence of user interfaces between systems.

Browser helper objects are covered in detail in the MSDN Library. In essence a BHO is a COM object that is loaded by Internet Explorer at startup, and which can connect to Document Object Model events fired by the browser and act on them accordingly by manipulating the DOM.

As an instance of the BHO gets instantiated for each instance of Internet Explorer, it is not desirable for the BHO to start the DSM as soon as it loads. Instead, it hooks into Internet Explorer events to detect when a Hendrix page (distinguished by the use of the page protocol) is first loaded. The BeginNavigate2 event is most appropriate for this purpose.

Beyond this point, the responsibilities of the BHO are identical to those of the framework itself, and for the most part are covered earlier in this specification. It is responsible for registration and un-registration of objects in the ROT, for the management of display paths, and so on. It is up to each individual development group how their own BHO should present configuration of this information (path setup, for example, or the ability to switch languages dynamically) to the user.

In the area of context menus, the operation of the BHO is slightly different from that of the framework. This is because the BHO is not responsible for hosting the web browser control, but is merely a COM object attached to Internet Explorer. The IDocHostUIHandler interface is designed primarily for web browser implementers, not for Internet Explorer itself.

It is possible, however, for an external object to override the user interface (menus, context menus and toolbar) functionality of Internet Explorer, through the use of the ICustomDoc interface. The ICustomDoc interface is described in the MSDN Library. It allows an object to set the UI handler for an instance of MSHTML, and is used by the BHO as follows:

```
if (IsPageProtocol( )) // only do this for Hendrix pages
{
    CComPtr<IHTMLDocument2> spDoc;
    CComPtr<ICustomDoc> spICD;
    // Set ourselves up as the UI handler for IE
    m_spWebBrowser2->get_Document((IDispatch **)&spDoc);
    spDoc->QueryInterface(IID_ICustomDoc, (void **)&spICD);
    if (spICD)
        spICD->SetUIHandler(this);
}
```

From this point the functionality is no different from any other application wishing to host the web browser control.

Advanced functionality for the BHO is largely identical to that provided by the framework, and is summarised below.

The BHO assists in the security and authentication mechanisms of the Hendrix architecture just as the framework does. Unlike the framework, however, the BHO has no inherent user interface of its own. It is up to the implementer of the BHO as to what user interface is provided to allow the operator to log on in the web browser environment.

The BHO must implement MIDXSearchPath to provide the APP with a valid search path for displays. It is up to the implementer of the BHO as to what user interface is provided to allow the user to configure these search paths.

The BHO is able to control the behaviour of popup windows by extending the object model of the browser. Note that the mechanism a BHO uses to extend this object model is the same as it uses to override context menus, as described above.

Like the framework, the BHO is responsible for retrieving system level error information, and either logging these errors or (where appropriate) presenting them to the user.

As the BHO possesses no user interface of its own, it is largely unable to execute system-level actions. In the web browser environment, operational functionality is largely restricted to the display shown.

Hendrix displays include of a number of different user-interface components, the most common being HTML elements, VML objects, behaviours, embedded displays, and ActiveX controls. Before discussing the requirements of ActiveX controls in the Hendrix architecture, it is worthwhile examining briefly when it is appropriate to use those controls.

Performance analysis of the MSHTML rendering engine has demonstrated that one performance bottleneck is in the callup of ActiveX controls. This is recognized by Microsoft, and is not likely to change in the upcoming releases of Internet Explorer. MSHTML is capable of meeting the Hendrix performance targets, but displays containing controls will remain slower to call up than displays containing similar functionality implemented via other means, such as a combination of HTML, behaviours, and script.

In general, therefore, controls are most appropriate for use in Hendrix when:

It is expected that few such controls will ever exist on a single page.

The control contains complex user interface interaction that would be difficult to implement using DHTML.

The call-up performance of the control does not matter.

The control is large enough that it is unlikely that there will be much other content on the page.

The control implements functionality that may need to be reused in other containers, such as in Visual Basic applications.

The control already exists.

This should not imply that controls are not central to the Hendrix display page architecture: world-class support of ActiveX controls is one of the strengths of Hendrix. Where a control is likely to be used several hundred times on a display page, however, that same functionality is best implemented via other mechanisms. In other embodiments, the functionality provided by a single large control is implemented just as easily by a combination of DHTML and other, smaller controls. This latter strategy has the advantage that these types of composite controls are able to be built and customized completely using the Hendrix builder or other DHTML authoring tools.

One of the main requirements of the architecture of the preferred embodiments is its support for third-party controls. The requirements of a control for Hendrix compliance are quite modest, and in many cases consist of recommendations rather than rules that must be obeyed. As a result, most third-party controls integrate smoothly into the Hendrix architecture.

The following description discusses the differing technologies available for the implementation of Hendrix controls: primarily the Active Template Library (ATL), Microsoft Foundation Classes (MFC), and Microsoft Visual Basic (VB).

The Hendrix architecture is not prescriptive when it comes to which of these technologies should be used to implement controls. As long as controls conform to the requirements enumerated in this document, they are able to be built with any of the above technologies (or even others, such as Java). However, it is worthwhile discussing the various features of the major technologies listed above, and considering when each is appropriate to be used.

Most windows developers are already familiar with and probably use the Microsoft Foundation Classes (MFC). The purpose of MFC is to speed the development of large, Windows-based applications, which generally have significant GUI components. MFC does support the creation of controls. However, the support for COM in MFC was added long after its initial implementation, and as a result its implementation is somewhat convoluted, and restricted in what it can do. In particular:

MFC does not easily support dual interfaces.

MFC controls require the MFC runtime libraries. This has an impact on size and performance, and also on the potential to deploy the controls via the web.

Like MFC, Visual Basic provides a convenient starting point for building simple controls, as it hides most of the complexity associated with building the control. In addition, the later versions of Visual Basic are far more oriented to control creation than MFC, and include support for windowless controls and dual interfaces. In general, Visual Basic is even simpler to use than MFC. It still suffers from some restrictions, in particular:

Controls implemented in Visual Basic still require the VB runtime libraries. As with MFC, this produces heavier controls that are more difficult to distribute via the web.

The performance of Visual Basic code is generally slower than code implemented in C++.

The fact that VB hides most of the implementation details is sometimes a drawback, particularly when creating controls that need to implement non-standard functionality. The framework provides ease of use at the expense of flexibility.

The Active Template Library (ATL) was built by Microsoft from the ground up as a development platform for developing the most efficient, streamlined, high-performance controls as possible. ATL includes a number of features which make it very useful for control creation, including:

Wizards used to create COM components and controls.

Template classes for COM fundamentals such as class factories and self-registration.

Support for HDL.

Complete implementation flexibility, including support for windowless controls, multiple threading models and dual interfaces.

ATL does, however, have its drawbacks, most notably that it is initially more difficult to use than either VB or MFC, particularly for developers familiar with either of those products. It also requires a sound knowledge of COM.

As a result of the features discussed above, the following general recommendations are provided as to which technology is used to implement controls:

Hendrix controls are, ideally, as small and lightweight as possible. The ability of ATL to create controls without dependencies on large runtime libraries, which are optimised for drawing performance, and as flexible as possible, means that in many cases ATL will be the most appropriate tool for control creation.

It is recognized that in many simple controls, the performance of VB-generated controls approach that of ATL. In addition, the performance limitations of controls in the Hendrix architecture will ultimately rest with the MSHTML rendering engine, rather than the controls themselves. Given Visual Basic's ease of use, in many cases it offers itself as a viable alternative to ATL, particularly when large numbers of controls are required in a short time. The dependency of Visual Basic controls on the VB runtime libraries, however, still impose restrictions on those controls, so ATL is still advised.

As previously mentioned, however, the architecture is not proscriptive when it comes to these recommendations, and the final choice is up to the individual developer.

The Hendrix architecture imposes very few constraints on controls as far as what methods, properties and events they must support. As far as the architecture is concerned, controls and behaviours are generally "dumb", and whichever properties they implement must be supplied with data via the standard Hendrix data delivery mechanisms. This has implications for the builder, in how to connect data to the various control properties, but these are issues for the builder, not the control.

In addition, much of the Hendrix-specific functionality required by controls and behaviours (data delivery, access to the data references data source object model which drives the control, etc.) is also required by data-bound HTML elements more generally. This functionality will not be implemented by the control/behaviour itself, but by custom binary behaviours that are applied to the control at authoring time by the builder.

There are, however, a number of things that should be considered when implementing a control or behaviour intended for the Hendrix environment. These fall into two categories: those that must be supported by all Hendrix-compliant controls and behaviours, and those which are more recommendations as to how good Hendrix controls and behaviours should behave.

The following aspects are required by all Hendrix-compliant controls and behaviours:

Quality Indication

A control/behaviour has any number of properties that are supplied with data by the binding engine. For each of these properties, the control/behaviour requires some way of indicating quality. One way to implement this functionality is by implementing each property as an object, with its own properties of value and quality. The value is a default property of this object, so that the following calls are identical:

control.property1=100 control.property1.value=100

Quality indication for the property is then accessed via control.property1.quality. The control sample demonstrates how this quality mechanism is implemented in an ActiveX control. This method is ideal for those controls/behaviours that have more than one bound value where each one requires a separate quality indication. This situation mainly arises with more complex controls/behaviours, one example being a trend control.

Alternatively, if your control/behaviour simply requires a single quality indication, and has one or more bound value properties, then a single quality property is exposed on the control/behaviour. It is then a simple process to bind this quality property to the equivalent quality property on the associated data source.

The major implication of this scheme is that the convergence team had to decide on a canonical form for this quality value. Without a converged concept of quality, controls/behaviours designed for one data source component will not work with other data source components.

Once a property's quality value is set, it is up to the control/behaviour as to how it represents that quality indication visually. This, again, is another potential area for convergence, with the potential for a standardized look and feel for controls.

Alarm Indication

Controls/behaviours which require alarm information obtain this through separate alarm properties. Generally this property shall be named "alarm", though some controls/behaviours require a number of alarm inputs so this name is not mandatory. Controls/behaviours interpret alarm parameter values according to the Hendrix canonical form for alarm information, which is described below.

Note that in some embodiments the alarm consolidation is performed either in the data source or sources, or in transformations in the binding engine prior to being applied to the control. This allows for arbitrarily complex manipulation of alarm data, and even the provision of alarm data from separate data sources, such as the Alarm List Manager.

Build-Time Requirements

Hendrix controls/behaviours exhibit specific build-time behaviour, so that they are able to be configured by the unified Hendrix builder.

Property Binding

Hendrix controls/behaviours implement bindable properties, and support pessimistic binding. This implies that the control/behaviour supports the IPropertyNotifySink interface, and that the properties on the control/behaviour are marked as both bindable and requestedit in the IDL file for the control/behaviour. Controls/behaviours built with ATL will fire the OnRequestEdit event when a property changes, as part of the standard ATL implementations. Controls/behaviours built in other environments will need to ensure that this event is fired as appropriate.

Persistence

Controls/behaviours must persist their configuration in a human-readable format in conformance with the standard for controls/behaviours in HTML files. In order to implement this functionality the control/behaviour must implement the IPersistPropertyBag interface.

Scripting

Hendrix-compliant controls/behaviours are able to be scripted in the standard web browser environment. To mark an object safe for initialisation and scripting, the control/behaviour implements the IObjectSafety interface.

Zooming

Hendrix-compliant controls/behaviours are able to support zooming.

The following aspects are recommendations as to how Hendrix controls/behaviours should behave. These recommendations are often to do with the style of a control/behaviour, how it will appear to a user, and how native it will feel in the Hendrix environment. If they are not implemented, the control/behaviour will still function in the Hendrix environment, but not as well as controls/behaviours which do follow these recommendations.

Data Access

Hendrix controls/behaviours should be designed to be as dumb as possible. They are preferably not data-aware, but instead rely on being supplied with data through property get/put calls by the binding engine. This design principle ensures simple, reusable controls/behaviours that make use of the data delivery optimisations that are part of the Hendrix architecture.

Object Model Consistency

Hendrix controls/behaviours aim to be well-behaved participants in the Document Object Model, both in terms of functionality and style. Things to consider here are property naming conventions (the DOM uses mixed case, without capitalization of the first word) and the type of events that need to be generated (controls should aim to be consistent with the events generated for native HTML elements). Note that since behaviours attach to an existing HTML element, they do not need to explicitly expose all events native to HTML elements. The HTML element continues to fire its own events whether the behaviour is attached or not.

Of more importance, however, is the issue of consistency with existing Honeywell object models (or at least similarity with them) and the generation of data-oriented events. In the Hendrix architecture data-oriented events are handled in the middle tier, with events (such as OnDataChange) generated in the data source components. These events are able to be scripted. Controls/behaviours are data independent, so the generation of data-oriented events are inappropriate for Hendrix controls/behaviours. Instead, the control/behaviour should generate onchange events for its various properties, which are then scripted in the document environment.

In addition, while consistency with the DOM is a noble goal, in some cases migration concerns make it preferable to conform more closely with the object models of existing Honeywell products.

Deployment

Hendrix-compliant controls/behaviours preferably support the ability to download them from web sites, allowing easy deployment. To enable web deployment, controls should contain a digital signature, obtainable from one of the recognized authoriztion authorities.

Stock Properties and CSS Styles

The present implementation of ActiveX controls is limited when it comes to applying CSS style attributes to a control. However, it is anticipated that this will be vastly improved in the next release of Microsoft Visual Studio. In the meantime, Hendrix controls observe the CSS style attributes applied to them in an HTML page. In particular, this means using ambient properties to set the attributes for font, foreground colour, background colour and text alignment. Behaviours do not need to explicitly deal with ambient properties since they usually only extend the functionality of the attached HTML element. Behaviours simply hook into the HTML element's style object attributes if they require the property values.

The Hendrix controls/behaviours support integration into the Hendrix builder. The main issue to consider here is how the control's/behaviour's configuration, via its property pages, is handled in the builder, and how this integration takes place.

The Hendrix builder handles control/behaviour configuration via property pages. The builder also support configuration of some of the more common properties via its toolbar. These include colours, line styles, and fonts.

Behaviours have a single requirement in order for them to integrate with the builder. This is, behaviours expose a property which returns a pointer to the behaviour. The name of this property is equivalent to the behaviour's ID as specified in its OBJECT tag in the HTML document. Below is an example.

<OBJECT id=HSCIndicatorBehavior style="LEFT:0px; WIDTH:0px; POSITON: absolute; TOP: 0px; HEIGHT: 0px" classid=clsid:ABAAEE25-63F3-4F67-9C1C-0AC96A186A73><OBJECT>
...
<SPAN id=indicator1style="BEHAVIOR: url(#Binding-Behavior) url(#HSCIndicatorBehavior); BORDER-RIGHT: 2px inset; BORDER-TOP: 2px inset; FONT-SIZE: 12pt; LEFT: 94px; BORDER-LEFT: 2px inset; WIDTH: 77px; BORDER-BOTTOM: 2px inset; FONT-FAMILY: Arial; POSITION: absolute; TOP: 202px; HEIGHT: 164px; BACKGROUND-COLOR: lightsteelblue"></SPAN>

The reason for such a property is to allow the display builder to get a pointer to the behaviour for querying for ISpecifPropertyPages. At the moment it is not possible to get to any attached behaviours via a pointer to the attached HTML element).

The following recommendations should also be followed to ensure controls/behaviours behave well within the builder:

Controls/behaviours should not contain any data-related configuration information, just properties that relate to its runtime visual behaviour or operation Controls/behaviours should specify property pages for configuration of their properties. This involves implementing the ISpecifyPropertyPages interface. If implementing your control/behavior in ATL, the property pages are simply specified via the PROP_ENTRY or PROP_PAGE macros in the property map. Behaviours should expose an 'element' property which returns a pointer to the attached HTML element. This property is not essential but is useful when an external object (such as a custom property page) wants to access properties on the attached HTML element. Since the builder is only given a pointer to the behaviour itself (on which it queries for ISpecifyPropertyPages), there is no other way to get a hold of the attached HTML element. This property is required by a small selection of common property pages contained in the builder.

One of the major decisions to make when implementing a control is whether to make the control windowed or windowless. The Hendrix architecture is not proscriptive in this area, as in some situations windowed controls are appropriate. In general, however, windowless controls are more suitable for use in a browser-oriented user environment. The major reasons for this recommendation are:

The creation of a window for windowed controls gives them much poorer call-up and redraw performance than windowless controls. The operation of a display containing a large number of windowed controls is extremely poor.

Windowless controls support flicker-free drawing, while windowed controls do not.

Windowless controls support non-rectangular areas, and transparency. Windowed controls are displayed in the document as an opaque rectangle.

Windowless controls do, however, have their own limitations. In particular:

At present, Internet Explorer does not support zooming of windowless controls. This is a major limitation and as such may mean the implementation of a windowed control is unavoidable.

Implementing a large, sophisticated control with a complex user interface as windowless is far more difficult than implementing a windowed version of the same control. Implementation effort increases rapidly once a control incorporates a large number of user interface elements.

Figure 36:
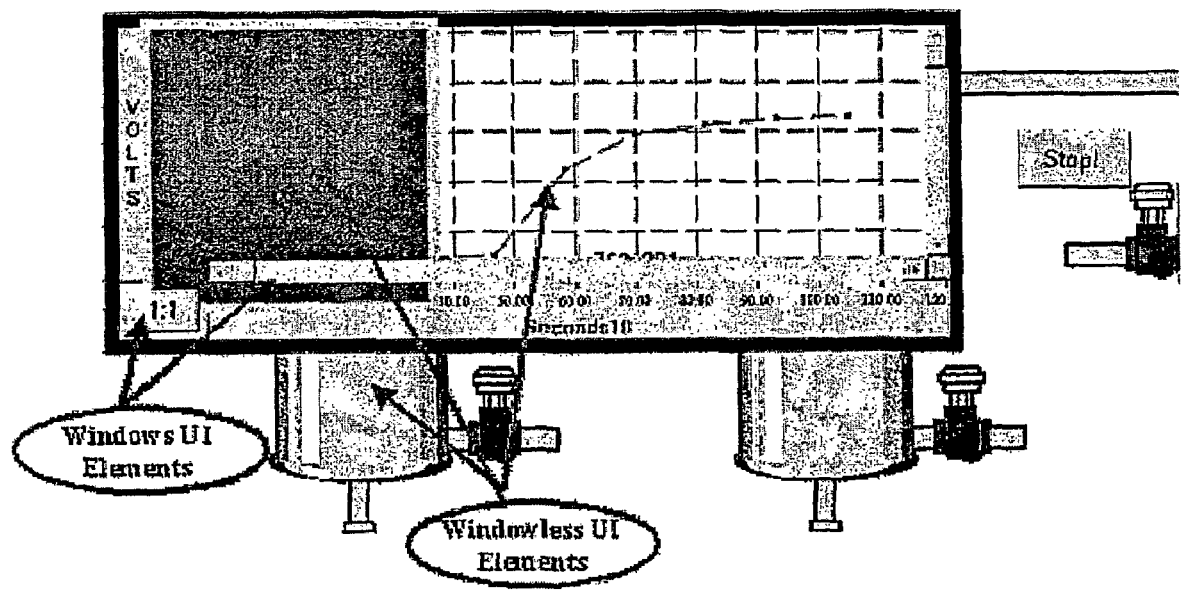
FIG. 36 is an illustration of some Windows user interface elements in a Windowless control.

Standard Windows user interface elements, such as scroll bars, comboboxes, checkboxes, etc. have standard windowed implementations. These elements may be created in a windowless control, but their windowed nature means they will not participate in the z-order scheme of a windowless control (see FIG. 36). At present, no library of windowless UI elements exists, meaning that all such elements need to be implemented using standard GDI functions in a windowless control. (Note also that while VB6 permits the creation of windowless controls, it does not allow these controls to contain windowed UI elements.)

As a result of the advantages and disadvantages of windowless controls discussed above, the Hendrix architecture makes the following recommendations:

Hendrix controls are preferably implemented as windowless controls, particularly when they are simple controls, and where it is expected that several such controls are to be placed on a single display page. This is only recommended, however, if display page and control zooming as supported by Internet Explorer is not important.

Where a control is expected to be large and complex, to provide a large amount of self-contained functionality, and not be expected to interact with the rest of a display page, then a windowed control is acceptable.

The implementation of drawing in each control will depend upon the tool being used to generate the control. However, no matter what tools are used to develop the controls, all Hendrix-compliant controls provide support for:

Zooming; and

Printing.

In addition, while the target container for most Hendrix controls will be MSHTML, it is highly preferred that controls are developed to be container-independent. In other words, Hendrix controls work in any container, such as Visual Basic and Office 2000. The following description discusses these issues in further detail.

The current plans for zooming within the Hendrix architecture are to emulate the zooming functionality of HTML pages generated by PowerPoint 2000. Microsoft has some plans for implementing zooming in HTML, but not in the Hendrix timeframe.

The basic concept for zooming is quite simple. Each display page is contained in a single HTML <DIV> tag, which is given both a size and a font size. All objects within the page are defined in terms of these attributes, where:

Object size and position is expressed as a percentage of its parent element.

Object font is expressed as a percentage of the parent font.

When a page changes its zoom level, the containing <DIV> is resized appropriately, changing the size and position of all objects on the page. It also has its font size recalculated, propagating font size changes down to all page objects. This operation is performed by a simple few lines of script on the page, or may alternatively be performed by the data source connector on the page.

This approach has implications for how controls are implemented. First consider the case of a simple control, displaying a single alphanumeric string value within a bounding rectangle. In this simple case, whenever the control is resized, it's graphical content (the rectangle) is scaled to fit its new size. In other words, the graphical content is scaled upon every size change. The font for the text in the control is applied using the ambient font property, which in HTML is set using CSS style attributes. In Hendrix, this font will be set to a percentage of the parent font.

Thus for this simple control, when the page is zoomed, the control's graphical content will zoom, and its font will change size as well, presenting the impression of zooming to the user consistent with other HTML elements on the page.

This behaviour is also consistent with scripting within the page. When the control is sized, its graphical content scales, independent of the font, which may also be changed via script. When a user resizes the control via script, they do not expect to see its font change as well.

This simple model is the one recommended for Hendrix controls/behaviours, as it integrates as closely as possible with existing CSS mechanisms. For more complex controls/behaviours, however, it is often desirable that a scripted size change does not scale the graphical content of the control/behaviour, but merely clips it. In this case, the zoom factor is independent from the object's current size. The Hendrix zooming model supports this type of control/behaviour as follows:

Font properties are set explicitly as properties on the control. In the behaviour's case the font properties are on the attached HTML element's style object.

A control retrieves the ambient font property, and uses its size relative to the explicitly set font size to calculate its own scaling factor. It uses this scaling factor to determine how to zoom its graphical content.

Resizing the control/behaviour does not change the control's or HTML element's scaling factor.

This type of behaviour is probably most appropriate for large, complex controls with numerous font selection properties, such as a chart. As it uses the CSS mechanisms in a non-standard way, it is not likely to work well with the improvements Microsoft has planned for ActiveX controls in the next release of Visual Studio, and should therefore be used only when necessary.

All Hendrix-compliant controls support printing. This involves configuring the device context mapping mode in such a way that the control renders itself correctly for all devices (screen, printer, etc).

It is highly preferred that all Hendrix controls/behaviours are developed to be container-independent.

All Hendrix controls/behaviours support scripting, allowing property get/put operations via the IDispatch interface. As a result, all Hendrix control/behaviour properties are standard OLE data types.

Complex data structures, such as array data, is supported by the Hendrix binding engine and data source components (refer to the Hendrix Architecture Overview and Reference and the Data Source Component Implementation Guide). From a control's/behaviour's perspective, array data is supported by using a SafeArray. The Hendrix Implementation Issues document discusses the construction of SafeArrays.

The choices for threading in controls is very limited—full controls conform to the Single-Threaded Apartment threading model. This is due to the requirement of the GUI component of the control to receive synchronized calls.

The Hendrix Implementation Issues document discusses the different threading models available in ATL.

Advanced error handling for COM objects (including ActiveX controls and DHTML behaviours) centres around the use of the ISupportErrorInfo interface. This interface and those associated with it allow an object to return detailed error information to a client.

In the Hendrix environment, this error information is passed to the script engine when an error is encountered, which gives a user the opportunity to view this information. For this reason, the support of the COM error interfaces in Hendrix controls is recommended.

It should be recognized, however, that most operations performed on a control in the Hendrix architecture will typically be via the binding engine. In this case, there is no real opportunity for the architecture itself to relay this information back to the user. Even if the various frameworks provided such a mechanism, the process control environment typically relies on visual information within the control to convey bad information (such as displaying itself as inverse for out-of-bound data). Control implementers are encouraged, therefore, to provide error information through the user interface of the control where possible. More serious types of internal errors, such as general protection faults, are of course beyond the scope of this mechanism. However, all exceptions which are thrown within a control should be caught and then return an appropriate failed HRESULT to the calling client. Note that there are quite a few groups of Windows API calls which inherently throw exceptions. When using these API functions it is recommended to wrap them in try/catch blocks which catch all possible types of exceptions which are thrown by the function(s) in question. That way the call is returned so the client object does not lock.

The following description outlines the Hendrix canonical form for quality. How each individual control/behaviour interprets this quality information is up to it.

The Hendrix quality value is implemented as a vendor-specific extension to the 32-bit OPC Quality word. In Hendrix, "Quality" is a slightly more loose term than in OPC, and is used to indicate any information which affects the visual representation of a UI element, such as alarm or security information. Thus the OPC quality value is not sufficient for the requirements of Hendrix. It does, however, provide a good basis for it, and its extensibility mechanism allows it to fulfil all Hendrix requirements.

The OPC Quality word has the following structure:

| Reserved | Extension | QQ.SSSS.LL |
| --- | --- | --- | where:
QQ=quality bit-field
SSSS=substatus bit field
LL=limit status bit field
These are interpreted as follows:
Quality
00=>Bad. Value is not useful. Reasons indicated by substatus.

01=>Uncertain. Quality is uncertain for reasons indicated by substatus.
10=>N/A. Notused.
11=>Good. Quality of the value is good. More information can be obtained in substatus.
Substatus
The layout of this field depends on the value of the Quality field.
Substatus for Bad Quality:
0000=>Non-specific.
0001=>Configuration error.
0010=>Not connected
0011=>Devicefailure
0100=>Sensor failure
0101=>Last known value
0110=>Comm failure
0111=>Out of service
Values 8-15 are not used by OPC.
Substatus for Uncertain Quality:
0000=>Non-specific
0001=>Last usable value
0100=>Sensor not accurate
0101=>Engineering units exceeded
0110=>Subnormal
Values 2-3, 7-15 are not used by OPC.
Substatus for Good Quality
0=>Non-specific. The value is good.
6=>Local override. Value has been entered manually.
Other values are not used by OPC.
Limit Status
0=>Not limited.
1=>Low limited. The value has pegged at some lower limit.
2=>High limited. The value has pegged at some high limit.
3=>Constant. The value is constant and cannot move.
The Extension Field
In Hendrix, the 8-bit extension field is used to either represent a confidence value (as in Uniformance), or a discrete bitmap of quality values (as in most other systems), as follows:

| Empty (18 bits) | Q.C.A.R | Severity (10 bits) |
| --- | --- | --- | where:
Q=alarm condition quality bit
C=alarm condition bit
A=acknowledgement status
R=acknowledgement requirement
Severity=alarm severity
These are interpreted as follows:
Alarm Condition Quality
0=>Alarm condition calculation is valid.
1=>Alarm condition calculation is invalid (for example bad limit value).
Alarm Condition
0=>Alarm condition is off, no alarm.
1=>Alarm condition is on, alarm.
Acknowledgement Status
0=>Alarm is not acknowledged.
1=>Alarm is acknowledged.
Acknowledgement Requirement
0=>Acknowledgement is not required.
1=>Acknowledgement is required.
Severity
This is a value ranging from 1 to 1000. Systems should spread their alarm severities across this range. It is envisaged that the Alarms & Event team will define a converged definition of severity breakdowns for Honeywell systems—when this is done controls use this definition accordingly. In the meantime the controls interpret this value as they see fit.

Advantages of the Preferred Embodiments

The common HMI architecture for industrial user interfaces that is provided by the preferred embodiments of the invention provide many and considerable advantages. Not only to they make use of and build upon capabilities of existing Honeywell-developed HMI systems, but also in addressing future directions in technology, as well as anticipated market requirements. By way of the example, the advantages of the preferred embodiments include:

Robustness—as the user interface eliminates, or at least minimizes, any potential loss of view.

Migration path—an acceptable migration path from existing systems to the invention is provided.

Single builder and runtime—the architecture facilitates the development of a single builder and runtime to be used with the various Honeywell or other systems. While there is flexibility of implementation to allow tailoring of the system, there is also an inherent ability for the architecture to drive unification of the underlying mechanisms.

Future proofing—use of the preferred embodiments allows leverage to be gained from present and future state-of-the-art technology. The preferred embodiments are also closely coupled with industry standards, enabling it to adapt easily to future technological trends. The architecture is also open and extensible.

Powerful graphics rendering—the preferred embodiments allow future user interface developments to leverage the current state of the art in graphics rendering capabilities, for both vector and raster graphics objects.

Openness of display elements—the user interface facilitates the inclusion of non-proprietary display elements (for example, HTML, 3rd party controls and the like) which have their values bound to process data.

Facilitation of "value-add" developments—the architecture provided by the preferred embodiments facilitates developments that add value for the markets targeted by the provider of the system as opposed to expending effort developing commodity deliverables such as graphics rendering and display drawing functionality.

Restricted navigation and control—a user's view of plant data is able to be restricted on a per-operator basis, according to factors such as security level. Moreover, the controls are inherently safe and secure.

Fast, efficient communications—the communications subsystem is both fast and efficient. Many existing HMIs provide extremely low-bandwidth communications systems for remote plant access, and this capability is retained by the preferred embodiments, as required.

Industrial operator keyboard support—the preferred embodiments continue to support any industrial operator keyboards used by current systems.

Persistent alarm and status indication—an operator is provided with constant access to alarm and status information.

Performance—both page callup and data update performance are excellent.

Internationalisation—the displays are internationalised easily.

Restricted operating system or screen access—an operator's access to the underlying operating system, and the desktop is limited, as required. This includes support for fall-screen lock mode, or screen real-estate management systems such as SafeView.

Animation services—industry-standard animation services are provided, with facilities for such behaviours as blinking. Animation capabilities are comparable with what users currently expect from Web pages.

Third-party ActiveX control container—the preferred embodiments have the ability to embed third-party ActiveX controls in process displays, and link these controls to process data. The user interface is also robust, even under the influence of badly-behaved controls.

Integration of data from multiple sources—users are able to access multiple business information data sources while within the process control environment. The globally-accessible information space of the internet has meant that the ability to merge information systems in this way is increasingly becoming a customer expectation. In some embodiments that integration takes the form of embedding web page content within process displays, while in other embodiments it involves more extensive integration of information systems. Integration goes further than simply integration of web page content, however. In the more preferred embodiments the user interface architecture is open enough to allow seamless integration with data from multiple sources. Instead of providing this integration in a coarse manner—such as large ActiveX controls accessing third-party data programmatically—this integration is as fine-grained as possible. The architecture of the more preferred embodiments is powerful and flexible enough to provide the ability to bind data to discrete elements within a display page.

Consolidation of data from multiple Honeywell systems—somewhat related to the previous advantage, the preferred embodiments allow a single display page to display data from multiple Honeywell systems.

Casual access to process data via web browser—this advantage is in many ways the corollary of the previous one. Users are able to access process data via a standard web browser. There are many ways to provide this functionality, but the more preferred embodiments utilise HMI architecture that makes this integration completely seamless.

Encapsulation—encapsulation of the displays is supported and, where necessary, is equivalent to the functionality provided by current systems. Encapsulation allows reuse of both content and script in a user display.

Faceplate functionality—the preferred embodiments, by the mechanisms inherent in the architecture, support existing and future requirements for the display of faceplate data.

Although the invention has been described with reference to specific examples, it will be appreciated by those skilled in the art that it may be embodied in many other forms.

The invention claimed is:

1. A computer implemented method, performed at a client terminal, the method comprising the steps of:
   (i) at the client terminal, loading, from a display page data storage terminal, display page data indicative of a display page for a human machine intepage, the display page data comprising first data indicative of presentation aspects for a display page element having one or more element properties, and second data indicative of data requirement aspects for the display page element;
   (ii) at the client terminal, processing the second data thereby to identify a data source definition and a binding definition, wherein the data source definition references a data source that maintains data for use by the display page element, wherein the data source resides at a location that is both remote of the client terminal and remote of the display page data storage terminal;
   (iii) at the client terminal, based on the data source definition, initializing the data source referenced by the data source definition to construct a data reference object model at the data source for the delivery of data indicative of one or more data references having respective data properties such that the data source constructs the object model and transitions into a running state wherein the data source delivers directly to the client terminal data indicative of property change notifications for the one or more data references having respective data properties; and
   (iv) At the client terminal, based on the binding definition, applying to the one or more element properties, on a continuing basis, changes in the one or more data properties such that the display page element is updated corresponding to the changes in the one or more data properties.

2. A computer implemented method according to claim 1 wherein the first data comprises HTML data and the second data comprises XML data.

3. A computer implemented method according to claim 1 wherein the display page element comprises:
   An ActiveX control;
   A VML graphics element;
   An HTML element;
   An HTML scriptlet; or
   A Java Applet.

4. A computer implemented method according to claim 1 wherein a step of reading the display page data for parsing and rendering the display page element is performed independent of step (i).

5. A computer implemented method according to claim 1 wherein the display page data comprises first data indicative of presentation aspects for a plurality of display page elements, each having a respective one or more element properties, and second data indicative of data requirement aspects for the plurality of display page elements.

6. A computer implemented method according to claim 1 wherein step (i) is performed by a data source manager in response to the display page data being called up by a rendering engine.

7. A computer implemented method according to claim 1 wherein step (iii) comprises:
   (iiia) Parsing the data source definition;
   (iiib) Instantiating the data source referenced by the data source definition;
   (iiic) Passing the data source definition to the data source; and
   (iiid) Instructing the data source to begin delivering data.

8. A computer implemented method according to claim 1 wherein the data source definition contains data source specific information required to allow the data source referenced by the data source definition to construct a data reference object model that contains the one or more data references.

9. A computer implemented method according to claim 8 wherein the data reference object model is used as input for step (iv).

10. A computer implemented method according to claim 9 wherein the binding definition defines how to map data from the data reference object model to the display page.

11. A computer implemented method according to claim 10 wherein a binding engine moves data between the data reference object model and the display page in either direction such that data changed in the display page is propagated back to the data reference object model and then on to an associated server system.

12. A computer implemented method according to claim 1 wherein there is a one-to-one relationship between display page elements and binding definitions.

13. A computer implemented method according to claim 1 wherein there is a one-to-one relationship between display pages and data sources such that a given data source only delivers data for a single display page.

14. A computer implemented method according to claim 13 operable for a plurality of display pages, comprising a single data source manager for managing multiple data sources for the plurality of display pages.

15. A computer implemented method according to claim 1 wherein step (iv) comprises transforming one or more of the element properties.

16. A computer implemented method according to claim 1 wherein the method comprises:
   (v) Receiving data indicative of a user-initiated change of the display page element that corresponds to a change in the one or more element properties;
   (vi) Based on the binding definition, selectively applying to the one or more data properties, on a continuing basis, changes in the one or more element properties such that the one or more data properties are updated corresponding to the changes in the display page element.

17. A computer implemented method according to claim 16 wherein step (vi) provides command functionality to the display page element without explicitly coding of such functionality in the display page data.

18. A computer implemented method according to claim 1 wherein each data reference is an object that refers to a named data item in a server system.

19. A computer implemented method according to claim 18 wherein changes in the named data item are delivered to the data reference using a server system specific mechanism.

20. A computer implemented method according to claim 19 wherein the data reference is responsive to delivery of a change in the named data item for then notifying a software-based binding engine responsible for step (iv) that a data property has changed.

21. A computer implemented method according to claim 1 wherein the one or more processors additionally render the display page for display to a user.

22. A computer implemented method according to claim 1 wherein the one or more processors are provided by a middle tier platform that remotely communicates with a thin client platform that renders the display page for display to a user.

23. A computer implemented method according to claim 1 wherein a software-based data source manager component is responsible for performing steps (i) to (iii) and a software-based binding engine is responsible for performing step (iv).

24. A computer implemented method according to claim 1 wherein only the second data of the display page data is read at step (i).

25. A computer implemented method, performed at a client terminal, the method comprising the steps of:
   (i) at the client terminal, loading, from a display page data storage terminal, display page data indicative of a display page for a human machine intepage, the display page data comprising first data indicative of presentation aspects for a display page element having one or more element properties, and second data indicative of data requirement aspects for the display page element;
   (ii) at the client terminal, processing the second data thereby to identify a data source definition and a binding definition, wherein the data source definition references a data source that maintains data for use by the display page element, wherein the data source resides at a location that is both remote of the client terminal and remote of the display page data storage terminal;
   (iii) at the client terminal, based on the data source definition, initializing the data source referenced by the data source definition to transition into a running state such that, responsive to a property change at the data source, the data source delivers directly to the client terminal data indicative of property change notifications for one or more data references having respective data properties; and
   (iv) At the client terminal, based on the binding definition, applying to the one or more element properties, on a continuing basis, changes in the one or more data properties such that the display page element is updated corresponding to the changes in the one or more data properties.

* * * * *

UNITED STATES PATENT AND TRADEMARK OFFICE
CERTIFICATE OF CORRECTION

PATENT NO. : 7,555,706 B2
APPLICATION NO. : 10/297732
DATED : June 30, 2009
INVENTOR(S) : David John Chapman et al.

It is certified that error appears in the above-identified patent and that said Letters Patent is hereby corrected as shown below:

In Column 95, line 58, delete "intepage" add --interface--;
In Column 98, line 17, delete "intepage" add --interface--.

Signed and Sealed this

Twenty-fifth Day of August, 2009

David J. Kappos
*Director of the United States Patent and Trademark Office*